United States Patent
Lee et al.

(10) Patent No.: US 11,665,357 B2
(45) Date of Patent: *May 30, 2023

(54) IMAGE SIGNAL ENCODING/DECODING METHOD AND DEVICE THEREFOR

(71) Applicant: XRIS CORPORATION, Seongnam-si (KR)

(72) Inventors: Bae Keun Lee, Seongnam-si (KR); Dong San Jun, Changwon-si (KR)

(73) Assignee: XRIS CORPORATION, Seongnam-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/847,381

(22) Filed: Jun. 23, 2022

(65) Prior Publication Data

US 2022/0329827 A1     Oct. 13, 2022

Related U.S. Application Data

(63) Continuation of application No. 17/473,714, filed on Sep. 13, 2021, now Pat. No. 11,425,399, which is a continuation of application No. PCT/KR2020/012250, filed on Sep. 10, 2020.

(30) Foreign Application Priority Data

Sep. 10, 2019   (KR) .......................... 10-2019-0112465
Dec. 26, 2019   (KR) .......................... 10-2019-0175282
Dec. 31, 2019   (KR) .......................... 10-2019-0179609

(51) Int. Cl.
*H04N 19/174*     (2014.01)
*H04N 19/51*      (2014.01)

(52) U.S. Cl.
CPC ........... *H04N 19/174* (2014.11); *H04N 19/51* (2014.11)

(58) Field of Classification Search
CPC ..... H04N 19/174; H04N 19/176; H04N 19/70
See application file for complete search history.

(56) References Cited

U.S. PATENT DOCUMENTS

| | | | |
|---|---|---|---|
| 2017/0238001 A1 | 8/2017 | Li et al. | |
| 2018/0041779 A1 | 2/2018 | Zhang et al. | |
| 2021/0044819 A1* | 2/2021 | Furht | H04N 19/70 |
| 2021/0152824 A1* | 5/2021 | Damghanian | H04N 19/70 |
| 2021/0204000 A1* | 7/2021 | Wang | H04N 19/436 |
| 2021/0306648 A1* | 9/2021 | Chen | H04N 19/597 |
| 2021/0329305 A1* | 10/2021 | Sychev | H04N 19/119 |
| 2022/0007035 A1* | 1/2022 | Lee | H04N 19/105 |

FOREIGN PATENT DOCUMENTS

| | | |
|---|---|---|
| JP | 2019-515570 A | 6/2019 |
| KR | 10-2018-0005185 A | 1/2018 |
| KR | 10-2018-0131454 A | 12/2018 |

* cited by examiner

*Primary Examiner* — Fabio S Lima
(74) *Attorney, Agent, or Firm* — Goldilocks Zone IP Law

(57) ABSTRACT

An image decoding method, according to the present disclosure, comprises the steps of: parsing tile column number information indicating a value wherein 1 is subtracted from the number of tile columns included in the i-th slice; parsing tile row number information indicating a value wherein 1 is subtracted from the number of tile rows included in the i-th slice; and, if the tile column number information and the tile row number information are both 0, further parsing number information related to the number of slices in which height information in a tile including the i-th slice is clearly signaled.

9 Claims, 27 Drawing Sheets

[FIG. 1]
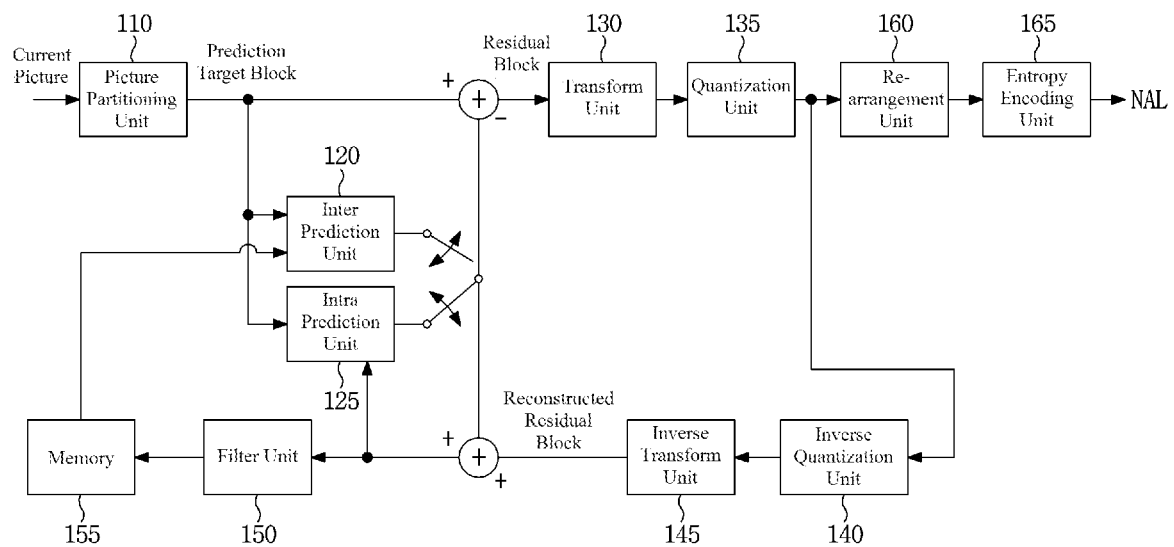
[FIG. 2]
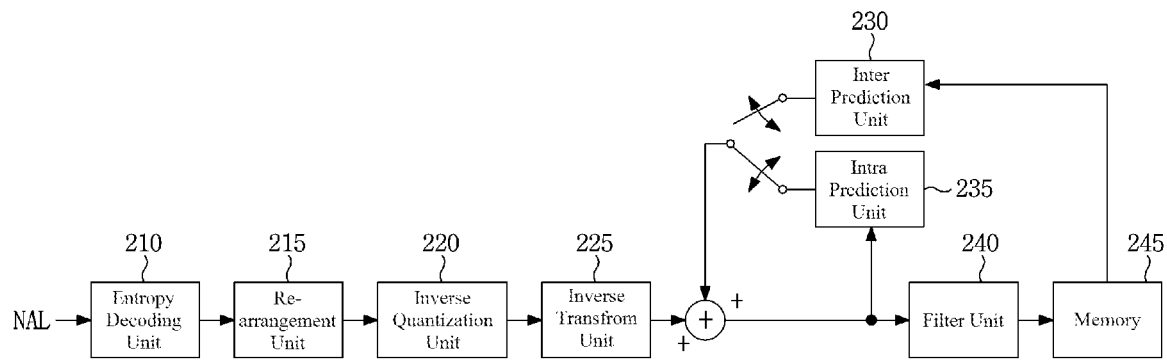

[FIG. 3]
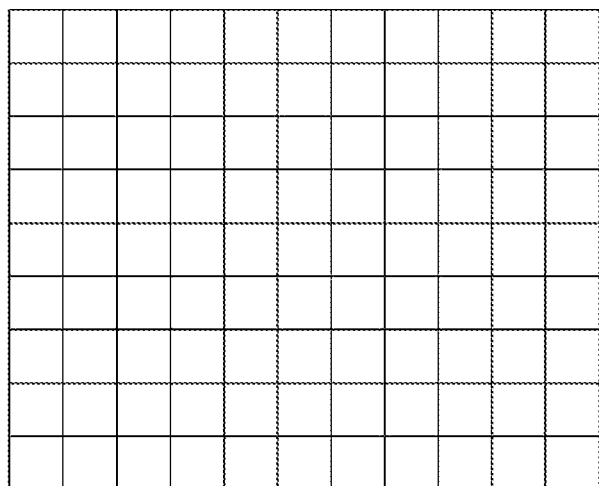
[FIG. 4]
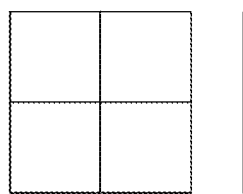 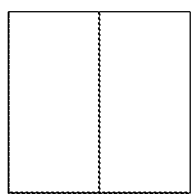 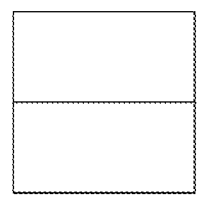 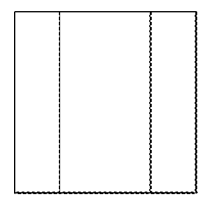 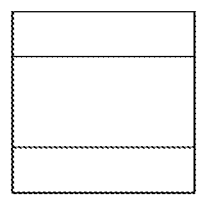
SPLIT_QT    SPLIT_BT_VER    SPLIT_BT_HOR    SPLIT_TT_VER    SPLIT_TT_HOR 【FIG. 5】
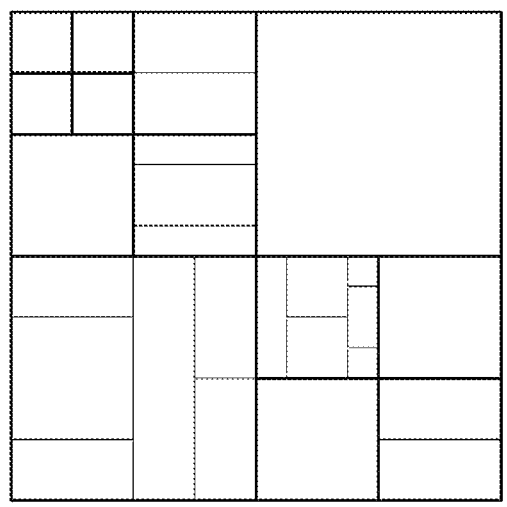
【FIG. 6】
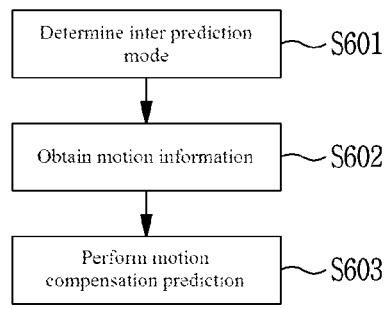
【FIG. 7】
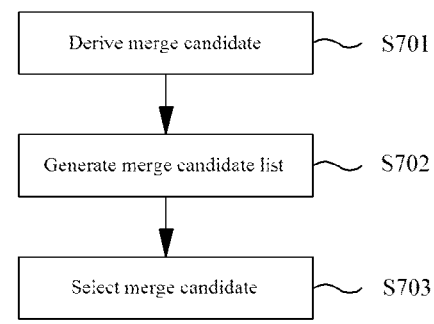

[FIG. 8]
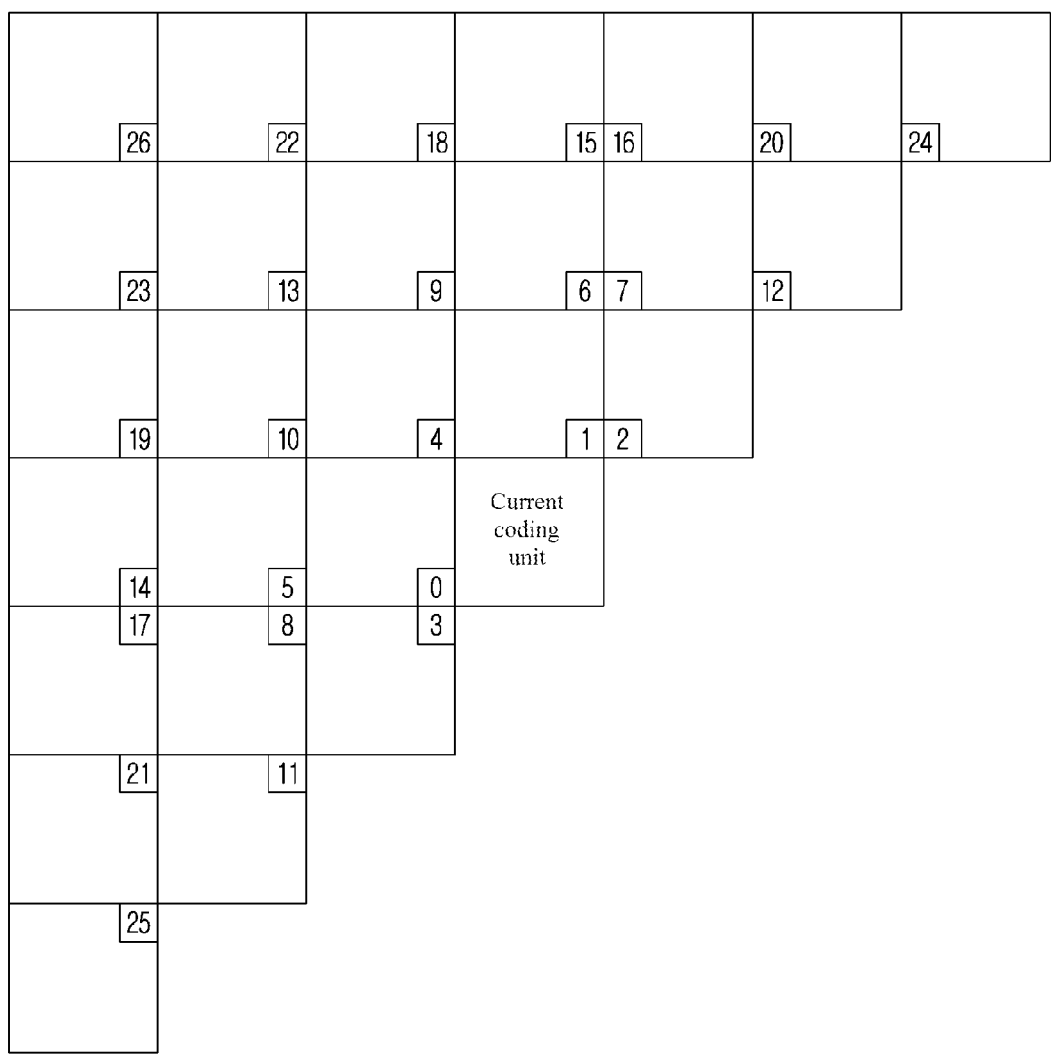

[FIG. 9]
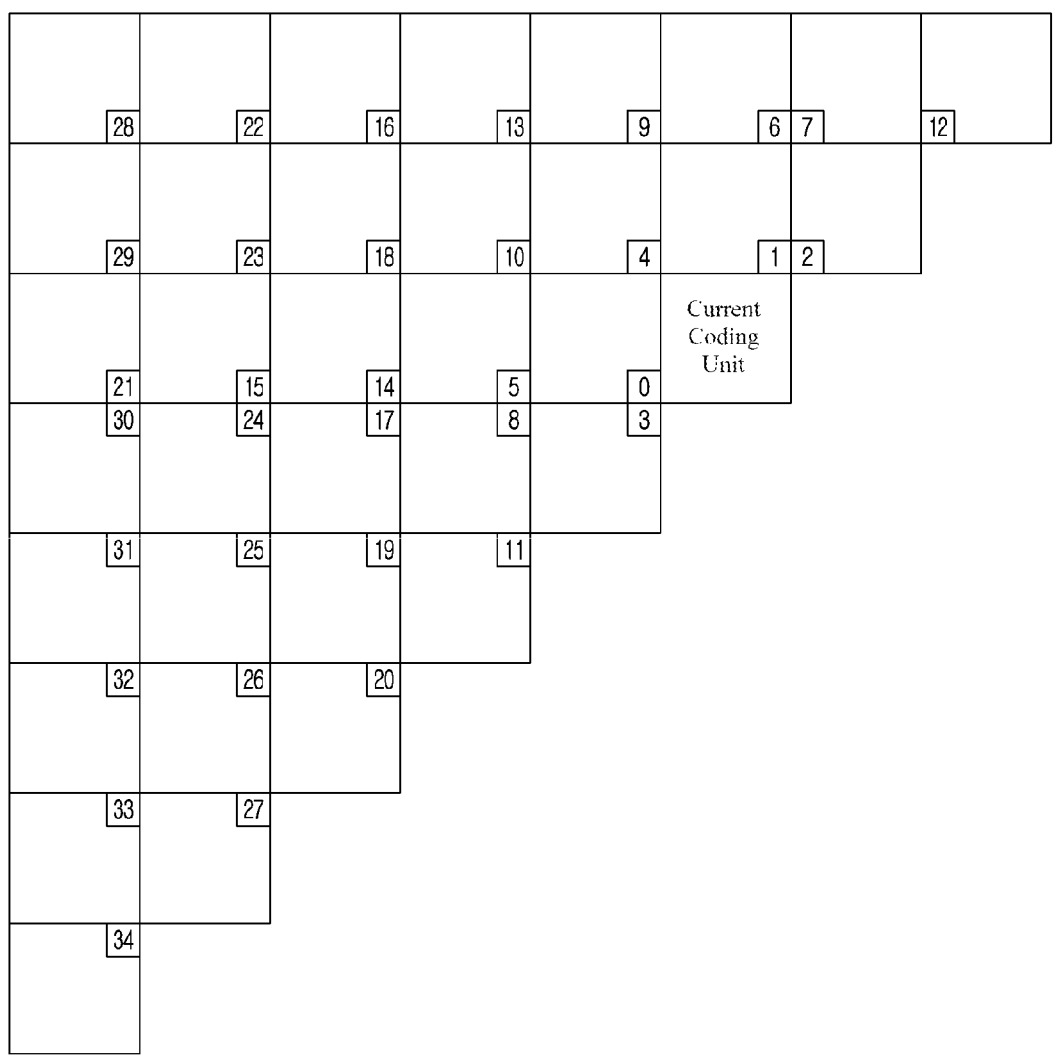

[FIG. 10]
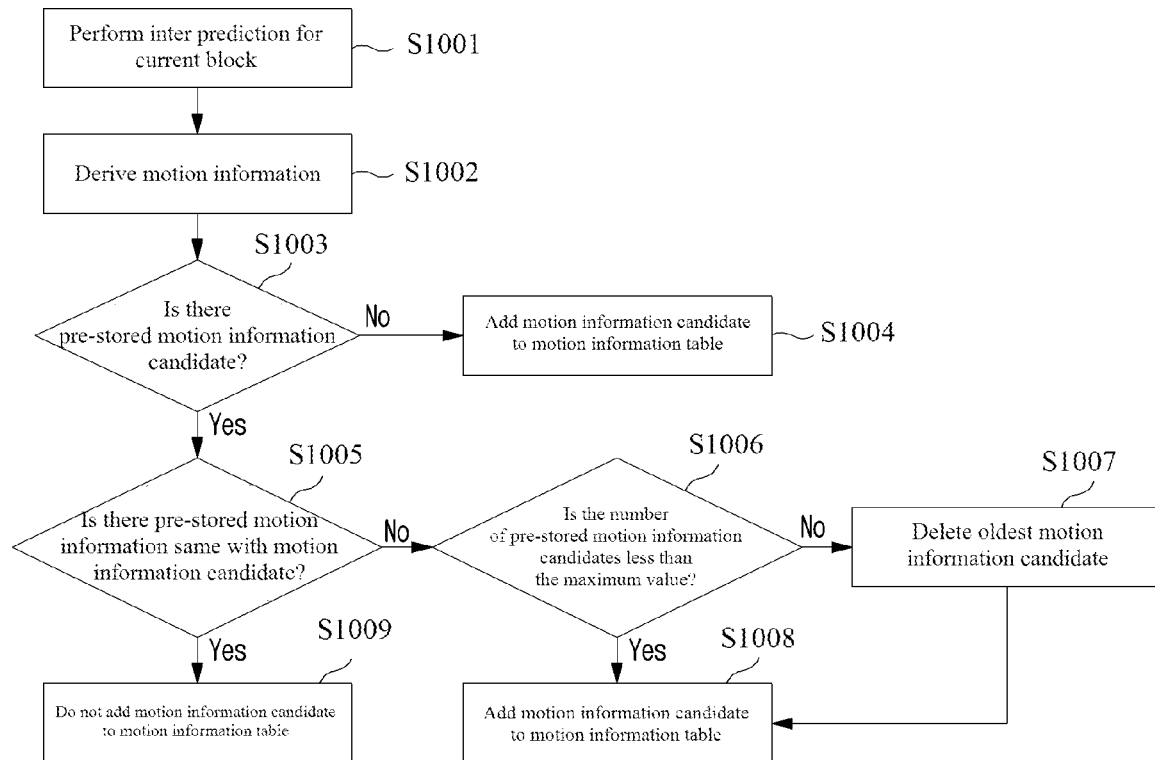
[FIG. 11]
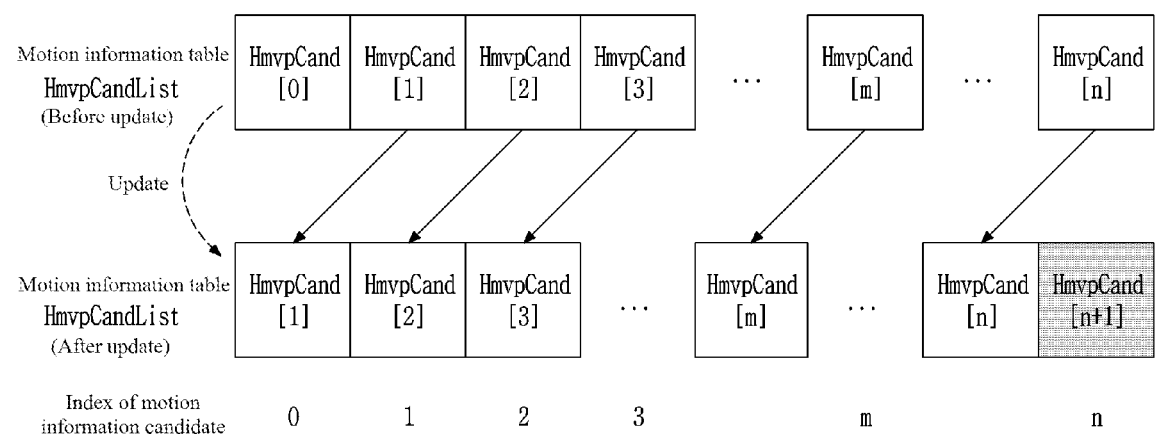

[FIG. 12]
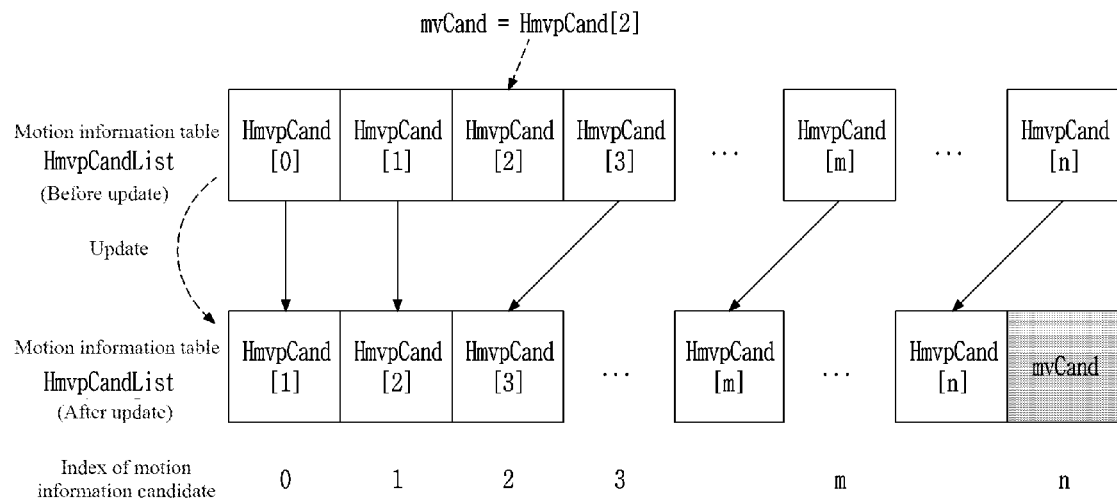
[FIG. 13]
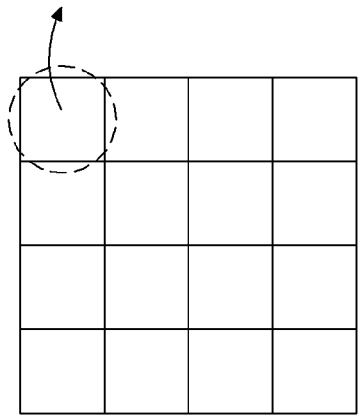 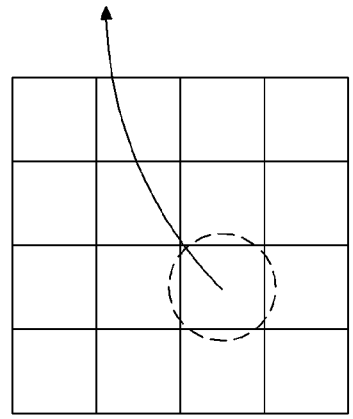
(a)            (b)

[FIG. 14]
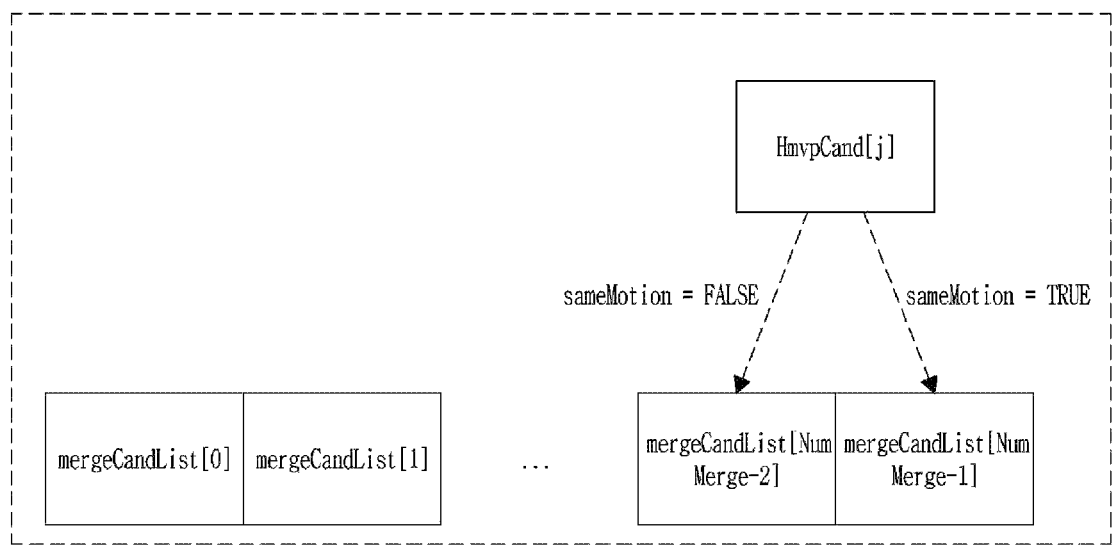

[FIG. 15]
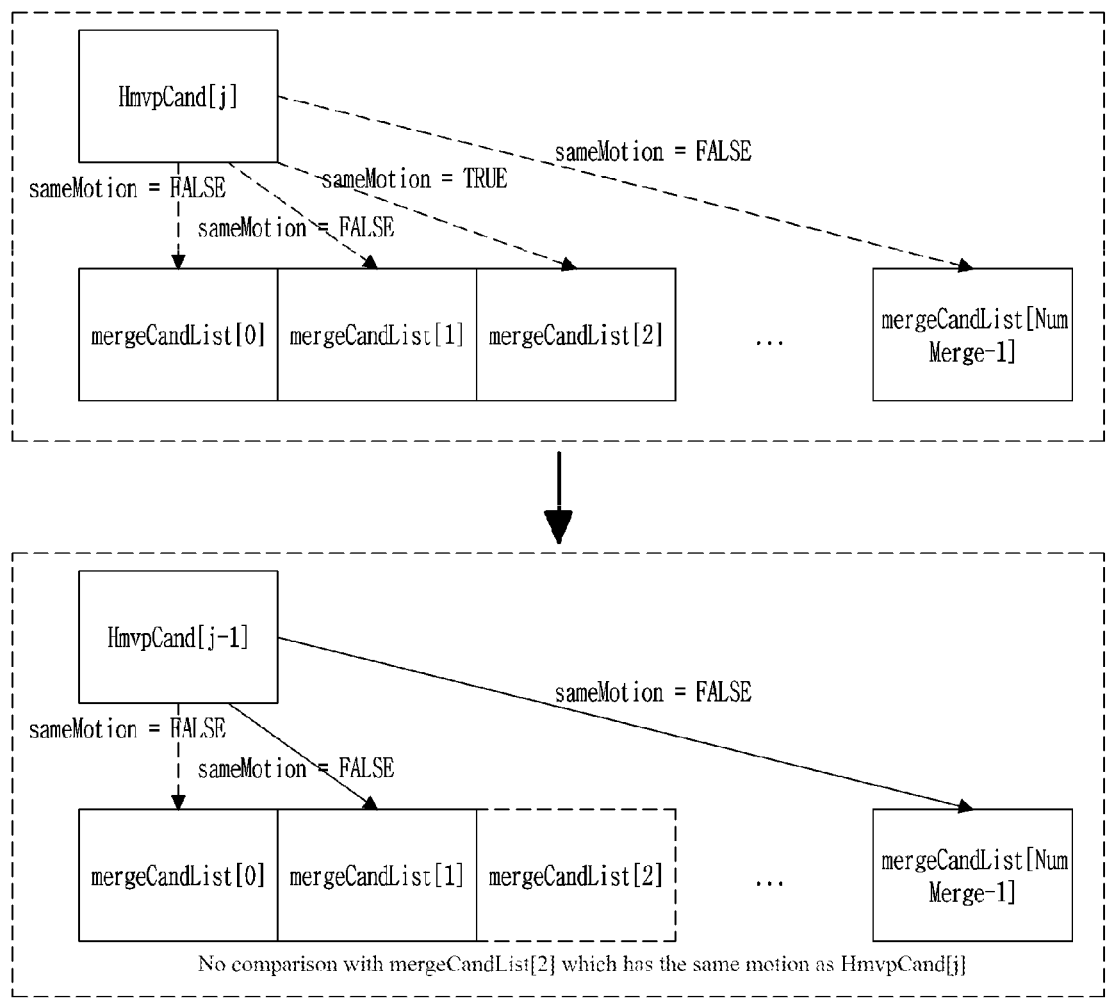

【FIG. 16】
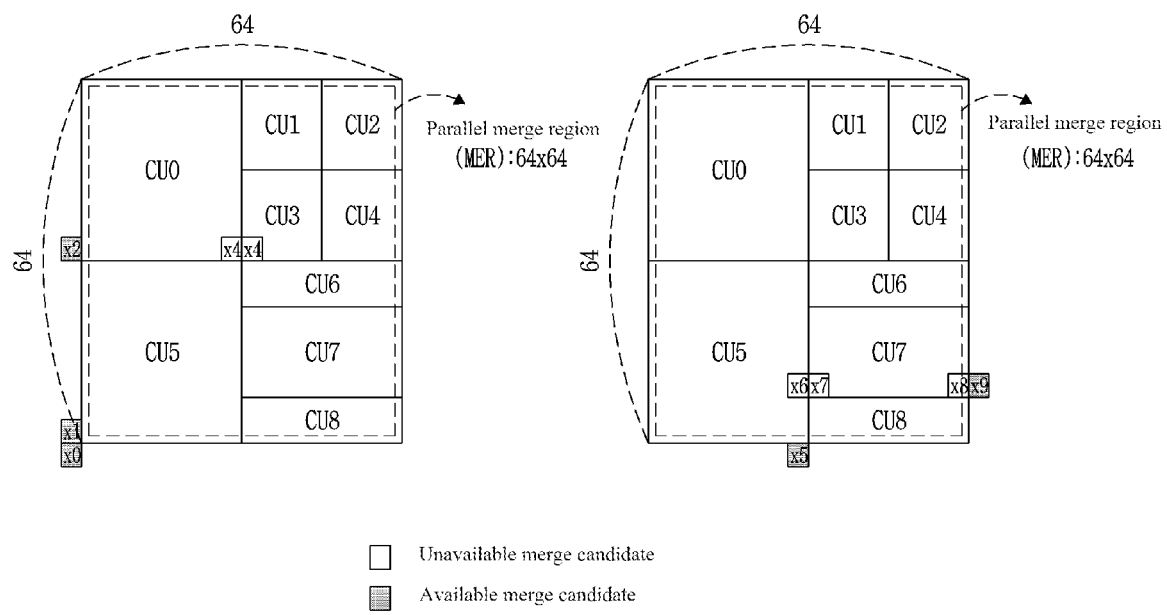
【FIG. 17】
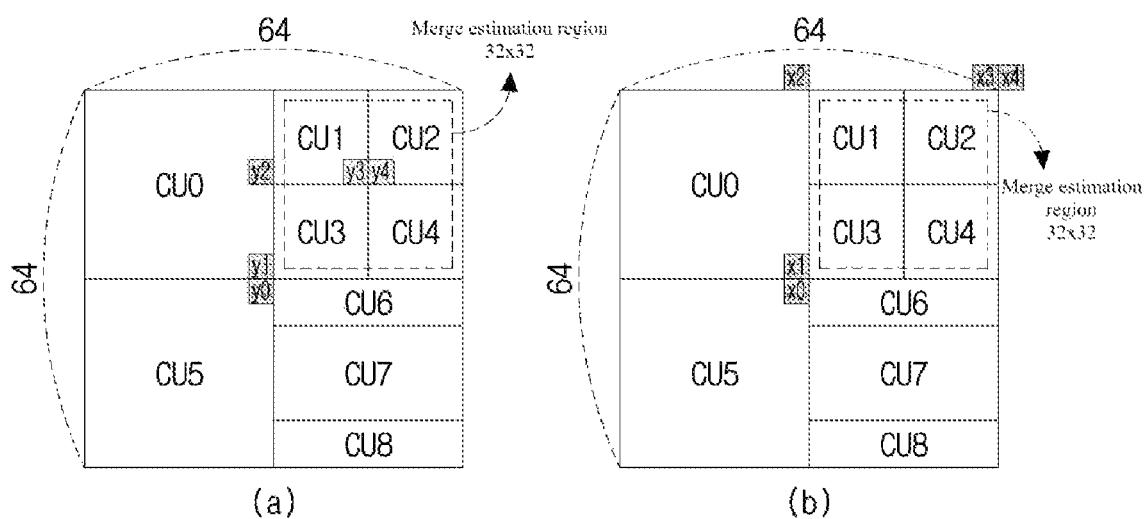

【FIG. 18】
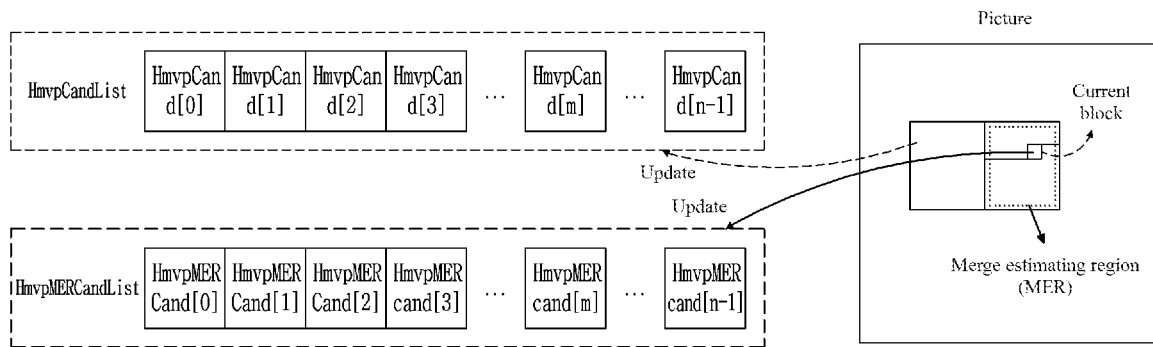
【FIG. 19】
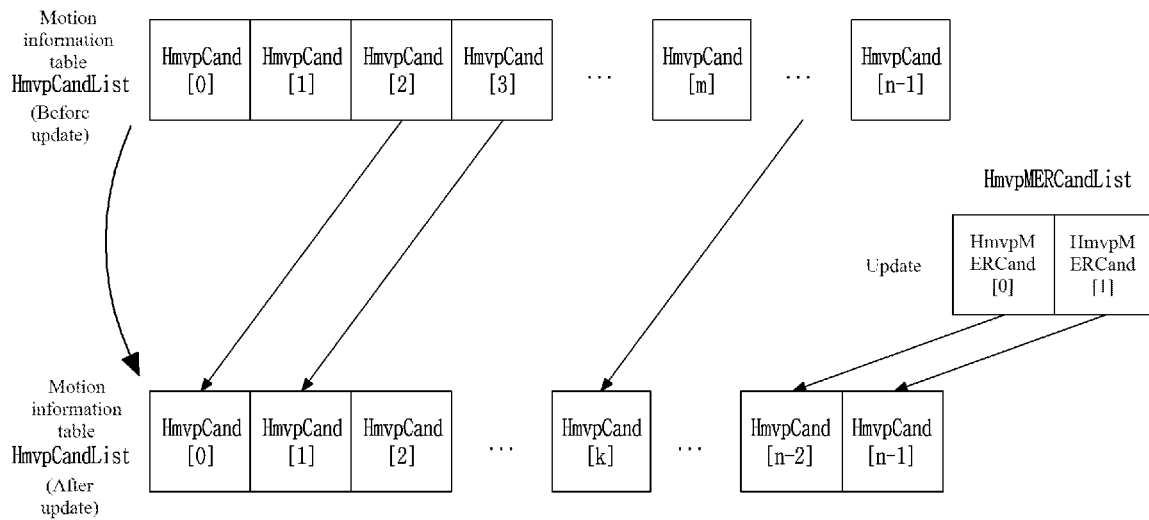
【FIG. 20】
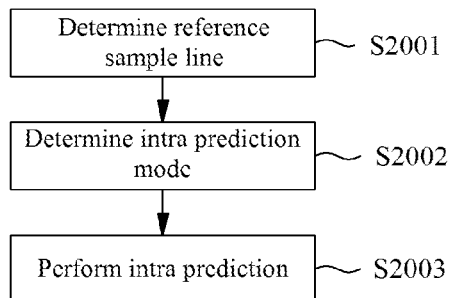

【FIG. 21】
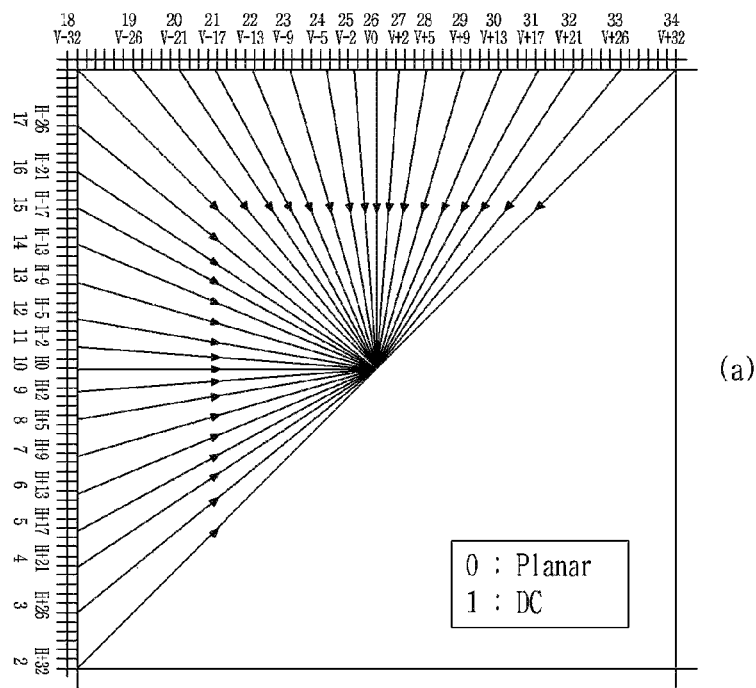
(a)
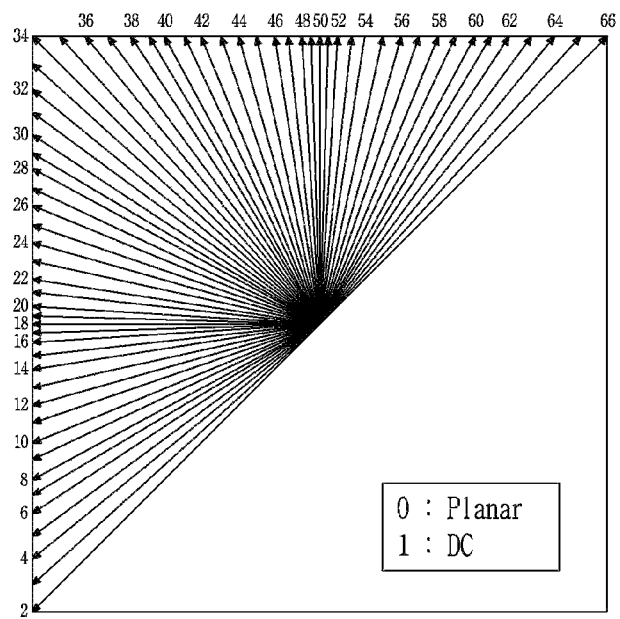
(b)

【FIG. 22】
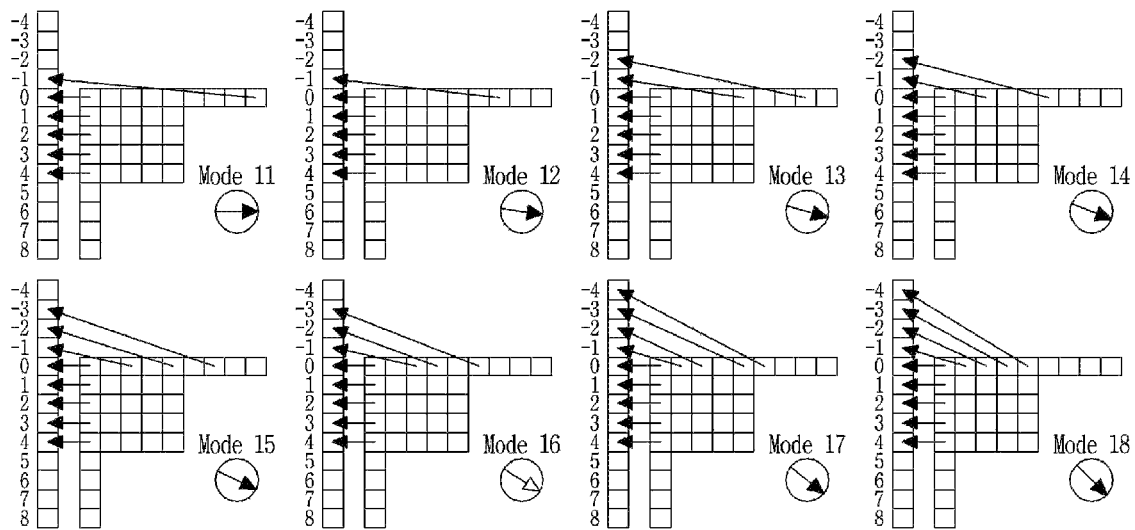
【FIG. 23】
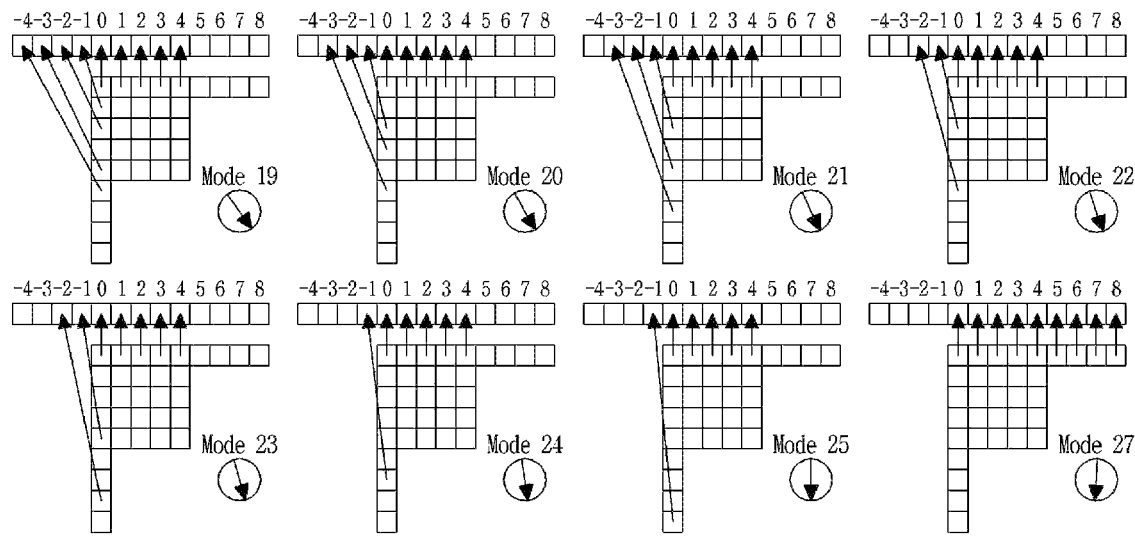

[FIG. 24]
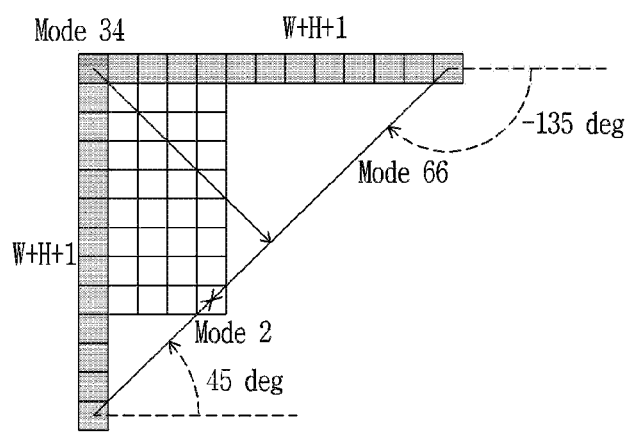
[FIG. 25]
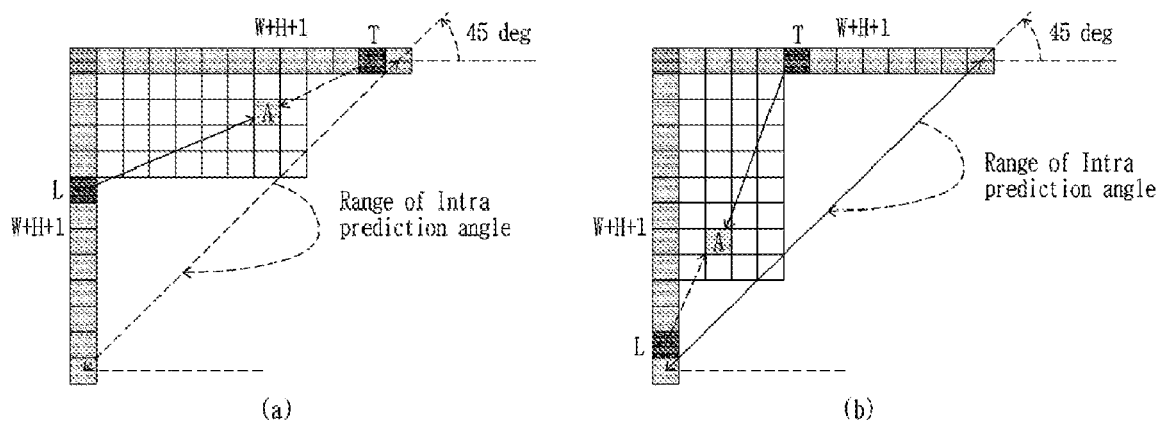

[FIG. 26]
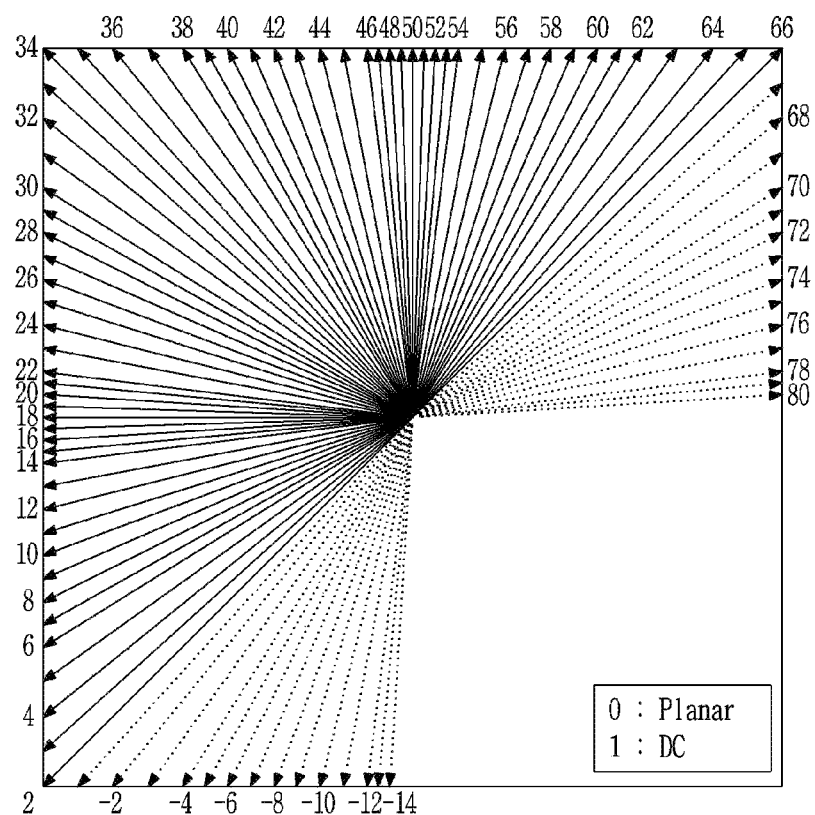

【FIG. 27】
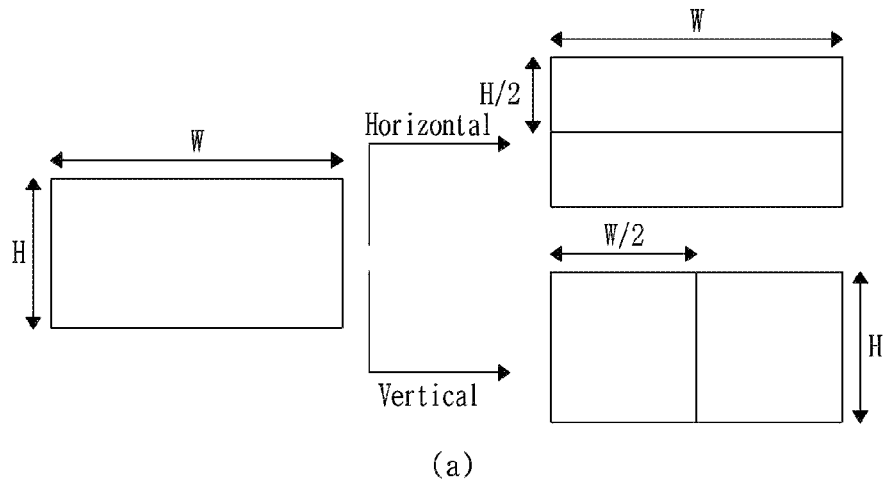
【FIG. 28】
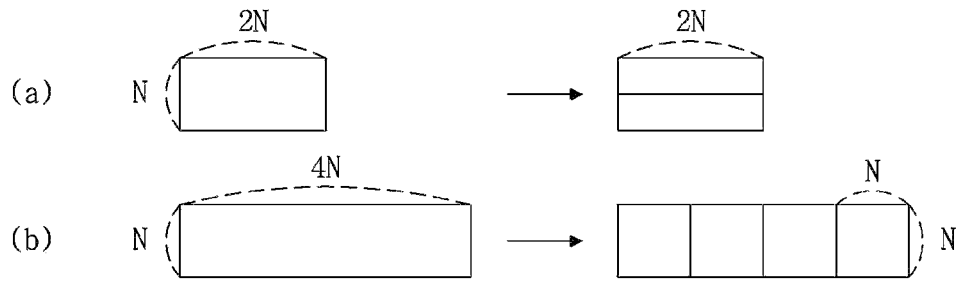

[FIG. 29]
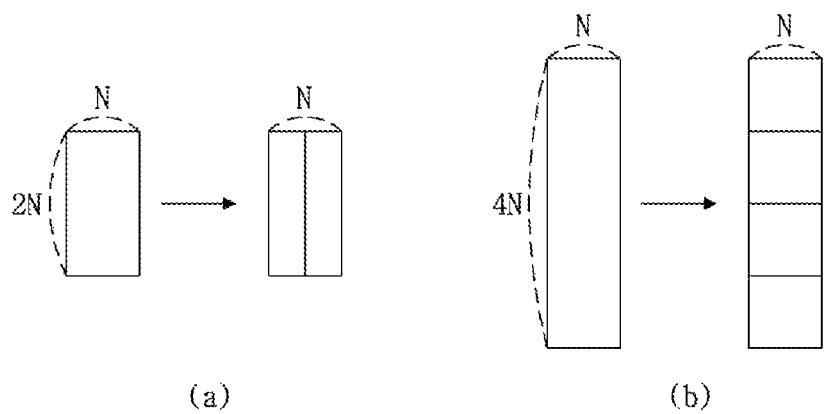
(a)                    (b)
[FIG. 30]
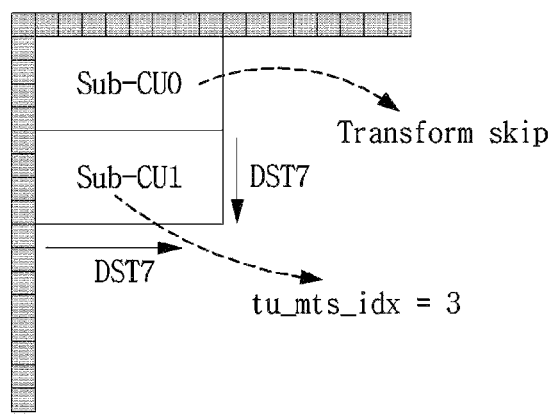

【FIG. 31】
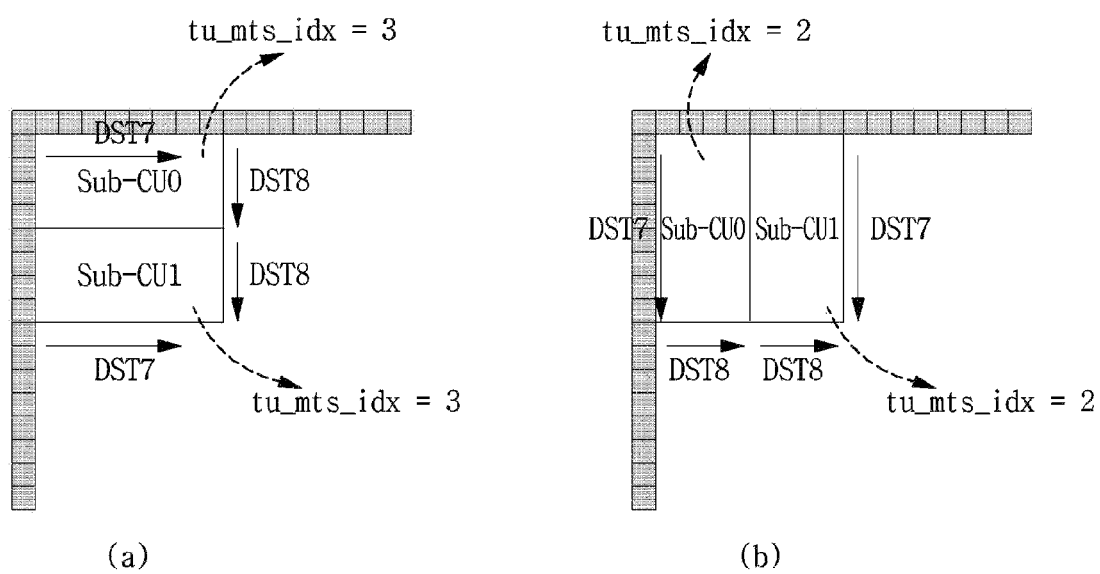
(a)  (b)
【FIG. 32】
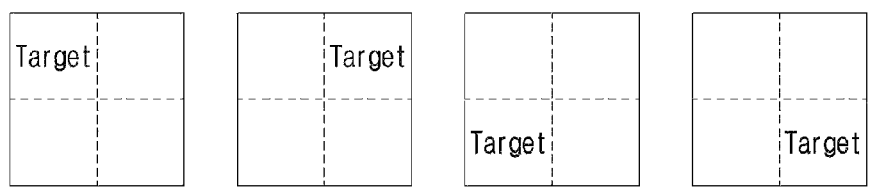
【FIG. 33】
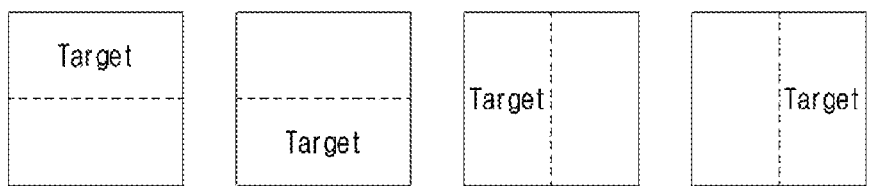

[FIG. 34]
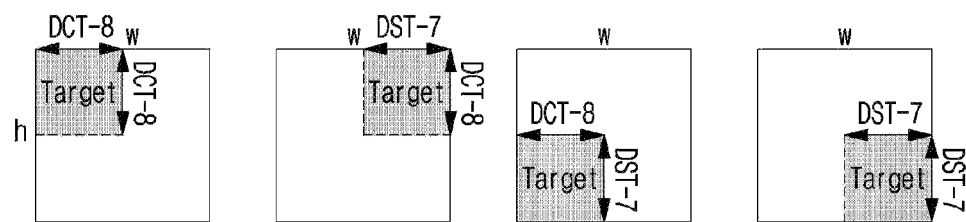
[FIG. 35]
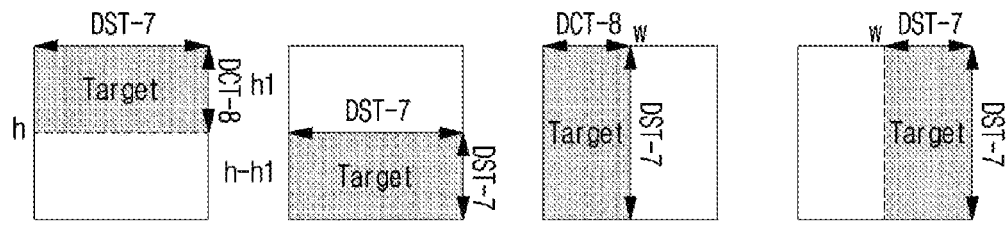

[FIG. 36]
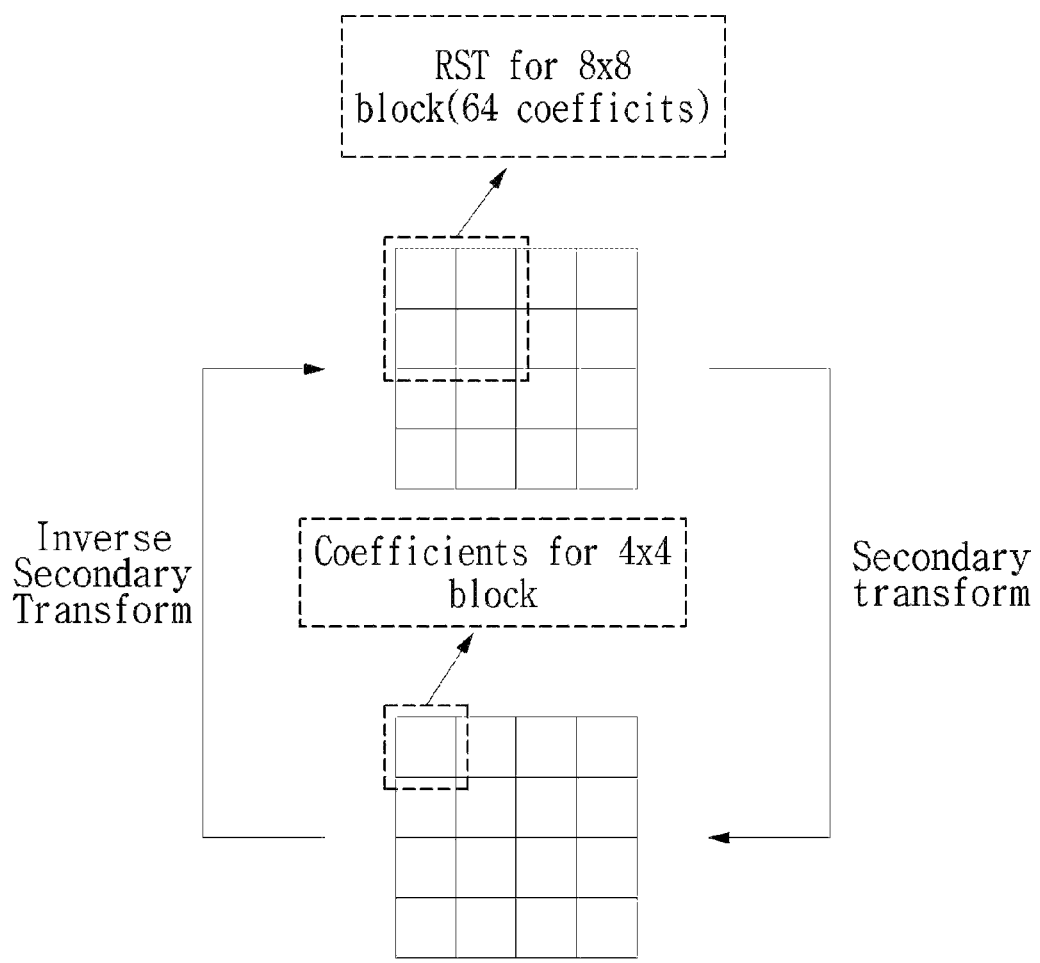

【FIG. 37】
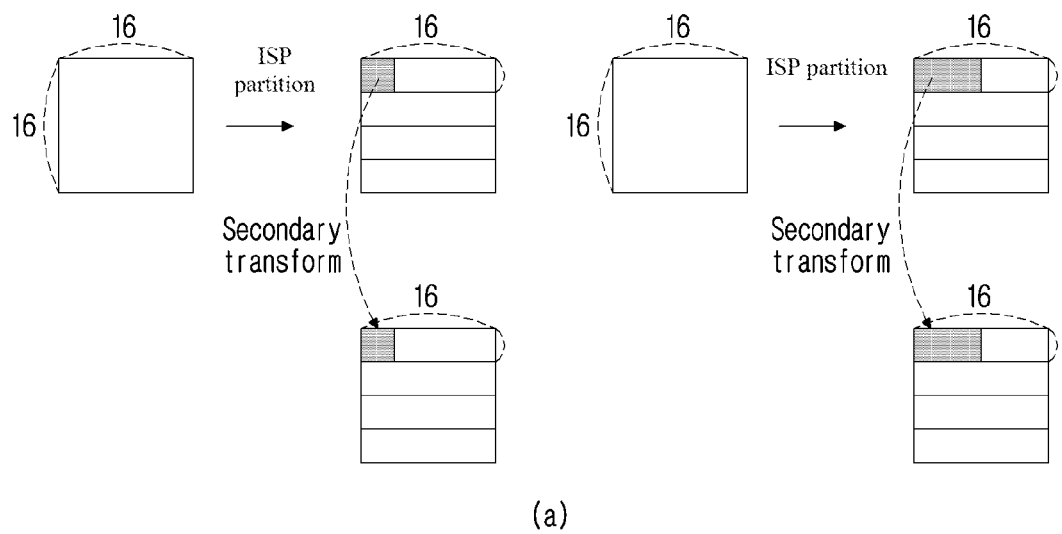
(a)
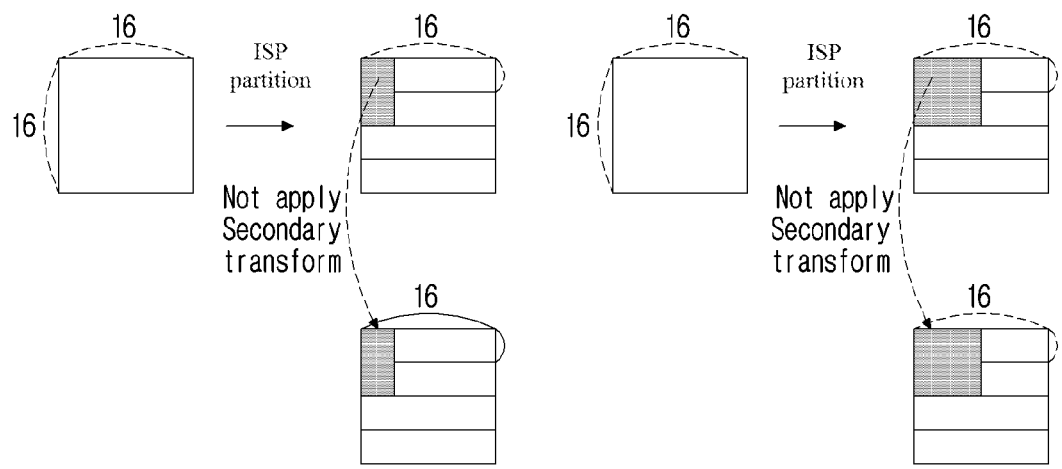
(b)

[FIG. 38]
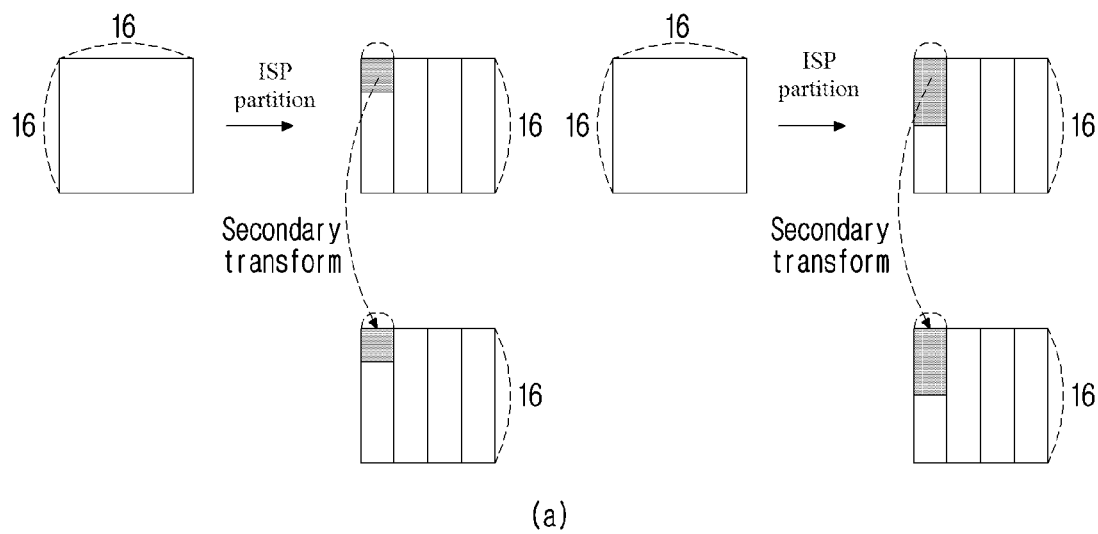
(a)
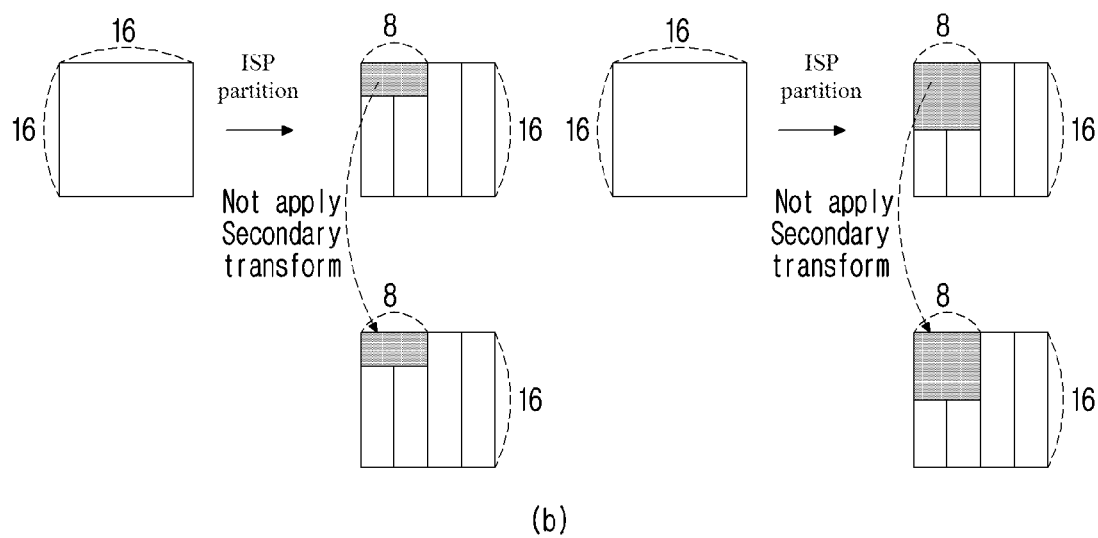
(b)

[FIG. 39]
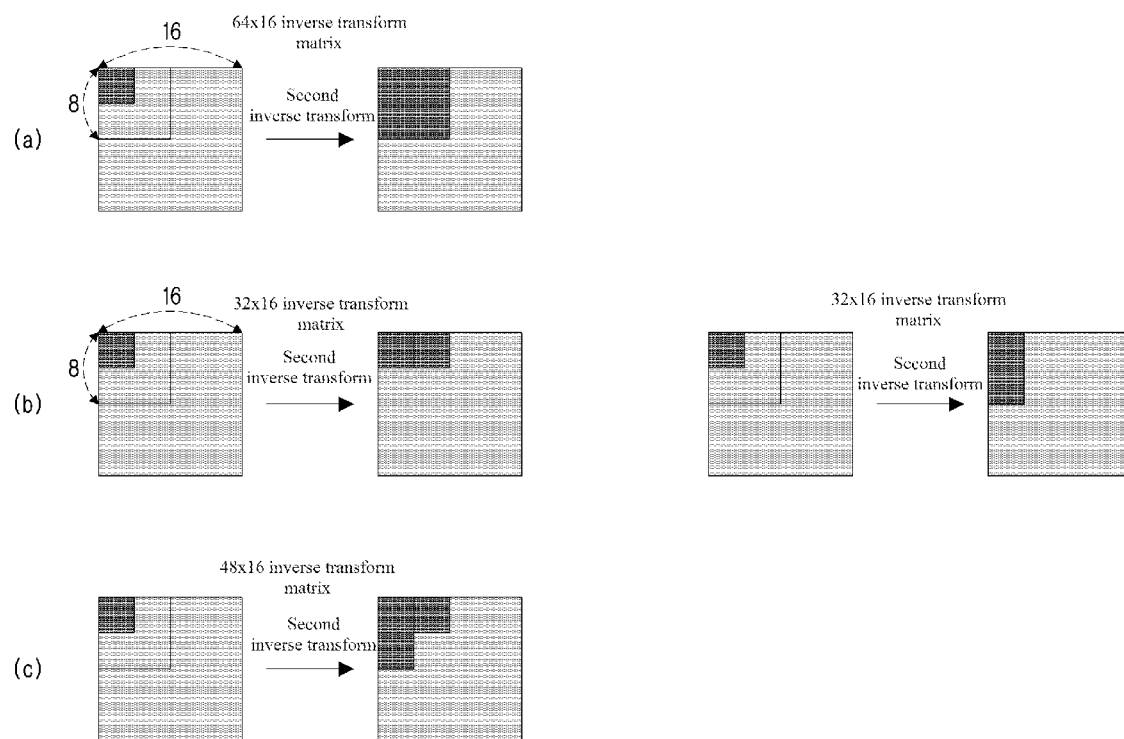

[FIG. 40]
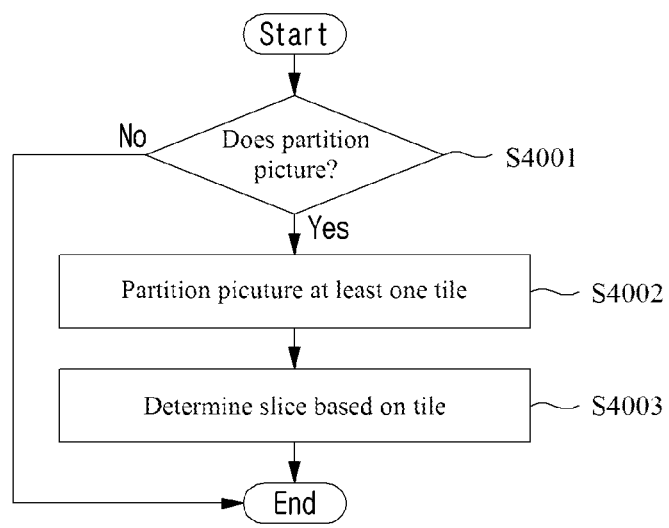

[FIG. 41]
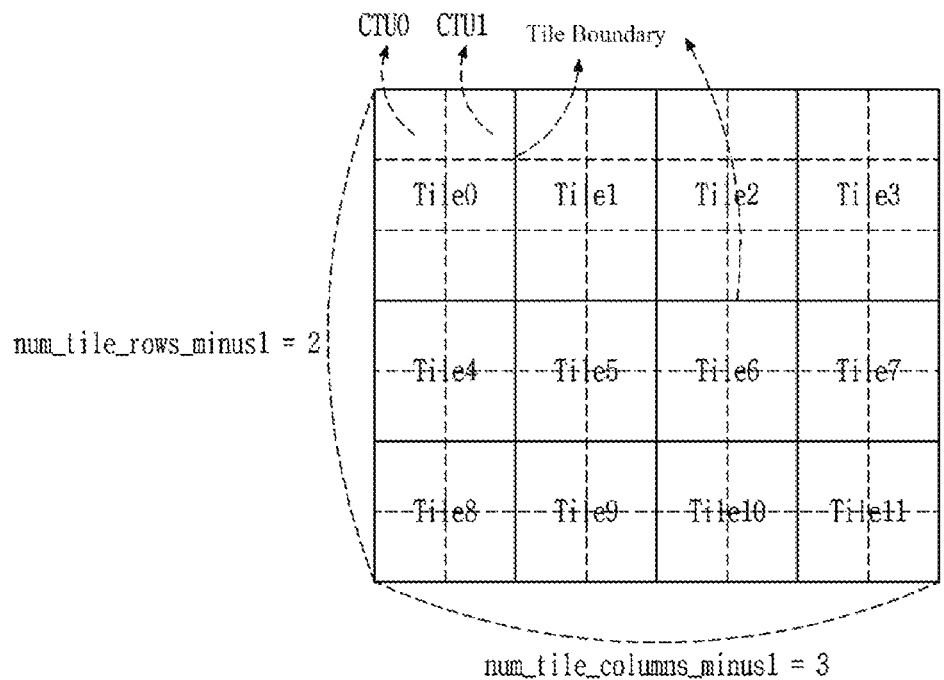
[FIG. 42]
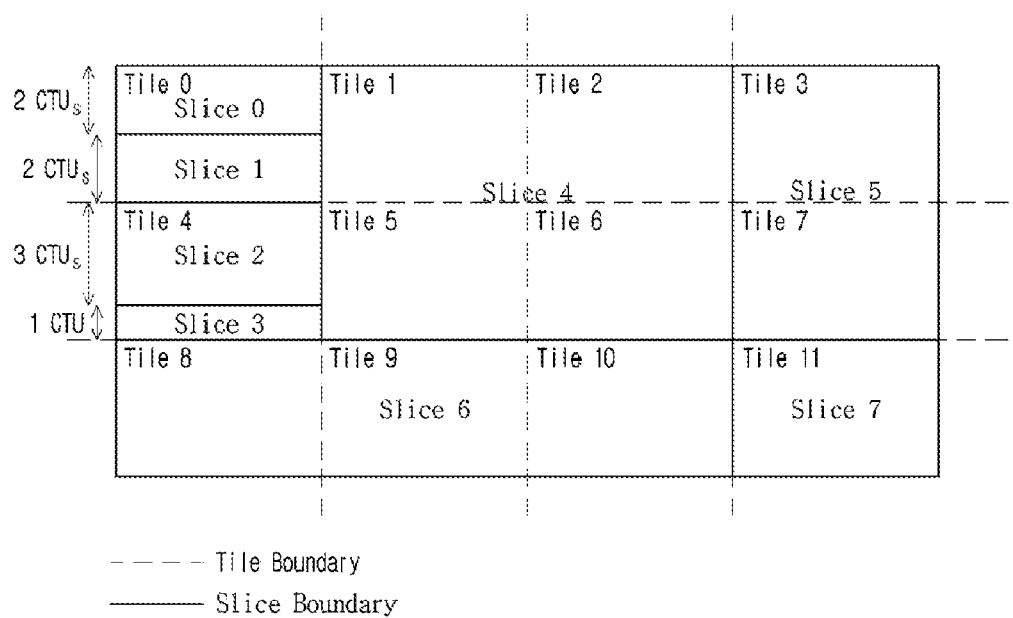

【FIG. 43】
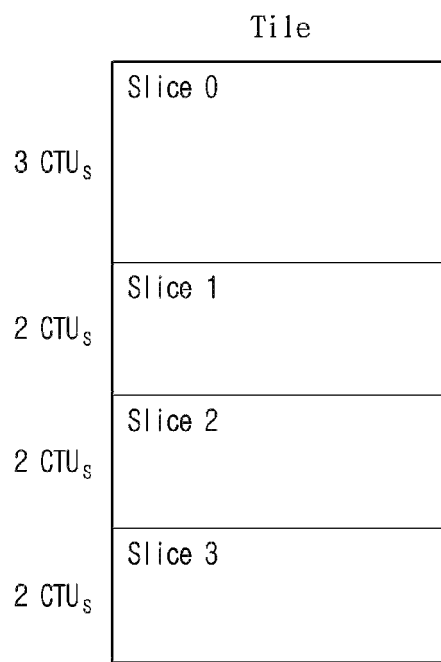
【FIG. 44】
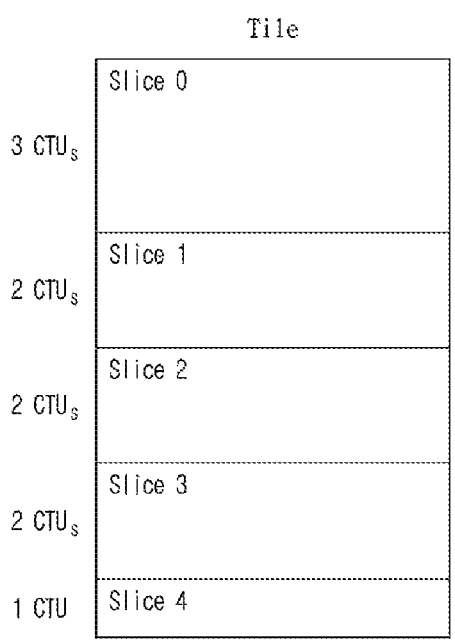

[FIG. 45]
| 0 | 0 | 3 | 3 |
|---|---|---|---|
| 2 | 1 | 3 | 3 |
| 4 | 4 | 3 | 3 |
| 4 | 4 | 5 | 5 |
(a)
| 0 | 0 | 0 | 3 |
|---|---|---|---|
| 2 | 1 | 3 | 3 |
| 4 | 4 | 3 | 3 |
| 4 | 4 | 5 | 5 |
(b)
| 0 | 0 | 0 | 0 |
|---|---|---|---|
| 2 | 1 | 3 | 3 |
| 4 | 4 | 3 | 3 |
| 0 | 0 | 5 | 5 |
(c)
[FIG. 46]
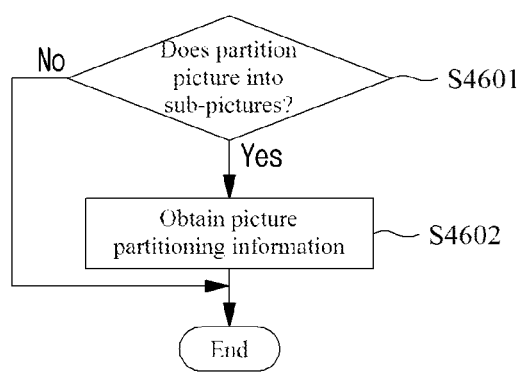

IMAGE SIGNAL ENCODING/DECODING METHOD AND DEVICE THEREFOR

The present application is a continuation application of application Ser. No. 17/473,714, filed Sep. 13, 2021, which is a continuation of PCT International Application No. PCT/KR2020/012250, filed on Sep. 10, 2020, which claims foreign priority to Korean Patent Application No. 10-2019-0112465, filed on Sep. 10, 2019, Korean Patent Application No.: 10-2019-0175282, filed on Dec. 26, 2019, and Korean Patent Application No.: 10-2019-0179609, filed on Dec. 31, 2019, which is hereby incorporated by reference in its entirety.

FIELD OF THE DISCLOSURE

The present disclosure relates to a video signal encoding/decoding method and a device therefor.

DESCRIPTION OF THE RELATED ART

As display panels become larger, video service of higher quality is required. The biggest problem with high-definition video service is that an amount of data is greatly increased. In order to solve the above problem, research for improving the video compression rate is being actively conducted. As a representative example, the Joint Collaborative Team on Video Coding (JCT-VC) was formed in 2009 by the Motion Picture Experts Group (MPEG) and the Video Coding Experts Group (VCEG) under the International Telecommunication Union-Telecommunication (ITU-T). The JCT-VC proposed High Efficiency Video Coding (HEVC), a video compression standard that has about twice compression performance of H.264/AVC, and that was approved as standard on Jan. 25, 2013. However, with rapid development of high-definition video services, the performance of HEVC is gradually showing its limitations.

DISCLOSURE

Technical Purpose

A purpose of the present disclosure is to provide a method in which a picture is partitioned into a plurality of tiles in encoding/decoding a video signal and a device for performing the method.

A purpose of the present disclosure is to provide a method in which a slice partitioning structure is determined based on a tile partitioning structure in encoding/decoding a video signal and a device for performing the method.

A purpose of the present disclosure is to provide a method in which a picture is partitioned into a plurality of sub-pictures in encoding/decoding a video signal and a device for performing the method.

Technical effects of the present disclosure may be non-limited by the above-mentioned effects, and other unmentioned technical effects may be clearly understood from the following description by those having ordinary skill in the technical field to which the present disclosure pertains.

Technical Solution

A video signal decoding method according to the present disclosure includes parsing number information of tile columns representing a value subtracting 1 from the number of tile columns included by an i-th slice, parsing number information of tile rows representing a value subtracting 1 from the number of tile rows included by the i-th slice, and additionally parsing number information related to the number of slices that height information in a tile including the i-th slice is explicitly signaled when both the number information of tile columns and the number information of tile rows are 0.

In a video signal decoding method according to the present disclosure, when an order in a tile of a first slice is smaller than the number of the slices, first height information related to a height of the first slice may be additionally parsed.

In a video signal decoding method according to the present disclosure, when an order in a tile of a second slice is the same as or greater than the number of the slices, the height information may not be parsed for the second slice.

In a video signal decoding method according to the present disclosure, a height of the second slice may be set as the minimum value among a first height value derived based on height information which is signaled last and a second height value excluding a region occupied by previous slices in the tile.

In a video signal decoding method according to the present disclosure, the variable i may be updated to a value adding a value subtracting 1 from the number of the slices.

The characteristics which are simply summarized above for the present disclosure are just an illustrative aspect of a detailed description of the after-described present disclosure and do not limit a range of the present disclosure.

Technical Effects

According to the present disclosure, encoding/decoding efficiency may be improved by partitioning a picture into a plurality of tiles.

According to the present disclosure, encoding/decoding efficiency may be improved by determining a slice partitioning structure based on a tile partitioning structure.

According to the present disclosure, encoding/decoding efficiency may be improved by partitioning a picture into a plurality of sub-pictures.

Effects obtainable from the present disclosure may be non-limited by the above-mentioned effect, and other unmentioned effects may be clearly understood from the following description by those having ordinary skill in the technical field to which the present disclosure pertains.

BRIEF DESCRIPTION OF THE DRAWINGS

FIG. 1 is a view showing a block diagram of a video encoding device (encoder) according to an embodiment of the present disclosure;

FIG. 2 is a view showing a block diagram of a video decoding device (decoder) according to an embodiment of the present disclosure;

FIG. 3 is a view showing a basic coding tree unit according to an embodiment of the present disclosure;

FIG. 4 is a view showing various partitioning types of a coding block.

FIG. 5 is a view of an example showing an aspect of partitioning a CTU.

FIG. 6 is a flow diagram of an inter prediction method according to an embodiment of the present disclosure.

FIG. 7 is a flow diagram of a process deriving the motion information of a current block under a merge mode.

FIG. 8 is a diagram of illustrating candidate blocks used to derive a merge candidate.

FIG. 9 is a diagram of illustrating candidate blocks used to derive a merge candidate.

FIG. 10 is a diagram to explain the update aspect of a motion information table.

FIG. 11 is a diagram showing the update aspect of a motion information table.

FIG. 12 is a diagram showing an example in which the index of a saved motion information candidate is renewed.

FIG. 13 is a diagram showing a position of a representative sub-block.

FIG. 14 is a diagram showing an example in which a redundancy check is performed only for a part of merge candidates.

FIG. 15 is a diagram showing an example in which a redundancy check with a specific merge candidate is omitted.

FIG. 16 is a diagram showing an example in which a candidate block included in the same merge processing region as a current block is set to be unavailable as a merge candidate.

FIG. 17 is a diagram showing an example deriving a merge candidate for a current block when a current block is included in a merge processing region.

FIG. 18 is a diagram showing a temporary motion information table.

FIG. 19 is a diagram showing an example in which a motion information table and a temporary motion information table are unified.

FIG. 20 is a flow diagram of an intra-prediction method according to an embodiment of the present disclosure.

FIG. 21 is a diagram showing intra-prediction modes.

FIGS. 22 and 23 are a diagram showing the example of a one-dimensional array in which reference samples are arranged in a row.

FIG. 24 is a diagram illustrating an angle formed by directional intra-prediction modes with a straight line parallel to an x-axis.

FIG. 25 is a diagram showing an aspect in which a prediction sample is obtained in case that a current block has a non-square shape.

FIG. 26 is a diagram showing wide-angle intra prediction modes.

FIG. 27 is a diagram showing an example of partitioning in a vertical direction and partitioning in a horizontal direction.

FIG. 28 is a diagram showing an example in which a partitioning shape of a coding block is determined.

FIG. 29 is a diagram showing an example in which a partitioning shape of a coding block is determined.

FIG. 30 is a diagram showing an example in which whether transform skip is performed is determined per sub-block.

FIG. 31 is a diagram showing an example in which sub-blocks use the same transform type.

FIGS. 32 and 33 are diagrams showing an application aspect of a sub transform block encoding method.

FIGS. 34 and 35 show a horizontal directional transform type and a vertical directional transform type according to a position of a sub-block targeted for transform.

FIG. 36 is a diagram showing an encoding aspect of a transform coefficient when a reduce factor is 16.

FIGS. 37 and 38 are diagrams illustrating a region targeted for second transform.

FIG. 39 is an example showing a variety of non-separable transform matrix candidates.

FIG. 40 is a diagram showing a picture partitioning method according to an embodiment of the present disclosure.

FIG. 41 shows an example in which a picture is partitioned into a plurality of tiles.

FIG. 42 is a diagram for describing an aspect that size information of a slice is signaled.

FIGS. 43 and 44 are diagrams for describing an encoding aspect of height information of a slice.

FIG. 45 is a diagram for describing a partitioning shape which may be applied to a picture.

FIG. 46 is a flow chart of a method in which a picture is partitioned into at least one sub-picture according to an embodiment of the present disclosure.

MODE FOR INVENTION

Hereinafter, embodiments of the present disclosure will be described in detail with reference to the accompanying drawings.

Image encoding and decoding is performed on a basis of a block. In an example, for a coding block, a transform block, or a prediction block, encoding/decoding processes such as transform, quantization, prediction, in-loop filtering, reconstruction, etc. may be performed.

Hereinafter, an encoding/decoding target block is referred to as a "current block". In an example, a current block may represent a coding block, a transform block, or a prediction block according to a current process of encoding/decoding.

In addition, the term "unit" used in the present specification represents a basis unit for performing a specific encoding/decoding process, and a "block" may be understood to represent a sample array having a predetermined size. Unless otherwise stated, "block" and "unit" may be used interchangeably. In an example, in examples described later, a coding block and a coding unit may be understood to have the same meaning as each other.

FIG. 1 is view showing a block diagram of an image encoding apparatus (encoder) according to an embodiment of the present disclosure.

Referring to FIG. 1, an image encoding apparatus 100 may include a picture partitioning unit 110, prediction units 120 and 125, a transform unit 130, a quantization unit 135, a rearrangement unit 160, an entropy encoding unit 165, a dequantization unit 140, an inverse-transform unit 145, a filter unit 150, and a memory 155.

Components described in FIG. 1 are independently illustrated in order to show different characteristic functions in an image encoding apparatus, and the figure does not mean that each component is constituted by separated hardware or one software unit. That is, each component is just enumerated for convenience of explanation, at least two components of respective components may constitute one component or one component may be partitioned into a plurality of components which may perform their functions. Even an embodiment of integrating respective components and embodiment of dividing a component are also included in the scope of the present disclosure unless they are departing from the spirit of the present disclosure.

Further, some components are not requisite components that perform essential functions of the present disclosure but are optional components for just improving performance. The present disclosure may be implemented with the requisite component for implementing the spirit of the present disclosure other than the component used to just improve the performance and a structure including only the requisite component other than the optional component used to just improve the performance is also included in the scope of the present disclosure.

The picture partitioning unit 110 may partition an input picture into at least one processing unit. In this connection, the processing unit may be a prediction unit (PU), a transform unit (TU), or a coding unit (CU). In the picture partitioning unit 110, a single picture may be partitioned into combinations of a plurality of coding units, prediction units, and transform units, and the picture may be encoded by selecting a combination of the coding units, the prediction units, and the transform units according to a predetermined condition (for example, cost function).

For example, a single picture may be partitioned into a plurality of coding units. In order to partition a picture into coding units, a recursive tree structure such as a quad-tree structure may be used, and a coding unit that is originated from a root such as a single image or largest coding unit may be partitioned into other coding units and may have child nodes as many as the partitioned coding units. A coding unit that is no longer partitioned according to certain restrictions becomes a leaf node. Namely, when it is assumed that only square partitioning is available for a single coding unit, a single coding unit may be partitioned into at most four other coding units.

Hereinafter, in the embodiment of the present disclosure, a coding unit may be used as a unit for encoding or may be used as a unit for decoding.

A prediction unit may be obtained by partitioning a single coding unit into at least one square or rectangle having the same size, or a single coding unit may be partitioned into prediction units in such a manner that one prediction unit may be different from another prediction unit in a shape and/or size.

In generation of a prediction unit based on a coding block to which intra-prediction is being performed, when the coding unit is not the smallest coding unit, intra-prediction may be performed without performing partitioning into a plurality of N×N prediction units.

The prediction units 120 and 125 may include an inter-prediction unit 120 performing inter-prediction and an intra prediction unit 125 performing intra-prediction. Whether to perform inter-prediction or intra-prediction on a prediction unit may be determined, and detailed information (for example, an intra-prediction mode, a motion vector, a reference picture, etc.) according to each prediction method may be determined. In this connection, a processing unit on which prediction is performed may differ with a processing unit for which a prediction method, and detail thereof are determined. For example, a prediction method, a prediction mode, etc. may be determined on the basis of a prediction unit, and prediction may be performed on the basis of a transform unit. A residual value (residual block) between the generated prediction block and an original block may be input to the transform unit 130. In addition, prediction mode information used for prediction, motion vector information, etc. may be encoded using a residual value by the entropy encoding unit 165 and may be transmitted to the decoder. When a specific encoding mode is used, an original block is encoded as it is and transmitted to a decoding unit without generating a prediction block through the prediction unit 120 or 125.

The inter-prediction unit 120 may predict a prediction unit on the basis of information on at least one of a previous picture and a subsequent picture of a current picture, or in some cases, may predict a prediction unit on the basis of information on some encoded regions in the current picture. The inter-prediction unit 120 may include a reference picture interpolation unit, a motion prediction unit, and a motion compensation unit.

The reference picture interpolation unit may receive reference picture information from the memory 155, and generate pixel information of a pixel at an integer or less from the reference picture. In case of a luma pixel, an 8-tap DCT-based interpolation filter having different coefficients may be used so as to generate pixel information on a pixel at an integer or less for a ¼ pixel unit. In case of a chroma signal, a 4-tap DCT-based interpolation filter having different filter coefficients may be used so as to generate pixel information on a pixel at an integer or less for a ⅛ pixel unit.

The motion prediction unit may perform motion prediction based on a reference picture interpolated by the reference picture interpolation unit. As methods for calculating a motion vector, various methods, such as a full search-based block matching algorithm (FBMA), a three step search (TSS) algorithm, a new three-step search (NTS) algorithm, etc. may be used. A motion vector may have a motion vector value in a unit of ½ or ¼ pixel on the basis of the interpolated pixel. The motion prediction unit may predict a current prediction unit by varying a motion prediction method. As motion prediction methods, various methods, such as a skip method, a merge method, an advanced motion vector prediction (AMVP) method, an intra block copy method, etc. may be used.

The intra-prediction unit 125 may generate a prediction unit on the basis of information on a reference pixel around a current block, which is pixel information in a current picture. When a neighboring block of a current prediction unit is a block for which inter-prediction is performed, and thus a reference pixel is a pixel for which inter-prediction is performed, a reference pixel included in the block for which inter-prediction is performed may be replaced by information on a reference pixel of a neighboring block for which intra-prediction is performed. In other words, when a reference pixel is unavailable, at least one reference pixel of available reference pixels may be used in place of unavailable reference pixel information.

A prediction mode in intra-prediction may include a directional prediction mode using reference pixel information according to a prediction direction and a non-directional mode not using directional information when performing prediction. A mode for predicting luma information may be different from a mode for predicting chroma information. In order to predict the chroma information, information on an intra-prediction mode used for predicting the luma information or information on a predicted luma signal may be used.

In performing intra-prediction, when a prediction unit is identical in a size with a transform unit, intra-prediction may be performed on the prediction unit on the basis of pixels positioned at the left, the top-left, and the top of the prediction unit. However, in performing intra-prediction, when a prediction unit is different in a size with a transform unit, intra-prediction may be performed by using a reference pixel based on the transform unit. In addition, intra-prediction using N×N partitioning may be only used for the smallest coding unit.

In an intra-prediction method, a prediction block may be generated after applying an adaptive intra smoothing (AIS) filter to a reference pixel according to a prediction mode. A type of AIS filter applied to a reference pixel may vary. In order to perform an intra-prediction method, an intra prediction mode for a current prediction unit may be predicted from an intra-prediction mode of a prediction unit present around the current prediction unit. In predicting a prediction mode for a current prediction unit by using mode information predicted from a neighboring prediction unit, when an intra prediction mode for the current prediction unit is identical to an intra prediction mode of the neighboring prediction unit, information indicating that the current prediction unit and the neighboring prediction unit have the same prediction mode may be transmitted by using predetermined flag information. When a prediction mode for the current prediction unit is different from prediction modes of the neighboring prediction units, entropy encoding may be performed to encode information on a prediction mode for a current block.

In addition, a residual block may be generated which includes information on a residual value that is a difference value between a prediction unit for which prediction is performed on by the prediction unit 120 or 125, and an original block of the prediction unit. The generated residual block may be input to the transform unit 130.

The transform unit 130 may perform transform on a residual block, which includes information on a residual value between an original block and a prediction unit generated by the prediction unit 120 or 125, by using a transform method such as discrete cosine transform (DCT) or discrete sine transform (DST). In this connection, a DCT transform core includes at least one of DCT2 or DCT8 and a DST transform core includes DST7. Whether to apply DCT, or DST so as to perform transform on a residual block may be determined on the basis of information on an intra-prediction mode of a prediction unit which is used to generate the residual block. It is possible to skip a transform for a residual block. A flag indicating whether or not to skip a transform for a residual block may be encoded. A transform skip may be allowed for a residual block whose a size is smaller than or equal to a threshold value, a residual block of a luma component, or a residual block of a chroma component under 4:4:4 format.

The quantization unit 135 may perform quantization on values transformed into a frequency domain by the transform unit 130. A quantization coefficient may vary according to a block or importance of an image. Values calculated in the quantization unit 135 may be provided to the dequantization unit 140 and the rearrangement unit 160.

The rearrangement unit 160 may perform rearrangement on coefficient values with respect to quantized residual values.

The rearrangement unit 160 may change coefficients in the form of a two-dimensional block into coefficients in the form of a one-dimensional vector through a coefficient scanning method. For example, the rearrangement unit 160 may scan from a DC coefficient to a coefficient in a high frequency domain by using a zigzag scanning method so as to change the coefficients into the form of a one-dimensional vector. According to a size and an intra prediction mode of a transform unit, rather than zigzag scanning, vertical directional scanning where coefficients in the form of a two-dimensional block are scanned in a column direction, or horizontal directional scanning where coefficients in the form of two-dimensional block are scanned in a row direction may be used. In other words, which scanning method among zigzag scanning, vertical directional scanning, and horizontal directional scanning is used may be determined according to a size and an intra prediction mode of a transform unit.

The entropy encoding unit 165 may perform entropy encoding on the basis of values calculated by the rearrangement unit 160. Entropy encoding may use various encoding methods, for example, exponential Golomb coding, context-adaptive variable length coding (CAVLC), or context-adaptive binary arithmetic coding (CABAL).

The entropy encoding unit 165 may encode various types of information, such as information on a residual value coefficient and information on a block type of a coding unit, information on a prediction mode, information on a partitioning unit, information on a prediction unit, information on a partitioning unit, information on a prediction unit and information on a transmission unit, information on a motion vector, information on a reference frame, information on a block interpolation, filtering information, etc. obtained from the rearrangement unit 160 and the prediction units 120 and 125.

The entropy encoding unit 165 may entropy encode coefficients of a coding unit input from the rearrangement unit 160.

The dequantization unit 140 may perform dequantization on values quantized in the quantization unit 135, and the inverse-transform unit 145 may perform inverse-transform on values transformed in the transform unit 130. A residual value generated by the dequantization unit 140 and the inverse-transform unit 145 may be added with a prediction unit predicted by a motion estimation unit, a motion compensation unit, or the intra-prediction unit which are included in the prediction units 120 and 125 so as to generate a reconstructed block.

The filter unit 150 may include at least one of a deblocking filter, an offset correction unit, and an adaptive loop filter (ALF).

The deblocking filter may remove block distortion that occurs due to boundaries between blocks in a reconstructed picture. In order to determine whether or not to perform deblocking, whether or not to apply a deblocking filter to a current block may be determined on the basis of pixels included in several rows and columns included in a block. When a deblocking filter is applied to a block, a strong filter or a weak filter is applied according to required deblocking filtering strength. In addition, in applying a deblocking filter, when performing horizontal directional filtering and vertical directional filtering, horizontal directional filtering and vertical directional filtering may be configured to be processed in parallel.

The offset correction unit may correct an original image by an offset in a unit of a pixel with respect to an image for which deblocking is performed. In order to perform offset correction on a specific picture, a method of applying a offset to a region which is determined after partitioning pixels of the image into the predetermined number of regions, or a method of applying an offset according to edge information of each pixel may be used.

Adaptive loop filtering (ALF) may be performed on the basis of a value obtained by comparing a filtered reconstructed image with an original image. Pixels included in an image may be partitioned into predetermined groups, a filter to be applied to each of the groups may be determined, and filtering may be individually performed on each group. Information on whether or not to apply ALF and may be transmitted for each coding unit (CU) for a luma signal, and a shape and a filter coefficient of an ALF filter to be applied may vary on the basis of each block. Alternatively, an ALF filter having the same shape (fixed shape) may be applied regardless of a feature of a block to which the filter will be applied.

In the memory 155, a reconstructed block or picture calculated through the filter unit 150 may be stored. The stored reconstructed block or picture may be provided to the prediction unit 120 or 125 when performing inter-prediction.

FIG. 2 is view showing a block diagram of an image decoding apparatus (decoder) according to an embodiment of the present disclosure.

Referring to FIG. 2, an image decoding apparatus 200 may include: an entropy decoding unit 210, a rearrangement unit 215, a dequantization unit 220, an inverse-transform unit 225, prediction units 230 and 235, a filter unit 240, and a memory 245.

When an image bitstream is input from the encoder, the input bitstream may be decoded according to an inverse process of the image encoding apparatus.

The entropy decoding unit 210 may perform entropy decoding according to the inverse process of the entropy encoding by the entropy encoding unit of the image encoder. For example, in association with the methods performed by the image encoder apparatus, various methods, such as exponential Golomb coding, context-adaptive variable length coding (CAVLC), or context-adaptive binary arithmetic coding (CABAC) may be applied.

The entropy decoding unit 210 may decode information on intra-prediction and inter-prediction performed by the encoder.

The rearrangement unit 215 may perform rearrangement on the bitstream entropy decoded by the entropy decoding unit 210 on the basis of the rearrangement method used in the encoder. Coefficients represented in the form of a one-dimensional vector may be reconstructed and rearranged into coefficients in the form of a two-dimensional block. The rearrangement unit 215 may perform rearrangement through a method of receiving information related to coefficient scanning performed in the encoder and of inversely scanning on the basis of the scanning order performed in the encoder.

The dequantization unit 220 may perform dequantization on the basis of a quantization parameter received from the encoder and coefficient values of the rearranged block.

The inverse-transform unit 225 may perform, an inverse transform, that is inverse DCT or inverse DST, against to a transform, that is DCT or DST, performed on the quantization result by the transform unit in the image encoder. In this connection, a DCT transform core may include at least one of DCT2 or DCT8, and a DST transform core may include DST7. Alternatively, when the transform is skipped in the image encoder, the inverse-transform also not be performed in the inverse-transform unit 225. Inverse transform may be performed on the basis of a transmission unit determined by the image encoder. The inverse transform unit 225 of the image decoder may selectively perform a transform method (for example, DCT, or DST) according to multiple pieces of information, such as a prediction method, a size of a current block, a prediction direction, etc.

The prediction unit 230 or 235 may generate a prediction block on the basis of information related to a prediction block received from the entropy decoding unit 210 and information on a previously decoded block or picture received from the memory 245.

As described above, as the operation of the image encoder, in performing intra-prediction, when a prediction unit is identical in size with a transform unit, intra-prediction may be performed on the prediction unit on the basis of pixels positioned at the left, the top-left, and the top of the prediction unit. However, in performing intra-prediction, when a prediction unit is different in size with a transform unit, intra-prediction may be performed by using a reference pixel based on the transform unit. In addition, intra-prediction using N×N partitioning may be only used for the smallest coding unit.

The prediction units 230 and 235 may include a PU determination module, an inter-prediction unit, and an intra-prediction unit. The PU determination unit may receive various types of information, such as information on a prediction unit, information on a prediction mode of an intra-prediction method, information on a motion prediction of an inter-prediction method, etc. which are input from the entropy decoding unit 210, divide a prediction unit in a current coding unit, and determine whether inter-prediction or intra-prediction is performed on the prediction unit. By using information required in inter-prediction of a current prediction unit received from the image encoder, the inter-prediction unit 230 may perform inter-prediction on the current prediction unit on the basis of information on at least one of a previous picture and a subsequent picture of a current picture including the current prediction unit. Alternatively, inter-prediction may be performed on the basis of information on some pre-reconstructed regions in a current picture including the current prediction unit.

In order to perform inter-prediction, which method among a skip mode, a merge mode, an AMVP mode, or an intra block copy mode is used as a motion prediction method for a prediction unit included in a coding unit may be determined on the basis of the coding unit.

The intra prediction unit 235 may generate a prediction block on the basis of information on a pixel within a current picture. When a prediction unit is a prediction unit for which intra-prediction has been performed, intra-prediction may be performed on the basis of information on an intra-prediction mode of a prediction unit received from the image encoder. The intra prediction unit 235 may include an adaptive intra smoothing (AIS) filter, a reference pixel interpolation module, or a DC filter. The AIS filter may perform filtering on a reference pixel of a current block, and whether to apply the filter may be determined according to a prediction mode for a current prediction unit. A prediction mode of the prediction unit and information on an AIS filter which are received from the image encoder may be used when performing AIS filtering on a reference pixel of a current block. When a prediction mode for the current block is a mode to which AIS filtering is not applied, the AIS filter may not be applied.

When a prediction mode of a prediction unit is a prediction mode for which intra-prediction is performed on the basis of a pixel value obtained by interpolating reference pixels, the reference pixel interpolation unit may interpolate the reference pixels so as to generate a reference pixel having a unit of an integer or less. When a prediction mode for a current prediction unit is a prediction mode where a prediction block is generated without interpolating reference pixels, the reference pixels may not be interpolated. The DC filter may generate a prediction block through filtering when a prediction mode for a current block is a DC mode.

A reconstructed block or picture may be provided to the filter unit 240. The filter unit 240 may include a deblocking filter, an offset correction module, and an ALF.

Information on whether or not a deblocking filter has been applied to a corresponding block or picture and information on whether a strong filter or a weak filter is applied when the deblocking filter is applied may be received from the image encoder. The deblocking filter of the image decoder may receive information on a deblocking filter from the image encoder, and the image decoder may perform deblocking filtering on a corresponding block.

The offset correction unit may perform offset correction on a reconstructed image on the basis of a type of offset correction, information on an offset value, etc. applied to an image when performing encoding.

The ALF may be applied to a coding unit on the basis of information on whether or not to apply ALF, information on an ALF coefficient, etc. received from the encoder. The above ALF information may be provided by being included in a particular parameter set.

In the memory 245, a reconstructed picture or block may be stored so as to be used as a reference picture or reference block, and the reconstructed picture may be provided to an output unit.

FIG. 3 is a view showing a basic coding tree unit according to an embodiment of the present disclosure.

The largest coding block may be defined as a coding tree block. A single picture may be partitioned into a plurality of coding tree units (CTU). A CTU may be a coding unit of the largest size, and may be referred to as the largest coding unit (LCU). FIG. 3 is a view showing an example where a single picture is partitioned into a plurality of CTUs.

A size of a CTU may be defined in a picture level or sequence level. For the same, information representing a size of a CTU may be signaled through a picture parameter set or sequence parameter set.

In an example, a size of a CTU for the entire picture within a sequence may be set to 128×128. Alternatively, any one of 128×128 or 256×256 may be determined as a size of a CTU in a picture level. In an example, a CTU may be set to have a size of 128×128 in a first picture, and a size of 256×256 in a second picture.

Coding blocks may be generated by partitioning a CTU. A coding block represents a basic unit for performing encoding/decoding. In an example, prediction or transform may be performed for each coding block, or a prediction encoding mode may be determined for each coding block. In this connection, the prediction encoding mode represents a method of generating a prediction image. In an example, a prediction encoding mode may include intra-prediction, inter-prediction, current picture referencing (CPR), intra block copy (IBC) or combined prediction. For a coding block, a prediction block of the coding block may be generated by using a prediction encoding mode of at least one of intra-prediction, inter-prediction, current picture referencing, or combined prediction.

Information representing a prediction encoding mode for a current block may be signaled in a bitstream. In an example, the information may be a 1-bit flag representing whether a prediction encoding mode is an intra mode or an inter mode. When a prediction encoding mode for a current block is determined as an inter mode, current picture referencing or combined prediction may be available.

Current picture referencing is setting a current picture as a reference picture and obtaining a prediction block of a current block from a region that has been already encoded/decoded within a current picture. In this connection, the current picture means a picture including the current block. Information representing whether or not current picture referencing is applied to a current block may be signaled in a bitstream. In an example, the information may be a 1-bit flag. When the flag is TRUE, a prediction encoding mode for a current block may be determined as current picture referencing, and when the flag is FALSE, a prediction encoding mode for a current block may be determined as inter-prediction.

Alternatively, a prediction encoding mode for a current block may be determined on the basis of a reference picture index. In an example, when a reference picture index indicates a current picture, a prediction encoding mode for a current block may be determined as current picture referencing. When a reference picture index indicates a picture other than a current picture, a prediction encoding mode for a current block may be determined as inter-prediction. In other words, current picture referencing is a prediction method using information on a region that has been already encoded/decoded within a current picture, and inter-prediction is a prediction method using information on another picture that has been already encoded/decoded.

Combined prediction represents a combined encoding mode combining at least two of intra-prediction, inter-prediction, and current picture referencing. In an example, when combined prediction is applied, a first prediction block may be generated on the basis of any one of intra-prediction, inter-prediction or current picture referencing, and a second prediction block may be generated on the basis of another. When a first prediction block and a second prediction block are generated, a final prediction block may be generated by calculating an average or weighted sum of the first prediction block and the second prediction block. Information representing whether or not to apply combined prediction to a current block may be signaled in a bitstream. The information may be a 1-bit flag.

FIG. 4 is a view showing various partitioning types a coding block.

A coding block may be partitioned into a plurality of coding blocks on the basis of quad-tree partitioning, binary-tree partitioning or ternary tree partitioning. The partitioned coding block may be partitioned again into a plurality of coding blocks on the basis of quad-tree partitioning, binary-tree partitioning or ternary tree partitioning.

Quad-tree partitioning represents a method of partitioning a current block into four blocks. As a result of quad-tree partitioning, a current block may be partitioned into four square partitions (refer to "SPLIT_QT" of FIG. 4 (a)).

Binary-tree partitioning represents a method of partitioning a current block into two blocks. Partitioning a current block into two blocks along a vertical direction (that is, using a vertical line across the current block) may be referred to vertical directional binary-tree partitioning, and partitioning a current block into two blocks along a horizontal direction (that is, using a horizontal line across the current block) may be referred to as horizontal directional binary-tree partitioning. As a result of binary-tree partitioning, a current block may be partitioned into two non-square partitions. "SPLIT_BT_VER" of FIG. 4 (b) is a view showing a result of vertical directional binary-tree partitioning, and "SPLIT_BT_HOR" of FIG. 4 (c) is a view showing a result of horizontal directional binary-tree partitioning.

Ternary-tree partitioning represents a method of partitioning a current block into three blocks. Partitioning a current block into three blocks along a vertical direction (that is, using two vertical lines across the current block) may be referred to vertical directional ternary-tree partitioning, and partitioning a current block into three blocks along a horizontal direction (that is, using two horizontal lines across the current block) may be referred to as horizontal directional ternary-tree partitioning. As a result of ternary-tree partitioning, a current block may be partitioned into three non-square partitions. In this connection, a width/height of a partition positioned at the center of a current block may be twice than a width/height of other partitions. "SPLIT_TT_VER" of FIG. 4 (d) is a view showing a result of vertical directional ternary-tree partitioning, and "SPLIT_TT_HOR" of FIG. 4 (e) is a view showing a result of horizontal directional ternary-tree partitioning.

The number of partitioning times of a CTU may be defined as a partitioning depth. The maximum partitioning depth of a CTU may be determined in a sequence or picture level. Accordingly, the maximum partitioning depth of a CTU may vary on the basis of a sequence or picture.

Alternatively, the maximum partitioning depth may be independently determined for each partitioning method. In an example, the maximum partitioning depth where quad-tree partitioning is allowed may differ from the maximum partitioning depth where binary-tree partitioning and/or ternary-tree partitioning is allowed.

The encoder may signal information representing at least one of a partitioning type and a partitioning depth of a current block in a bitstream. The decoder may determine a partitioning type and a partitioning depth of a CTU on the basis of the information obtained by parsing a bitstream.

FIG. 5 is a view of an example showing an aspect of partitioning a CTU.

Partitioning a coding block by using quad-tree partitioning, binary-tree partitioning and/or ternary-tree partitioning may be referred to as multi-tree partitioning.

Coding blocks generated by partitioning a coding block by applying multi-tree partitioning may be referred to child coding blocks. When a partitioning depth of a coding block is k, a partitioning depth of child coding blocks is set to k+1.

To the contrary, for coding blocks having a partitioning depth of k+1, a coding block having a partitioning depth of k may be referred to as a parent coding block.

A partitioning type of a current coding block may be determined on the basis of at least one of a partitioning type of a parent coding block and a partitioning type of a neighboring coding block. In this connection, the neighboring coding block may be a block adjacent to a current coding block, and include at least one of an top neighboring block, a left neighboring block, or a neighboring block adjacent to the top-left corner of the current coding block. In this connection, the partitioning type may include whether or not to apply quad-tree partitioning, whether or not to apply binary-tree partitioning, a direction of binary-tree partitioning, whether or not to apply ternary-tree partitioning, or a direction of ternary-tree partitioning.

In order to determine a partitioning type of a coding block, information representing whether or not a coding block is partitioned may be signaled in a bitstream. The information is a 1-bit flag of "split_cu_flag", and when the flag is TRUE, it may represent that a coding block is partitioned by a multi tree partitioning method.

When split_cu_flag is TRUE, information representing whether or not a coding block is partitioned by quad-tree partitioning may be signaled in a bitstream. The information is a 1-bit flag of split_qt_flag, and when the flag is TRUE, a coding block may be partitioned into four blocks.

In an example, in an example shown in FIG. 5, a CTU is partitioned by quad-tree partitioning, and thus four coding blocks having a partitioning depth of 1 are generated. In addition, it is shown that quad-tree partitioning is applied again to the first coding block and the fourth coding block among four coding blocks generated by quad-tree partitioning. As a result, four coding blocks having a partitioning depth of 2 may be generated.

In addition, by applying again quad-tree partitioning to a coding block having a partitioning depth of 2, a coding block having a partitioning depth of 3 may be generated.

When quad-tree partitioning is not applied to a coding block, whether to perform binary-tree partitioning or ternary-tree partitioning for the coding block may be determined according to at least one of a size of the coding block, whether or not the coding block is positioned at a picture boundary, the maximum partitioning depth, or a partitioning type of a neighboring block. When it is determined to perform binary-tree partitioning or ternary-tree partitioning for the coding block, information representing a partitioning direction may be signaled in a bitstream. The information may be a 1-bit flag of mtt_split_cu_vertical_flag. Whether a partitioning direction is a vertical direction or a horizontal direction may be determined on the basis of the flag. Additionally, information representing which one of binary-tree partitioning or ternary-tree partitioning is applied to the coding block may be signaled in a bitstream. The information may be a 1-bit flag of mtt_split_cu_binary_flag. Whether binary-tree partitioning is applied to the coding block or ternary-tree partitioning is applied to the coding block may be determined on the basis of the flag.

In an example, in an example shown in FIG. 5, vertical directional binary-tree partitioning is applied to a coding block having a partitioning depth of 1, vertical directional ternary-tree partitioning is applied to a left coding block among coding blocks generated by the partitioning, and vertical directional binary-tree partitioning is applied to a right coding block.

Inter-prediction is a prediction encoding mode predicting a current block by using information on a previous picture. In an example, a block (hereinafter, collocated block) at the same position with a current block within a previous picture may be set as a prediction block of the current block. Hereinafter, a prediction block generated on the basis of a collocated block of the current block may be referred to as a collocated prediction block.

To the contrary, when an object present in a previous picture has moved to another position in a current picture, a current block may be effectively predicted by using motions of the object. For example, when a motion direction and a size of the object is determined by comparing a previous picture with a current picture, a prediction block (or prediction image) of the current block may be generated according to motion information of the objects. Hereinafter, a prediction block generated by using motion information may be referred to as a motion prediction block.

A residual block may be generated by subtracting a prediction block from a current block. In this connection, in case where an object moves, energy of a residual block may be reduced by using a motion prediction block rather than using a collocated prediction block, and thus compression performance of the residual block may be improved.

As above, generating a prediction block by using motion information may be referred to as motion estimation prediction. In the most inter-prediction, a prediction block may be generated on the basis of motion compensation prediction.

Motion information may include at least one of a motion vector, a reference picture index, a prediction direction, and a bidirectional weighting factor index. A motion vector represents a motion direction of an object and a magnitude. A reference picture index specifies a reference picture of a current block among reference pictures included in a reference picture list. A prediction direction indicates any one of uni-directional L0 prediction, uni-directional L1 prediction, or bidirectional prediction (L0 prediction and L1 prediction). At least one of L0 directional motion information and L1 directional motion information may be used according to a prediction direction of a current block. A bidirectional weighting factor index specifies a weighting factor applied to an L0 prediction block and a weighting factor applied to an L1 prediction block.

FIG. 6 is a flow diagram of an inter-prediction method according to the embodiment of the present disclosure.

In reference to FIG. 6, an inter-prediction method includes determining an inter-prediction mode for a current block (S601), obtaining motion information of the current block according to the determined inter-prediction mode (S602), and performing motion compensation prediction for a current block on the basis of the obtained motion information (S603).

In this connection, the inter-prediction mode may represent various methods for determining motion information of a current block, and include an inter-prediction mode using translation motion information, an inter-prediction mode using affine motion information. In an example, an inter-prediction mode using translation motion information may include a merge mode and a motion vector prediction mode, and an inter-prediction mode using affine motion information may include an affine merge mode and an affine motion vector prediction mode. Motion information on a current block may be determined on the basis of a neighboring block neighboring the current block or information obtained by parsing a bitstream.

Motion information of a current block may be derived from motion information of another block. In this connection, another block may be a block encoded/decoded by inter prediction previous to the current block. Setting motion information of a current block to be the same as motion information of another block may be defined as a merge mode. Also, setting a motion vector of another block as a prediction value of a motion vector of the current block may be defined as a motion vector prediction mode.

FIG. 7 is a flow diagram of a process deriving the motion information of a current block under a merge mode.

The merge candidate of a current block may be derived S701. The merge candidate of a current block may be derived from a block encoded/decoded by inter-prediction prior to a current block.

FIG. 8 is a diagram illustrating candidate blocks used to derive a merge candidate.

The candidate blocks may include at least one of neighboring blocks including a sample adjacent to a current block or non-neighboring blocks including a sample non-adjacent to a current block. Hereinafter, samples determining candidate blocks are defined as base samples. In addition, a base sample adjacent to a current block is referred to as a neighboring base sample and a base sample non-adjacent to a current block is referred to as a non-neighboring base sample.

A neighboring base sample may be included in a neighboring column of a leftmost column of a current block or a neighboring row of an uppermost row of a current block. In an example, when the coordinate of a left-top sample of a current block is (0,0), at least one of a block including a base sample at a position of (−1, H−1), (W−1, −1), (W, −1), (−1, H) or (−1, 1) may be used as a candidate block. In reference to a diagram, the neighboring blocks of index 0 to 4 may be used as candidate blocks.

A non-neighboring base sample represents a sample that at least one of an x-axis distance or a y-axis distance with a base sample adjacent to a current block has a predefined value. In an example, at least one of a block including a base sample that an x-axis distance with a left base sample is a predefined value, a block including a non-neighboring sample that a y-axis distance with a top base sample is a predefined value or a block including a non-neighboring sample that a x-axis distance and a y-axis distance with a left-top base sample are a predefined value may be used as a candidate block. A predefined value may be a natural number such as 4, 8, 12, 16, etc. In reference to a diagram, at least one of blocks in an index 5 to 26 may be used as a candidate block.

A sample not positioned on the same vertical line, horizontal line or diagonal line as a neighboring base sample may be set as a non-neighboring base sample.

Hereinafter, a candidate block including a neighboring base sample among candidate blocks is referred to as a neighboring block and a block including a non-neighboring base sample is referred to as a non-neighboring block.

When a distance between a current block and a candidate block is equal to or greater than a threshold value, the candidate block may be set to be unavailable as a merge candidate. The threshold value may be determined based on a size of a coding tree unit. In an example, a threshold value may be set as a height of a coding tree unit (ctu_height) or a value adding or subtracting an offset to or from a height of a coding tree unit (e.g., ctu_height±N). As a predefined value in an encoder and a decoder, an offset N may be set as 4, 8, 16, 32 or ctu_height.

When a difference between a y-axis coordinate of a current block and a y-axis coordinate of a sample included in a candidate block is greater than a threshold value, a candidate block may be determined to be unavailable as a merge candidate.

Alternatively, a candidate block which does not belong to the same coding tree unit as a current block may be set to be unavailable as a merge candidate. In an example, when a base sample is out of an upper boundary of a coding tree unit to which a current block belongs, a candidate block including the base sample may be set to be unavailable as a merge candidate.

If an upper boundary of a current block borders an upper boundary of a coding tree unit, a plurality of candidate blocks may be determined to be unavailable as a merge candidate to reduce encoding/decoding efficiency of a current block. To resolve such a problem, candidate blocks may be set so that the number of candidate blocks at a left position of a current block is larger than the number of candidate blocks at a top position of a current block.

FIG. 9 is a diagram of illustrating candidate blocks used to derive a merge candidate.

As in an example shown in FIG. 9, top blocks belonging to N top block columns of a current block and left blocks belonging to M left block columns of a current block may be set as candidate blocks. In this case, the number of left candidate blocks may be set to be greater than the number of top candidate blocks by setting M to be greater than N.

In an example, a difference between a y-axis coordinate of a base sample in a current block and a y-axis coordinate of a top block which may be used as a candidate block may be set not to exceed N times a height of a current block. In addition, a difference between a y-axis coordinate of a base sample in a current block and a y-axis coordinate of a left block which may be used as a candidate block may be set not to exceed M times a width of a current block.

In an example, in an example shown in FIG. 9, it was shown that blocks belonging to 2 top block columns of a current block and blocks belonging to 5 left block columns of a current block are set as candidate blocks.

A merge candidate may be derived from a temporal neighboring block included in a picture different from a current block. In an example, a merge candidate may be derived from a collocated block included in a collocated picture. Any one of reference pictures included in a reference picture list may be set as a collocated picture. Index information identifying a collocated picture among reference pictures may be signaled in a bitstream. Alternatively, a reference picture having a predefined index among reference pictures may be determined as a collocated picture.

The motion information of a merge candidate may be set the same as the motion information of a candidate block. In an example, at least one of a motion vector, a reference picture index, a prediction direction or a bidirectional weight index of a candidate block may be set as the motion information of a merge candidate.

A merge candidate list including a merge candidate may be generated S702.

The index of merge candidates in a merge candidate list may be assigned according to the predetermined order. In an example, an index may be assigned in the order of a merge candidate derived from a left neighboring block, a merge candidate derived from a top neighboring block, a merge candidate derived from a right-top neighboring block, a merge candidate derived from a left-bottom neighboring block, a merge candidate derived from a left-top neighboring block and a merge candidate derived from a temporal neighboring block.

When a plurality of merge candidates are included in a merge candidate, at least one of a plurality of merge candidates may be selected S703. Concretely, information for specifying any one of a plurality of merge candidates may be signaled in a bitstream. In an example, information, merge_idx, representing an index of any one of merge candidates included in a merge candidate list may be signaled in a bitstream.

When the number of merge candidates included in a merge candidate list is less than the threshold, a motion information candidate included in a motion information table may be added to a merge candidate list as a merge candidate. In this connection, the threshold may be the maximum number of merge candidates which may be included in a merge candidate list or a value in which an offset is subtracted from the maximum number of merge candidates. An offset may be a natural number such as 1 or 2, etc.

A motion information table includes a motion information candidate derived from a block encoded/decoded based on inter-prediction in a current picture. In an example, the motion information of a motion information candidate included in a motion information table may be set the same as the motion information of a block encoded/decoded based on inter-prediction. In this connection, motion information may include at least one of a motion vector, a reference picture index, a prediction direction or a bidirectional weight index.

A motion information candidate included in a motion information table also can be referred to as a inter region merge candidate or a prediction region merge candidate.

The maximum number of a motion information candidate which may be included in a motion information table may be predefined in an encoder and a decoder. In an example, the maximum number of a motion information candidate which may be included in a motion information table may be 1, 2, 3, 4, 5, 6, 7, 8 or more (e.g. 16).

Alternatively, information representing the maximum number of a motion information candidate which may be included in a motion information table may be signaled in a bitstream. The information may be signaled in a sequence, a picture or a slice level. The information may represent the maximum number of a motion information candidate which may be included in a motion information table. Alternatively, the information may represent difference between the maximum number of a motion information candidate which may be included in a motion information table and the maximum number of a merge candidate which may be included in a merge candidate list.

Alternatively, the maximum number of a motion information candidate which may be included in a motion information table may be determined according to a picture size, a slice size or a coding tree unit size.

A motion information table may be initialized in a unit of a picture, a slice, a tile, a brick, a coding tree unit or a coding tree unit line (a row or a column). In an example, when a slice is initialized, a motion information table is also initialized thus a motion information table may not include any motion information candidate.

Alternatively, information representing whether a motion information table will be initialized may be signaled in a bitstream. The information may be signaled in a slice, a tile, a brick or a block level. Until the information indicates the initialization of a motion information table, a pre-configured motion information table may be used.

Alternatively, information on an initial motion information candidate may be signaled in a picture parameter set or a slice header. Although a slice is initialized, a motion information table may include an initial motion information candidate. Accordingly, an initial motion information candidate may be used for a block which is the first encoding/decoding target in a slice.

Alternatively, a motion information candidate included in the motion information table of a previous coding tree unit may be set as an initial motion information candidate. In an example, a motion information candidate with the smallest index or with the largest index among motion information candidates included in the motion information table of a previous coding tree unit may be set as an initial motion information candidate.

Blocks are encoded/decoded in the order of encoding/decoding, and blocks encoded/decoded based on inter-prediction may be sequentially set as a motion information candidate in the order of encoding/decoding.

FIG. 10 is a diagram to explain the update aspect of a motion information table.

For a current block, when inter-prediction is performed S1001, a motion information candidate may be derived based on a current block S1002. The motion information of a motion information candidate may be set the same as that of a current block.

When a motion information table is empty S1003, a motion information candidate derived based on a current block may be added to a motion information table S1004.

When a motion information table already includes a motion information candidate S1003, a redundancy check for the motion information of a current block (or, a motion information candidate derived based on it) may be performed S1005. A redundancy check is to determine whether the motion information of a pre-stored motion information candidate in a motion information table is the same as the motion information of a current block. A redundancy check may be performed for all pre-stored motion information candidates in a motion information table. Alternatively, a redundancy check may be performed for motion information candidates with an index over or below the threshold among pre-stored motion information candidates in a motion information table. Alternatively, a redundancy check may be performed for the predefined number of motion information candidates. In an example, 2 motion information candidates with smallest indexes or with largest indexes may be determined as targets for a redundancy check.

When a motion information candidate with the same motion information as a current block is not included, a motion information candidate derived based on a current block may be added to a motion information table S1008. Whether motion information candidates are identical may be determined based on whether the motion information (e.g. a motion vector/a reference picture index, etc.) of motion information candidates is identical.

In this connection, when the maximum number of motion information candidates are already stored in a motion information table S1006, the oldest motion information candidate may be deleted S1007 and a motion information candidate derived based on a current block may be added to a motion information table S1008. In this connection, the oldest motion information candidate may be a motion information candidate with the largest or the smallest index.

Motion information candidates may be identified by respective index. When a motion information candidate derived from a current block is added to a motion information table, the smallest index (e.g. 0) may be assigned to the motion information candidate and indexes of pre-stored motion information candidates may be increased by 1. In this connection, When the maximum number of motion information candidates are already stored in a motion information table, a motion information candidate with the largest index is removed.

Alternatively, when a motion information candidate derived from a current block is added to a motion information table, the largest index may be assigned to the motion information candidate. In an example, when the number of pre-stored motion information candidates in a motion information table is less than the maximum value, an index with the same value as the number of pre-stored motion information candidates may be assigned to the motion information candidate. Alternatively, when the number of pre-stored motion information candidates in a motion information table is equal to the maximum value, an index subtracting 1 from the maximum value may be assigned to the motion information candidate. Alternatively, a motion information candidate with the smallest index is removed and the indexes of residual pre-stored motion information candidates are decreased by 1.

FIG. 11 is a diagram showing the update aspect of a motion information table.

It is assumed that as a motion information candidate derived from a current block is added to a motion information table, the largest index is assigned to the motion information candidate. In addition, it is assumed that the maximum number of a motion information candidate is already stored in a motion information table.

When a motion information candidate HmvpCand[n+1] derived from a current block is added to a motion information table HmvpCandList, a motion information candidate HmvpCand[0] with the smallest index among pre-stored motion information candidates may be deleted and indexes of residual motion information candidates may be decreased by 1. In addition, the index of a motion information candidate HmvpCand[n+1] derived from a current block may be set to the maximum value (for an example shown in FIG. 11, n).

When a motion information candidate identical to a motion information candidate derived based on a current block is prestored S1005, a motion information candidate derived based on a current block may not be added to a motion information table S1009.

Alternatively, while a motion information candidate derived based on a current block is added to a motion information table, a pre-stored motion information candidate identical to the motion information candidate may be removed. In this case, it causes the same effect as when the index of a pre-stored motion information candidate is newly updated.

FIG. 12 is a diagram showing an example in which the index of a pre-stored motion information candidate is updated.

When the index of a pre-stored motion information candidate identical to a motion information candidate mvCand derived from a current block is hIdx, the pre-stored motion information candidate may be removed and the index of motion information candidates with an index larger than hIdx may be decreased by 1. In an example, an example shown in FIG. 12 showed that HmvpCand[2] identical to mvCand is deleted in a motion information table HvmpCandList and an index from HmvpCand[3] to HmvpCand[n] is decreased by 1.

And, a motion information candidate mvCand derived based on a current block may be added to the end of a motion information table.

Alternatively, an index assigned to a pre-stored motion information candidate identical to a motion information candidate derived based on a current block may be updated. For example, the index of a pre-stored motion information candidate may be changed to the minimum value or the maximum value.

The motion information of blocks included in a predetermined region may be set not to be added to a motion information table. In an example, a motion information candidate derived based on the motion information of a block included in a merge processing region may not be added to a motion information table. Since the encoding/decoding order for blocks included in a merge processing region is not defined, it is improper to use motion information of any one of them for the inter-prediction of another of them. Accordingly, motion information candidates derived based on blocks included in a merge processing region may not be added to a motion information table.

Alternatively, the motion information of a block smaller than a preset size may be set not to be added to a motion information table. In an example, a motion information candidate derived based on the motion information of a coding block whose width or height is smaller than 4 or 8 or the motion information of a 4×4 sized coding block may not be added to a motion information table.

When motion compensation prediction is performed in a unit of a sub-block, a motion information candidate may be derived based on motion information of a representative sub-block among a plurality of sub-blocks included in a current block. In an example, when a sub-block merge candidate is used for a current block, a motion information candidate may be derived based on motion information of a representative sub-block among sub-blocks.

A motion vector of sub-blocks may be derived in the following order. First, one of merge candidates included in a merge candidate list of a current block may be selected and an initial shift vector (shVector) may be derived based on a motion vector of a selected merge candidate. And, a shift sub-block that a position of a base sample is (xColSb, yColSb) may be derived by adding an initial shift vector to a position (xSb, ySb) of a base sample (e.g., a top-left sample or a central sample) of each sub-block in a coding block. The following Equation 1 shows an equation for deriving a shift sub-block.

$$(xColSb, yColSb) = (xSb + shVector[0] >> 4, ySb + shVector[1] >> 4) \quad \text{[Equation 1]}$$

Then, a motion vector of a collocated block corresponding to a central position of a sub-block including (xColSb, yColSb) may be set as a motion vector of a sub-block including (xSb, ySb).

A representative sub-block may mean a sub-block including a top-left sample, a central sample, a bottom-right sample, a top-right sample or a bottom-left sample of a current block.

FIG. 13 is a diagram showing a position of a representative sub-block.

FIG. 13 (a) represents an example in which a sub-block at a top-left position of a current block is set as a representative sub-block and FIG. 13 (b) represents an example in which a sub-block at a central position of a current block is set as a representative sub-block. When motion compensation prediction is performed in a unit of a sub-block, a motion information candidate of a current block may be derived based on a motion vector of a sub-block including a top-left sample of a current block or a sub-block including a central sample of a current block.

Based on the inter-prediction mode of a current block, it may be determined whether a current block will be used as a motion information candidate. In an example, a block encoded/decoded based on an affine motion model may be set to be unavailable as a motion information candidate. Accordingly, although a current block is encoded/decoded by inter-prediction, a motion information table may not be updated based on a current block when the inter-prediction mode of a current block is an affine prediction mode.

Alternatively, whether a current block will be used as a motion information candidate may be determined based on at least one of motion vector resolution of a current block, whether a merge offset encoding method is applied, whether combined prediction is applied or whether triangular partitioning is applied. In an example, a current block may be set to be unavailable as a motion information candidate for at least one of a case when motion information resolution of a current block is equal to or greater than 2 integer-pel, a case when combined prediction is applied to a current block, when triangular partitioning is applied to a current block or a case when a merge offset encoding method is applied to a current block.

Alternatively, a motion information candidate may be derived based on a sub-block vector of at least one of sub-blocks included in a block which is encoded/decoded based on an affine motion model. In an example, a motion information candidate may be derived by using a sub-block at a top-left position of a current block, a sub-block at a central position or a sub-block at a top-right position. Alternatively, an average value of sub-block vectors of a plurality of sub-blocks may be set as a motion vector of a motion information candidate.

When the number of a merge candidate included in the merge candidate list of a current block is less than the threshold, a motion information candidate included in a motion information table may be added to a merge candidate list as a merge candidate. The additional process is performed in the order reflecting sorted order of indexes of motion information candidates in ascending or descending order. In an example, a motion information candidate with the largest index may be first added to the merge candidate list of a current block.

When a motion information candidate included in a motion information table is added to a merge candidate list, a redundancy check between a motion information candidate and pre-stored merge candidates in the merge candidate list may be performed. As a result of a redundancy check, a motion information candidate with the same motion information as a pre-stored merge candidate may not be added to the merge candidate list.

A redundancy check may be performed only for a part of motion information candidates included in a motion information table. In an example, a redundancy check may be performed only for a motion information candidate with an index over or below the threshold. Alternatively, a redundancy check may be performed only for N motion information candidates with the largest index or the smallest index. Alternatively, a redundancy check may be performed only for a part of pre-stored merge candidates in a merge candidate list. In an example, a redundancy check may be performed only for a merge candidate whose index is over or below the threshold or a merge candidate derived from a block at a specific position. In this connection, a specific position may include at least one of the left neighboring block, the top neighboring block, the right-top neighboring block or the left-bottom neighboring block of a current block.

FIG. 14 is a diagram showing an example in which a redundancy check is performed only for a part of merge candidates.

When a motion information candidate HmvpCand[j] is added to a merge candidate list, a redundancy check with 2 merge candidates with the largest index, mergeCandList[NumMerge-2] and mergeCandList[NumMerge-1], may be performed for a motion information candidate. In this connection, NumMerge may show the number of an available spatial merge candidate and a temporal merge candidate.

Unlike a shown example, when a motion information candidate HmvpCand[j] is added to a merge candidate list, a redundancy check with 2 merge candidates with the smallest index may be performed for a motion information candidate. For example, it may be checked whether mergeCandList[0] and mergeCandList[1] are identical to HmvpCand[j].

Alternatively, a redundancy check may be performed only for a merge candidate derived from a specific position. In an example, a redundancy check may be performed for at least one of a merge candidate derived from a neighboring block positioned at the left of a current block or at the top of a current block. When there is no merge candidate derived from a specific position in a merge candidate list, a motion information candidate may be added to a merge candidate list without a redundancy check.

When a motion information candidate HmvpCand[j] is added to a merge candidate list, a redundancy check with 2 merge candidates with the largest index, mergeCandList[NumMerge-2] and mergeCandList[NumMerge-1], may be performed for a motion information candidate. In this connection, NumMerge may show the number of an available spatial merge candidate and a temporal merge candidate.

A redundancy check with a merge candidate may be performed only for a part of motion information candidates. In an example, a redundancy check may be performed only for N motion information candidates with a large or a small index among motion information candidates included in a motion information table. In an example, a redundancy check may be performed only for motion information candidates with an index that the number and difference of motion information candidates included in a motion information table are below the threshold. When the threshold is 2, a redundancy check may be performed only for 3 motion information candidates with the largest index value among motion information candidates included in a motion information table. A redundancy check may be omitted for motion information candidates except for the above 3 motion information candidates. When a redundancy check is omitted, a motion information candidate may be added to a merge candidate list regardless of whether the same motion information as a merge candidate is exist or not.

Conversely, a redundancy check is set to be performed only for motion information candidates with an index that the number and difference of motion information candidates included in a motion information table are over the threshold.

The number of a motion information candidate that a redundancy check is performed may be redefined in an encoder and a decoder. In an example, the threshold may be an integer such as 0, 1 or 2.

Alternatively, the threshold may be determined based on at least one of the number of a merge candidate included in a merge candidate list or the number of motion information candidates included in a motion information table.

When a merge candidate identical to the first motion information candidate is found, a redundancy check with the merge candidate identical to the first motion information candidate may be omitted in a redundancy check for the second motion information candidate.

FIG. 15 is a diagram showing an example in which a redundancy check with a specific merge candidate is omitted.

When a motion information candidate HmvpCand[i] whose index is i is added to a merge candidate list, a redundancy check between the motion information candidate and pre-stored merge candidates in a merge candidate list is performed. In this connection, when a merge candidate mergeCandlist[j] identical to a motion information candidate HmvpCand[i] is found, a redundancy check between a motion information candidate HmvpCand[i-1] whose index is i-1 and merge candidates may be performed without adding the motion information candidate HmvpCand[i] to a merge candidate list. In this connection, a redundancy check between the motion information candidate HmvpCand[i-1] and the merge candidate mergeCandList[j] may be omitted.

In an example, in an example shown in FIG. 15, it was determined that HmvpCand[i] and mergeCandList[2] are identical. Accordingly, a redundancy check for HmvpCand [i-1] may be performed without adding HmvpCand[i] to a merge candidate list. In this connection, a redundancy check between HmvpCand[i-1] and mergeCandList[2] may be omitted.

When the number of a merge candidate included in the merge candidate list of a current block is less than the threshold, at least one of a pairwise merge candidate or a zero merge candidate may be additionally included except for a motion information candidate. A pairwise merge candidate means a merge candidate having a value obtained from averaging the motion vectors of more than 2 merge candidates as a motion vector and a zero merge candidate means a merge candidate whose motion vector is 0.

For the merge candidate list of a current block, a merge candidate may be added in the following order.

Spatial merge candidate—Temporal merge candidate—Motion information candidate—(Affine motion information candidate)—Pairwise merge candidate—Zero merge candidate A spatial merge candidate means a merge candidate derived from at least one of a neighboring block or a non-neighboring block and a temporal merge candidate means a merge candidate derived from a previous reference picture. An affine motion information candidate represents a motion information candidate derived from a block encoded/decoded by an affine motion model.

A motion information table may also be used in a motion vector prediction mode. In an example, when the number of a motion vector prediction candidate included in the motion vector prediction candidate list of a current block is less than the threshold, a motion information candidate included in a motion information table may be set as a motion vector prediction candidate for a current block. Concretely, the motion vector of a motion information candidate may be set as a motion vector prediction candidate.

If any one of motion vector prediction candidates included in the motion vector prediction candidate list of a current block is selected, a selected candidate may be set as a motion vector predictor of a current block. Then, after the motion vector residual value of a current block is decoded, the motion vector of a current block may be obtained by adding up the motion vector predictor and the motion vector residual value.

The motion vector prediction candidate list of a current block may be configured in the following order.

Spatial motion vector prediction candidate—Temporal motion vector prediction candidate—Motion information candidate—(Affine motion information candidate)—Zero motion vector prediction candidate A spatial motion vector prediction candidate means a motion vector prediction candidate derived from at least one of a neighboring block or a non-neighboring block and a temporal motion vector prediction candidate means a motion vector prediction candidate derived from a previous reference picture. An affine motion information candidate represents a motion information candidate derived from a block encoded/decoded by an affine motion model. A zero motion vector prediction candidate represents a candidate that the value of a motion vector is 0.

A merge processing region larger than a coding block may be defined. Coding blocks included in a merge processing region may be processed in parallel without being sequentially encoded/decoded. In this connection, not being sequentially encoded/decoded means the order of encoding/decoding is not defined. Accordingly, the encoding/decoding process of blocks included in a merge processing region may be independently processed. Alternatively, blocks included in a merge processing region may share merge candidates. In this connection, the merge candidates may be derived based on a merge processing region.

According to the above-mentioned feature, a merge processing region may be referred to as a parallel processing region, a shared merge region (SMR) or a merge estimation region (MER).

A merge candidate of a current block may be derived based on a coding block. But, when a current block is included in a merge processing region larger than the current block, a candidate block included in the same merge processing region as the current block may be set to be unavailable as a merge candidate.

FIG. 16 is a diagram showing an example in which a candidate block included in the same merge processing region as a current block is set to be unavailable as a merge candidate.

In an example shown in FIG. 16 (*a*), in the decoding/decoding of CU5, blocks including base samples adjacent to CU5 may be set as candidate blocks. In this connection, candidate blocks X3 and X4 included in the same merge processing region as CU5 may be set to be unavailable as a merge candidate of CU5. But, candidate blocks X0, X1 and X2 not included in the same merge processing region as CU5 may be set to be available as a merge candidate.

In an example shown in FIG. 16 (b), in the decoding/decoding of CU8, blocks including base samples adjacent to CU8 may be set as candidate blocks. In this connection, candidate blocks X6, X7 and X8 included in the same merge processing region as CU8 may be set to be unavailable as a merge candidate. But, candidate blocks X5 and X9 not included in the same merge processing region as CU8 may be set to be available as a merge candidate.

Alternatively, when a current block is included in a merge processing region, a neighboring block adjacent to a current block and to a merge processing region may be set as a candidate block.

FIG. 17 is a diagram showing an example which derives a merge candidate for a current block when a current block is included in a merge processing region.

As in an example shown in FIG. 17 (a), neighboring blocks adjacent to a current block may be set as candidate blocks for deriving the merge candidate of the current block. In this connection, a candidate block included in the same merge processing region as the current block may be set to be unavailable as a merge candidate. In an example, in deriving a merge candidate for a coding block CU3, a top neighboring block y3 and a right-top neighboring block y4 included in the same merge processing region as the coding block CU3 may be set to be unavailable as a merge candidate of the coding block CU3.

By scanning neighboring blocks adjacent to a current block in the predefined order, a merge candidate may be derived. In an example, the predefined order may be the order of y1, y3, y4, y0 and y2.

When the number of merge candidates which may be derived from neighboring blocks adjacent to a current block is less than a value that an offset is subtracted from the maximum number of merge candidates or the maximum number, a merge candidate for the current block may be derived by using neighboring blocks adjacent to a merge processing region like an example shown in FIG. 17 (b). In an example, neighboring blocks adjacent to a merge processing region including a coding block CU3 may be set as candidate blocks for the coding block CU3. In this connection, neighboring blocks adjacent to a merge processing region may include at least one of a left neighboring block x1, a top neighboring block x3, a left-bottom neighboring block x0, a right-top neighboring block x4 or a left-top neighboring block x2.

By scanning neighboring blocks adjacent to a merge processing region in the predefined order, a merge candidate may be derived. In an example, the predefined order may be the order of x1, x3, x4, x0 and x2.

In summary, a merge candidate on the coding block CU3 including in a merge processing region may be derived by scanning candidate blocks in the following scanning order.

(y1, y3, y4, y0, y2, x1, x3, x4, x0, x2)

But, the scanning order of the above-illustrated candidate blocks only shows the example of the present disclosure and candidate blocks may be scanned in the order different from the above example. Alternatively, the scanning order may be adaptively determined based on at least one of a size or a shape of a current block or a merge processing region.

A merge processing region may be square or non-square. Information for determining a merge processing region may be signaled in a bitstream. The information may include at least one of information representing the shape of a merge processing region or information representing the size of a merge processing region. When a merge processing region is non-square, at least one of information representing the size of a merge processing region, information representing the width or height of a merge processing region or information representing a ratio between the width and height of a merge processing region may be signaled in a bitstream.

The size of a merge processing region may be determined based on at least one of information signaled in a bitstream, picture resolution, the size of a slice or the size of a tile.

If motion compensation prediction is performed for a block included in a merge processing region, a motion information candidate derived based on the motion information of a block in which motion compensation prediction is performed may be added to a motion information table.

But, if a motion information candidate derived from a block included in a merge processing region is added to a motion information table, a case may occur where a motion information candidate derived from the block is used in the encoding/decoding of other block in the merge processing region whose encoding/decoding is actually slower than the block. In other words, although dependence between blocks should be excluded in the encoding/decoding of blocks included in a merge processing region, a case may occur where motion prediction compensation is performed by using the motion information of other block included in the merge processing region. To solve such a problem, although the encoding/decoding of a block included in a merge processing region is completed, the motion information of the block whose encoding/decoding is completed may not be added to a motion information table.

Alternatively, the motion information table may be updated using only a block at a predefined position within a merge processing region. The examples of the predefined position may include at least one of a block positioned on the top left of the merge processing region, a block positioned on the top right of the merge processing region, a block positioned on the bottom left of the merge processing region, a block positioned on the bottom right of the merge processing region, a block positioned in the center of the merge processing region, a block adjacent to the right boundary of the merge processing region, and a block adjacent to the bottom boundary of the merge processing region. As an example, the motion information table may be updated only with motion information of a block adjacent to the bottom right corner of the merge processing region and the motion information table may not be updated with motion information of other blocks.

Alternatively, after decoding of all blocks included in the merge processing region is completed, a motion information candidate derived from the blocks may be added to the motion information table. That is, while the blocks included in the merge processing region are encoded/decoded, the motion information table may not be updated.

In an example, if motion compensation prediction is performed for blocks included in a merge processing region, a motion information candidate derived from the blocks may be added to a motion information table in the predefined order. In this connection, the predefined order may be determined in the scanning order of coding blocks in a merge processing region or a coding tree unit. The scanning order may be at least one of raster scanning, horizontal scanning, vertical scanning or zigzag scanning. Alternatively, the predefined order may be determined based on the motion information of each block or the number of blocks with the same motion information.

Alternatively, a motion information candidate including a unidirectional motion information may be added to a motion information table before a motion information candidate including a bidirectional motion information. On the contrary, a motion information candidate including a bidirectional motion information may be added to a motion information table before a motion information candidate including a unidirectional motion information.

Alternatively, a motion information candidate may be added to a motion information table in the order of high frequency of use or low frequency of use in a merge processing region or a coding tree unit.

When a current block is included in a merge processing region and the number of merge candidates included in a merge candidate list of the current block is less than the maximum number, a motion information candidate included in a motion information table may be added to the merge candidate list. In this connection, a motion information candidate derived from a block included in the same merge processing region as a current block may be set not to be added to the merge candidate list of the current block.

Alternatively, when a current block is included in a merge processing region, it may be set not to use a motion information candidate included in a motion information table. In other words, although the number of merge candidates included in a merge candidate list of the current block is less than the maximum number, a motion information candidate included in a motion information table may not be added to the merge candidate list.

In another example, a motion information table on a merge processing region or a coding tree unit may be configured. This motion information table plays a role of temporarily storing the motion information of blocks included in a merge processing region. To distinguish between a general motion information table and a motion information table for a merge processing region or a coding tree unit, the motion information table for the merge processing region or the coding tree unit is referred to as a temporary motion information table. And, a motion information candidate stored in the temporary motion information table is referred to as a temporary motion information candidate.

FIG. 18 is a diagram showing a temporary motion information table.

A temporary motion information table for a coding tree unit or a merge processing region may be configured. When motion compensation prediction is performed for a current block included in a coding tree unit or a merge processing region, the motion information of the block may not be added to a motion information table HmvpCandList. Instead, a temporary motion information candidate derived from the block may be added to a temporary motion information table HmvpMERCandList. In other words, a temporary motion information candidate added to a temporary motion information table may not be added to a motion information table. Accordingly, a motion information table may not include a motion information candidate derived based on motion information of blocks included in a coding tree unit or a merge processing region including a current block.

Alternatively, only motion information of some of the blocks included in the merge processing region may be added to the temporary motion information table. As an example, only blocks at predefined positions within the merge processing region may be used for updating the motion information table. The predefined positions may include at least one of a block positioned on the top left of the merge processing region, a block positioned on the top right of the merge processing region, a block positioned on the bottom left of the merge processing region, a block positioned on the bottom right of the merge processing region, a block positioned in the center of the merge processing region, a block adjacent to the right boundary of the merge processing region, and a block adjacent to the bottom boundary of the merge processing region. As an example, only motion information of a block adjacent to the bottom right corner of the merge processing region may be added to the temporary motion information table and motion information of other blocks may not be added to the temporary motion information table.

The maximum number of temporary motion information candidates that the temporary motion information table is able to include may be set equal to the maximum number of motion information candidates that the motion information table is able to include. Alternatively, the maximum number of temporary motion information candidates that the temporary motion information table is able to include may be determined according to the size of the coding tree unit or the merge processing region. Alternatively, the maximum number of temporary motion information candidates that the temporary motion information table is able to include may be set smaller than the maximum number of motion information candidates that the motion information table is able to include.

A current block included in a coding tree unit or a merge processing region may be set not to use a temporary motion information table on the corresponding coding tree unit or merge processing region. In other words, when the number of merge candidates included in the merge candidate list of the current block is less than the threshold, a motion information candidate included in a motion information table may be added to the merge candidate list and a temporary motion information candidate included in a temporary motion information table may not be added to the merge candidate list. Accordingly, the motion information of other block including in the same coding tree unit or the same merge processing region as the current block may not be used for the motion compensation prediction of the current block.

If the encoding/decoding of all blocks included in a coding tree unit or a merge processing region is completed, a motion information table and a temporary motion information table may be unified.

FIG. 19 is a diagram showing an example in which a motion information table and a temporary motion information table are unified.

If the encoding/decoding of all blocks included in a coding tree unit or a merge processing region is completed, a temporary motion information candidate included in a temporary motion information table may be updated in a motion information table as in an example shown in FIG. 19.

In this connection, temporary motion information candidates included in a temporary motion information table may be added to a motion information table in the order inserted in the temporary motion information table. (In other words, in the ascending order or the descending order of the index value)

In another example, temporary motion information candidates included in a temporary motion information table may be added to a motion information table in the predefined order. In this connection, the predefined order may be determined in the scanning order of coding blocks in a merge processing region or a coding tree unit. The scanning order may be at least one of raster scanning, horizontal scanning, vertical scanning or zigzag scanning. Alternatively, the predefined order may be determined based on the motion information of each block or the number of blocks with the same motion information.

Alternatively, a temporary motion information candidate including a unidirectional motion information may be added to a motion information table before a temporary motion information candidate including a bidirectional motion information. On the contrary, a temporary motion information candidate including a bidirectional motion information may be added to a motion information table before a temporary motion information candidate including a unidirectional motion information.

Alternatively, a temporary motion information candidate may be added to a motion information table in the order of high frequency of use or low frequency of use in a merge processing region or a coding tree unit.

In case that a temporary motion information candidate included in a temporary motion information table is added to a motion information table, a redundancy check for a temporary motion information candidate may be performed. In an example, when the same motion information candidate as a temporary motion information candidate included in a temporary motion information table is prestored in a motion information table, the temporary motion information candidate may not be added to the motion information table. In this connection, a redundancy check may be performed for a part of motion information candidates included in a motion information table. In an example, a redundancy check may be performed for motion information candidates with an index over or below the threshold. In an example, when a temporary motion information candidate is equal to a motion information candidate with an index over the predefined value, the temporary motion information candidate may not be added to a motion information table.

It may limit the use of a motion information candidate derived from a block included in the same coding tree unit or the same merge processing region as a current block as the merge candidate of the current block. For it, the address information of a block may be additionally stored for a motion information candidate. The address information of a block may include at least one of the position of the block, the address of the block, the index of the block, the position of a merge processing region in which the block is included, the address of a merge processing region in which the block is included, the index of a merge processing region in which the block is included, the position of a coding tree region in which the block is included, the address of a coding tree region in which the block is included or the index of a coding tree region in which the block is included.

Intra-prediction predicts a current block by using a reconstructed sample that has been already encoded/decoded and which is around the current block. In this connection, a reconstructed sample before applying an in-loop filter may be used for intra-prediction of the current block.

An intra-prediction method includes intra-prediction based on a matrix and intra-prediction according to a direction with a neighboring reconstruction sample. Information indicating an intra-prediction method of a current block may be signaled in a bitstream. The information may be a 1-bit flag. Alternatively, an intra-prediction of a current block may be determined on the basis of at least one of a position of the current block, a size of the current block, a shape of the current block, or an intra-prediction method of a neighboring block. In an example, when a current block is present crossing a picture boundary, it may be set such that an intra-prediction method based on a matrix is not applied to the current block.

An intra-prediction method based on a matrix is a method of obtaining a prediction block of a current block on the basis of a matrix product of a matrix stored in the encoder and the decoder, and reconstruction samples around the current block. Information for specifying any one of a plurality of prestored matrices may be signaled in a bitstream. The decoder may determine a matrix for performing intra-prediction on a current block on the basis of the above information and a size of the current block.

General intra-prediction is a method of obtaining a prediction block of a current block on the basis of a non-directional intra-prediction mode or directional intra-prediction mode. Hereinafter, with reference to figures, a process of intra-prediction based on general intra-prediction will be described in detail.

FIG. 20 is a flow diagram of an intra-prediction method according to an embodiment of the present disclosure.

A reference sample line of a current block may be determined S2001. The reference sample line means a group of reference samples included in a k-th line apart from a top and/or a left of the current block. A reference sample may be derived from a reconstructed sample encoded/decoded around the current block.

Index information identifying a reference sample line for a current block among a plurality of reference sample lines may be signaled in a bitstream. In an example, index information, intra_luma_ref_idx, for specifying the reference sample line of the current block may be signaled in the bitstream. The index information may be signaled per coding block.

A plurality of reference sample lines may include at least one of a first line, a second line or a third line at a top and/or left of a current block. A reference sample line composed of a row adjacent to the top of the current block and a column adjacent to the left of the current block among a plurality of reference sample lines may be referred to as an adjacent reference sample line, and other reference sample lines may be referred to as a non-adjacent reference sample line.

Table 1 shows an index assigned to each candidate reference sample line.

TABLE 1

| Index (intra_luma_ref_idx) | Reference sample line |
| --- | --- |
| 0 | Adjacent reference sample line |
| 1 | First non-adjacent reference sample line |
| 2 | Second non-adjacent reference sample line |

Based on at least one of a position, a size, a shape of a current block or a prediction encoding mode of a neighboring block, a reference sample line of the current block may be determined. In one example, when the current block adjoins a boundary of a picture, a tile, a slice or a coding tree unit, an adjacent reference sample line may be determined as the reference sample line of the current block. A reference sample line may include top reference samples positioned at a top of the current block and left reference samples positioned at a left of the current block. The top reference samples and left reference samples may be derived from reconstructed samples around the current block. The reconstructed samples may be in a state before an in-loop filter is applied.

Next, an intra-prediction mode of a current block may be determined S2002. For the intra-prediction mode of the current block, at least one of a non-directional intra-prediction mode or a directional intra-prediction mode may be determined as the intra-prediction mode of the current block. Non-directional intra-prediction modes includes a planar and a DC and directional intra-prediction modes includes 33 or 65 modes from a left-bottom diagonal direction to a right-top diagonal direction.

FIG. 21 is a diagram showing intra-prediction modes.

FIG. 21 (a) shows 35 intra-prediction modes and FIG. 21 (b) shows 67 intra-prediction modes.

The larger or smaller number of intra-prediction modes than shown in FIG. 21 may be defined.

Based on an intra-prediction mode of a neighboring block adjacent to a current block, an MPM (Most Probable Mode) may be set. In this connection, a neighboring block may include a left neighboring block adjacent to a left of the current block and a top neighboring block adjacent to a top of the current block.

The number of MPMs included in an MPM list may be preset in an encoder and a decoder. In an example, the number of MPMs may be 3, 4, 5 or 6. Alternatively, information representing the number of MPMs may be signaled in a bitstream. Alternatively, based on at least one of a prediction encoding mode of a neighboring block, a size, a shape or a reference sample line index of a current block, the number of MPMs may be determined. In an example, while N MPMs may be used when an adjacent reference sample line is determined as the reference sample line of the current block, M MPMs may be used when a non-adjacent reference sample line is determined as the reference sample line of the current block. As M is a natural number smaller than N, in an example, N may be 6 and M may be 5, 4 or 3. Accordingly, while the intra-prediction mode of the current block may be determined as any one of 6 candidate intra-prediction modes when the index of the reference sample line of the current block is 0 and an MPM flag is true, the intra-prediction mode of the current block may be determined as any one of 5 candidate intra-prediction modes when the index of the reference sample line of the current block is larger than 0 and an MPM flag is true.

Alternatively, the fixed number (e.g. 6 or 5) of MPM candidates may be used regardless of the index of the reference sample line of the current block.

When matrix-based intra prediction is applied to a neighboring block, an MPM candidate may be derived by inferring an intra prediction mode of a neighboring block to a Planar.

When intra BDPCM is applied to a neighboring block, an MPM candidate may be derived by inferring an intra prediction mode of a neighboring block to a default mode. In this case, a default mode may be at least one of a DC, a Planar, a vertical direction or a horizontal direction.

Alternatively, based on an intra BDPCM application direction of a neighboring block, an intra prediction mode of a neighboring block may be determined. In an example, when intra BDPCM in a horizontal direction is applied to a neighboring block, an intra prediction mode of a neighboring block may be inferred to be in a horizontal direction. On the other hand, when intra BDPCM in a vertical direction is applied to a neighboring block, an intra prediction mode of a neighboring block may be inferred to be in a vertical direction.

An MPM list including a plurality of MPMs may be generated and information indicating whether the same MPM as an intra-prediction mode of a current block is included in the MPM list may be signaled in a bitstream. As the information is a 1-bit flag, it may be referred to as an MPM flag. When the MPM flag represents the same MPM as the current block is included in the MPM list, index information identifying one of MPMs may be signaled in a bitstream. In an example, index information, mpm_idx, specifying any one of plural MPMs may be signaled in a bitstream. An MPM specified by the index information may be set as the intra-prediction mode of the current block. When the MPM flag represents the same MPM as the current block is not included in the MPM list, remaining mode information indicating any one of remaining intra-prediction modes except for MPMs may be signaled in a bitstream. Remaining mode information represents an index value corresponding to the intra-prediction mode of the current block when an index is reassigned to remaining intra-prediction modes except for MPMs. A decoder may may determine the intra-prediction mode of the current block by arranging MPMs in the ascending order and comparing remaining mode information with MPMs. In an example, when remaining mode information is equal to or smaller than MPM, the intra-prediction mode of the current block may be derived by adding 1 to remaining mode information.

In deriving an intra-prediction mode of a current block, comparing a part of MPMs with remaining mode information may be omitted. In an example, MPMs in a non-directional intra-prediction mode among MPMs may be excluded from a comparison target. When non-directional intra-prediction modes are set as MPMs, remaining mode information clearly indicates a directional intra-prediction mode, so the intra-prediction mode of the current block may be derived by comparing remaining MPMs except for non-directional intra-prediction modes with remaining mode information. Instead of excluding non-directional intra-prediction modes from a comparison target, a result value may be compared with remaining MPMs after adding the number of non-directional intra-prediction modes to remaining mode information.

Instead of setting a default mode as an MPM, information indicating whether an intra-prediction mode of a current block is the default mode may be signaled in a bitstream. The information is a 1-bit flag and the flag may be referred to as a default mode flag. The default mode flag may be signaled only when an MPM flag represents that the same MPM as the current block is included in an MPM list. As described above, the default mode may include at least one of a planar, DC, a vertical direction mode or a horizontal direction mode. In an example, when the planar is set as the default mode, the default mode flag may indicate whether the intra-prediction mode of the current block is the planar. When the default mode flag indicates that the intra-prediction mode of the current block is not the default mode, one of MPMs indicated by index information may be set as the intra-prediction mode of the current block.

When a default mode flag is used, it may be set that an intra-prediction mode same with a default mode is not set as an MPM. In an example, when the default mode flag indicates that whether the intra-prediction mode of the current block is a planar, the intra-prediction mode of the current block may be derived by using 5 MPMs excluding an MPM corresponding to the planar.

When a plurality of intra-prediction modes are set as default modes, index information indicating any one of default modes may be further signaled. The intra-prediction mode of the current block may be set as a default mode indicated by the index information.

When an index of a reference sample line of a current block is not 0, it may be set not to use a default mode. In an example, when a non-adjacent reference sample line is determined as the reference sample line of the current block, it may be set not to use a non-directional intra-prediction mode such as a DC mode or a planar mode. Accordingly, when an index of a reference sample line is not 0, a default mode flag may not be signaled and a value of the default mode flag may be inferred to a predefined value (i.e. false).

When an intra-prediction mode of a current block is determined, prediction samples for the current block may be obtained based on a determined intra-prediction mode S2003.

When the DC mode is selected, prediction samples for the current block may be generated based on an average value of the reference samples. In detail, values of all of samples within the prediction block may be generated based on an average value of the reference samples. An average value may be derived using at least one of top reference samples adjacent to the top of the current block, and left reference samples adjacent to the left of the current block.

The number or a range of the reference samples used when deriving an average value may vary based on the shape of the current block. In an example, when a current block is a non-square block where a width is greater than a height, an average value may be calculated by using top reference samples. To the contrary, when a current block is a non-square block where a width is smaller than a height, an average value may be calculated by using left reference samples. In other words, when a width and a height of the current block are different, reference samples adjacent to the greater length may be used so as to calculate an average value. Alternatively, whether to calculate an average value by using top reference samples or by using left reference samples may be determined on the basis of a ratio between a width and a height of the current block.

When a planar mode is selected, a prediction sample may be obtained by using a horizontal directional prediction sample and a vertical directional prediction sample. In this connection, the horizontal directional prediction sample may be obtained on the basis of a left reference sample and a right reference sample which are positioned at the same horizontal line with the prediction sample, and the vertical directional prediction sample may be obtained on the basis of an top reference sample and a bottom reference sample which are positioned at the same vertical line with the prediction sample. In this connection, the right reference sample may be generated by copying a reference sample adjacent to the top-right corner of the current block, and the bottom reference sample may be generated by copying a reference sample adjacent to the lower-left corner of the current block. The horizontal directional prediction sample may be obtained on the basis of a weighted sum of the left reference sample and the right reference sample, and the vertical directional prediction sample may be obtained on the basis of a weighted sum of the top reference sample and the bottom reference sample. In this connection, a weighting factor assigned to each reference sample may be determined according to a position of the prediction sample. The prediction sample may be obtained on the basis of an average or a weighted sum of the horizontal directional prediction sample and the vertical directional prediction sample. When a weighted sum is used, a weighting factor assigned to the horizontal directional prediction sample and the vertical directional prediction sample may be determined on the basis of a position of the prediction sample.

When a directional prediction mode is selected, a parameter representing a prediction direction (or prediction angle) of the selected directional prediction mode may be determined. Table 2 below represents an intra directional parameter of intraPredAng for each intra-prediction mode.

TABLE 2

| PredModeIntra | 1 | 2 | 3 | 4 | 5 | 6 | 7 |
|---|---|---|---|---|---|---|---|
| IntraPredAng | — | 32 | 26 | 21 | 17 | 13 | 9 |
| PredModeIntra | 8 | 9 | 10 | 11 | 12 | 13 | 14 |
| IntraPredAng | 5 | 2 | 0 | −2 | −5 | −9 | −13 |
| PredModeIntra | 15 | 16 | 17 | 18 | 19 | 20 | 21 |
| IntraPredAng | −17 | −21 | −26 | −32 | −26 | −21 | −17 |
| PredModeIntra | 22 | 23 | 24 | 25 | 26 | 27 | 28 |
| IntraPredAng | −13 | −9 | −5 | −2 | 0 | 2 | 5 |
| PredModeIntra | 29 | 30 | 31 | 32 | 33 | 34 | |
| IntraPredAng | 9 | 13 | 17 | 21 | 26 | 32 | |

Table 2 represents an intra directional parameter of each intra-prediction mode where an index thereof is one of 2 to 34 when 35 intra-prediction modes are defined. When directional intra-prediction modes are defined more than 33, an intra directional parameter of each intra-prediction mode may be set by subdividing Table 2. Top reference samples and left reference samples for the current block are arranged in a line, and then a prediction sample may be obtained on the basis of a value of an intra directional parameter. In this connection, when a value of the intra directional parameter is a negative value, left reference samples and top reference samples may be arranged in a line.

FIGS. 22 and 23 are views respectively showing examples of one-dimensional arrangement where reference samples are arranged in a line.

FIG. 22 is a view showing vertical directional one-dimensional arrangement where reference samples are arranged in a vertical direction, and FIG. 23 is a view showing horizontal directional one-dimensional arrangement where reference samples are arranged in a horizontal direction. Examples of FIGS. 22 and 23 will be described in assumption that 35 intra-prediction modes are defined.

When an intra-prediction mode index is any one of 11 to 18, horizontal directional one-dimensional arrangement may be applied where top reference samples are rotated in counterclockwise, and when an intra-prediction mode index is any one of 19 to 25, vertical directional one-dimensional arrangement may be applied where left reference samples are rotated in clockwise. When arranging reference samples in a line, an intra-prediction mode angle may be considered.

A reference sample determining parameter may be determined on the basis of an intra directional parameter. The reference sample determining parameter may include a reference sample index for specifying a sample, and a weighting factor parameter for determining a weighting factor applied to the reference sample.

A reference sample index, iIdx, and a weighting factor parameter, ifact, may be respectively obtained through Equations 2 and 3 below.

$$iIdx = (y+1) * P_{ang}/32 \quad \text{[Equation 2]}$$

$$i_{fact} = [(y+1) * P_{ang}] \& 31 \quad \text{[Equation 3]}$$

In Equations 2 and 3, $P_{ang}$ represents an intra directional parameter. A reference sample specified by a reference sample index of iIdx corresponds to an integer pel.

In order to derive a prediction sample, at least one reference sample may be specified. In detail, according to a slope of a prediction mode, a position of a reference sample used for deriving a prediction sample may be specified. In an example, a reference sample used for deriving a prediction sample may be specified by using a reference sample index of iIdx.

In this connection, when a slope of an intra-prediction mode is not represented by one reference sample, a prediction sample may be generated by performing interpolation on a plurality of reference samples. In an example, when a slope of an intra-prediction mode is a value between a slope between a prediction sample and a first reference sample, and a slope between the prediction sample and a second reference sample, the prediction sample may be obtained by performing interpolation on the first reference sample and the second reference sample. In other words, when an angular line according to an intra-prediction angle does not pass a reference sample positioned at an integer pel, a prediction sample may be obtained by performing interpolation on reference samples positioned adjacent to the left and the right, or the top and the bottom of the position where the angular line passes.

Equation 4 below represents an example of obtaining a prediction sample on the basis of reference samples.

$$P(x,y) = ((32 - i_{fact})/32) * \text{Ref\_1D}(x + iIdx + 1) + (i_{fact}/32) * \text{Ref\_1D}(x + iIdx + 2) \quad [\text{Equation 4}]$$

In Equation 4, P represents a prediction sample, and Ref 1D represents any one of reference samples that are arranged in a line. In this connection, a position of the reference sample may be determined by a position (x, y) of the prediction sample and a reference sample index of iIdx.

When a slope of an intra-prediction mode is possibly represented by one reference sample, a weighting factor parameter of $i_{fact}$ is set to 0. Accordingly, Equation 4 may be simplified as Equation 5 below.

$$P(x,y) = \text{Ref\_1D}(x + iIdx + 1) \quad [\text{Equation 5}]$$

Intra-prediction for a current block may be performed on the basis of a plurality of intra-prediction modes. In an example, an intra-prediction mode may be derived for each prediction sample, and a prediction sample may be derived on the basis of an intra-prediction mode assigned to each prediction sample.

Alternatively, an intra-prediction mode may be derived for each region, intra-prediction for each region may be performed on the basis of an intra-prediction mode assigned to each region. In this connection, the region may include at least one sample. At least one of a size and a shape of the region may be adaptively determined on the basis of at least one of a size of the current block, a shape of the current block, and an intra-prediction mode for the current block. Alternatively, at least one of a size and a shape of the region may be predefined in the encoder and the decoder independent to a size or shape of the current block.

FIG. 24 is a view showing a degree formed between directional intra-prediction modes and a straight line parallel to an x axis.

As an example shown in FIG. 24, directional prediction modes may be present between the lower-left diagonal direction and the top-right diagonal direction. Describing a degree formed between the x axis and a directional prediction mode, directional prediction modes may be present from 45 degrees (bottom-left diagonal direction) to −135 degrees (top-right diagonal direction).

When a current block is a non-square, a case may be present where a prediction sample is derived by using, among reference samples positioned at the angular line according to an intra-prediction angle, a reference sample that is positioned farther than a reference sample close to a prediction sample according to an intra-prediction mode for the current block.

FIG. 25 is a view shown an aspect of obtaining a prediction sample when a current block is a non-square.

In an example, as an example shown in FIG. 27 (a), it is assumed that a current block is a non-square where a width is greater than a height, and an intra-prediction mode for the current block is a directional intra-prediction mode having an angle from degree to 45 degrees. In the above case, when deriving a prediction sample A around a right column of the current block, among reference samples positioned at the angular mode according to the above degree, rather than using a top reference sample T close to the prediction sample, a case may be present where a left reference sample L far away from the prediction sample is used.

In another example, as an example shown in FIG. 25 (b), it is assumed that a current block is a non-square where a height is greater than a width, and an intra-prediction mode for the current block is a directional intra-prediction mode from −90 degrees to −135 degrees. In the above case, when deriving a prediction sample A around a bottom row of the current block, among reference samples positioned at the angular mode according to the above degree, rather than using a left reference sample L close to the prediction sample, a case may be present where a top reference sample T far away from the prediction sample is used.

To solve the above problem, when a current block is a non-square, an intra-prediction mode for the current block may be substituted with an intra-prediction mode in opposite direction. Accordingly, for a non-square block, directional prediction modes having angles greater or smaller than those of directional prediction modes shown in FIG. 21 may be used. The above directional intra-prediction mode may be defined as a wide angle intra-prediction mode. A wide angle intra-prediction mode represents a directional intra-prediction mode that does not belong to a range of 45 degrees to −135 degrees.

FIG. 26 is a view showing wide angle intra-prediction modes.

In an example show in FIG. 26, intra-prediction modes having indices from −1 to −14 and intra-prediction modes having indices from 67 to 80 represent wide angle intra-prediction modes.

In FIG. 26, 14 wide angle intra-prediction modes (from −1 to −14) which are greater in angle than 45 degrees and 4 wide angle intra-prediction modes (from 67 to 80) which are smaller in angle than −135 degrees are shown. However, more or fewer number of wide angle intra-prediction modes may be defined.

When a wide angle intra-prediction mode is used, a length of top reference samples may be set to 2W+1, and a length of left reference samples may be set to 2H+1.

By using a wide angle intra-prediction mode, a sample A shown in FIG. 26 (a) may be predicted by using a reference sample T, and a sample A shown in FIG. 26 (b) may be predicted by a reference sample L.

In addition to legacy intra-prediction modes and N wide angle intra-prediction modes, a total of 67+N intra-prediction modes may be used. In an example, Table 3 represents an intra directional parameter for intra-prediction modes when 20 wide angle intra-prediction modes are defined.

TABLE 3

| PredModeIntra | -10 | -9 | -8 | -7 | -6 | -5 | -4 | -3 | -2 |
|---|---|---|---|---|---|---|---|---|---|
| intraPredAngle | 114 | 93 | 79 | 68 | 60 | 54 | 49 | 45 | 39 |
| PredModeIntra | -1 | 2 | 3 | 4 | 5 | 6 | 7 | 8 | 9 |
| intraPredAngle | 35 | 32 | 29 | 26 | 23 | 21 | 19 | 17 | 15 |
| PredModeIntra | 10 | 11 | 12 | 13 | 14 | 15 | 16 | 17 | 18 |
| intraPredAngle | 13 | 11 | 9 | 7 | 5 | 3 | 2 | 1 | 0 |
| PredModeIntra | 19 | 20 | 21 | 22 | 23 | 24 | 25 | 26 | 27 |
| intraPredAngle | -1 | -2 | -3 | -5 | -7 | -9 | -11 | -13 | -15 |
| PredModeIntra | 28 | 29 | 30 | 31 | 32 | 33 | 34 | 35 | 36 |
| intraPredAngle | -17 | -19 | -21 | -23 | -26 | -29 | -32 | -29 | -26 |
| PredModeIntra | 37 | 38 | 39 | 40 | 41 | 42 | 43 | 44 | 45 |
| intraPredAngle | -23 | -21 | -19 | -17 | -15 | -13 | -11 | -9 | -7 |
| PredModeIntra | 46 | 47 | 48 | 49 | 50 | 51 | 52 | 53 | 54 |
| intraPredAngle | -5 | -3 | -2 | -1 | 0 | 1 | 2 | 3 | 5 |
| PredModeIntra | 55 | 56 | 57 | 58 | 59 | 60 | 61 | 62 | 63 |
| intraPredAngle | 7 | 9 | 11 | 13 | 15 | 17 | 19 | 21 | 23 |
| PredModeIntra | 64 | 65 | 66 | 67 | 68 | 69 | 70 | 71 | 72 |
| intraPredAngle | 26 | 29 | 32 | 35 | 39 | 45 | 49 | 54 | 60 |

| PredModeIntra | 73 | 74 | 75 | 76 |
|---|---|---|---|---|
| intraPredAngle | 68 | 79 | 93 | 114 |

When a current block is a non-square, and an intra-prediction mode for the current block which is obtained in S2502 belongs to a transform range, the intra-prediction mode for the current block may be transformed into a wide angle intra-prediction mode. The transform range may be determined on the basis of at least one of a size, a shape, or a ratio of the current block. In this connection, the ratio may represent a ratio between a width and a height of the current block. When a current block is a non-square where a width is greater than a height, a transform range may be set from an intra-prediction mode index (for example, 66) of an top-right diagonal direction to (an intra-prediction mode index of the top-right diagonal direction—N). In this connection, N may be determined on the basis of a ratio of the current block. When an intra-prediction mode for the current block belongs to a transform range, the intra-prediction mode may be transformed into a wide angle intra-prediction mode. The transform may be subtracting a predefined value from the intra-prediction mode, and the predefined value may be the total number (for example, 67) of intra-prediction modes excluding a wide angle intra-prediction mode.

In the above example, intra-prediction mode from the number 66 to the number 53 may be respectively transformed into wide angle intra-prediction modes from the number -1 to the number -14.

When a current block is a non-square where a height is greater than a width, a transform range may be set from an intra-prediction mode index (for example, 2) of a bottom-left diagonal direction to (the intra-prediction mode index of the lower-left diagonal direction+M). In this connection, M may be determined on the basis of a ratio of the current block. When an intra-prediction mode for the current block belongs to a transform range, the intra-prediction mode may be transformed into a wide angle intra-prediction mode. The transform may be adding a predefined value to the intra-prediction mode, and the predefined value may be the total number (for example, 65) of directional intra-prediction mode excluding a wide angle intra-prediction mode.

In the above example, intra-prediction mode from the number 2 to the number 15 may be respectively transformed into wide angle intra-prediction modes from the number 67 to the number 80

Hereinafter, intra-prediction modes belonging to a transform range are referred to as wide angle intra prediction replacement modes.

A transform range may be determined on the basis of a ratio of the current block. In an example, Tables 4 and 5 respectively show a transform range of a case where 35 intra-prediction modes excluding a wide angle intra-prediction mode are defined, and a case where 67 intra-prediction modes excluding a wide angle intra-prediction mode are defined.

TABLE 4

| Condition | Replaced Intra Prediction Modes |
|---|---|
| W/H = 2 | Modes 2, 3, 4 |
| W/H > 2 | Modes 2, 3, 4, 5, 6 |
| W/H = 1 | None |
| H/W = ½ | Modes 32, 33, 34 |
| H/W < ½ | Modes 30, 31, 32, 33, 34 |

TABLE 5

| Condition | Replaced Intra Prediction Modes |
| --- | --- |
| W/H = 2 | Modes 2, 3, 4, 5, 6, 7 |
| W/H > 2 | Modes 2, 3, 4, 5, 6, 7, 8, 9, 10, 11 |
| W/H = 1 | None |
| H/W = ½ | Modes 61, 62, 63, 64, 65, 66 |
| H/W < ½ | Modes 57, 58, 59, 60, 61, 62, 63, 64, 65, 66 |

As examples shown in Tables 4 and 5, the number of wide angle intra prediction replacement modes included in a transform range may vary according to a ratio of the current block. The ratio of the current block may be further subdivided to set a transform range as shown in Table 6 below.

TABLE 6

| Condition | Replaced Intra Prediction Modes |
| --- | --- |
| W/H = 16 | Modes 12, 13, 14, 15 |
| W/H = 8 | Modes 12, 13 |
| W/H = 4 | Modes 2, 3, 4, 5, 6, 7, 8, 9, 10, 11 |
| H/W = 2 | Modes 2, 3, 4, 5, 6, 7 |
| H/W = 1 | None |
| W/H = ½ | Modes 61, 62, 63, 64, 65, 66 |
| W/H = ¼ | Modes 57, 58, 59, 60, 61, 62, 63, 64, 65, 66 |
| W/H = ⅛ | Modes 55, 56 |
| H/W = 1/16 | Modes 53, 54, 55, 56 |

When the non-adjacent reference sample line is determined as the reference sample line for the current block or when the multi-line intra prediction encoding method for selecting one of the plurality of reference sample lines is used, the prediction method may be configured not to use the wide angle intra prediction mode. That is, although the current block has a non-square shape, and the intra prediction mode for the current block belongs to the transform range, the intra prediction mode for the current block may not be transformed into the wide angle intra prediction mode. Alternatively, when the intra prediction mode for the current block is determined as the wide angle intra prediction mode, the prediction method may be configured such that the non-adjacent reference sample lines are unavailable as the reference sample line for the current block or may be configured not to use the multi-line intra prediction encoding method for selecting one of the plurality of reference sample lines. When the multi-line intra prediction encoding method is not used, the adjacent reference sample line may be determined as the reference sample line for the current block.

When the wide angle intra prediction mode is not used, each of refW and refH may be set to a sum of nTbW and nTbH. Accordingly, the non-adjacent reference sample line spaced from the current block by i may include (nTbW+nTbH+offsetX[i]) top reference samples and (nTbW+nTbH+offsetY[i]) left reference samples except for the left-top reference sample. That is, the non-adjacent reference sample line spaced from the current block by i may include (2nTbW+2nTbH+offsetX[i]+offsetY[i]+1) reference samples. For example, when a value of whRatio is greater than 1, a value of offsetX may be set to be larger than a value of offsetY. In one example, when the value of offsetX may be set to 1, and the value of offsetY may be set to 0. To the contrary, when the value of whRatio is smaller than 1, the value of offsetY may be set to be larger than the value of offsetX. In one example, the value of offsetX may be set to 0, and the value of offsetY may be set to 1.

Since wide angle intra-prediction modes are used in addition to legacy intra-prediction modes, resource for encoding wide angle intra-prediction modes may be increased, and thus encoding efficiency may be reduced. Accordingly, rather than encoding a wide angle intra-prediction mode as it is, a replaced intra-prediction mode for the wide angle intra-prediction modes are encoded so as to improve encoding efficiency.

In an example, when a current block is encoded by using a wide angle intra-prediction mode of the number 67, the number 2 that is a wide angle replacement intra-prediction mode of the number 67 may be encoded as an intra-prediction mode for the current block. In addition, when a current block is encoded by using a wide angle intra-prediction mode of the number −1, the number 66 that is a wide angle replacement intra-prediction mode of the number −1 may be encoded as an intra-prediction mode for the current block.

The decoder may decode an intra-prediction mode for the current block, and determine whether or not the decoded intra-prediction mode belongs to a transform range. When the decoded intra-prediction mode is a wide angle replacement intra-prediction mode, the intra-prediction mode may be transformed into a wide angle intra-prediction mode.

Alternatively, when a current block is encoded through a wide angle intra-prediction mode, the wide angle intra-prediction mode may be encoded as it is.

Encoding of an intra prediction mode may be performed based on an MPM list described above. Specifically, when a neighboring block is encoded in a wide angle intra prediction mode, an MPM may be set based on a wide angle replacement intra prediction mode corresponding to the wide angle intra prediction mode.

A coding block or a transform block may be partitioned into a plurality of sub-blocks (or sub-partitions). When a coding block or a transform block is partitioned into a plurality of sub-blocks, prediction, transform and quantization may be performed for each sub-block. Partitioning a coding block or a transform block into a plurality of sub-blocks may be defined as a sub-partition intra encoding method.

Information representing whether a sub-partition intra encoding method is applied may be signaled in a bitstream. The information may be a 1-bit flag. In an example, 'intra_subpartitions_mode_flag', a syntax factor representing whether a coding block or a transform block is partitioned into a plurality of sub-blocks, may be signaled in a bitstream.

Alternatively, whether a sub-partition intra encoding method is applied may be determined based on at least one of a size, a shape or an intra prediction mode of a coding block or a transform block. In an example, when an intra prediction mode of a coding block is a nondirectional intra prediction mode (e.g., a planar or a DC) or a predefined directional intra prediction mode (e.g., an intra prediction mode in a horizontal direction, an intra prediction mode in a vertical direction or an intra prediction mode in a diagonal direction), a sub-partition intra encoding method may not be applied. Alternatively, when a size of a coding block is smaller than a threshold value, a sub-partition intra encoding method may be set not to be used.

Alternatively, when intra prediction for a sub-block is performed based on an intra prediction mode of a coding block, whether a sub-partition intra encoding method is applied may be determined based on whether a reconstructed sample included in a neighboring sub-block should be used as a reference sample in intra prediction of a sub-block. In an example, when an intra prediction mode of a coding block is an intra prediction mode in a diagonal direction or a wide-angle intra prediction mode and a neighboring sub-block may not be used as a reference sample in performing intra prediction for a sub-block based on the intra prediction mode, a sub-partition intra encoding method may be set not to be used.

Alternatively, when a height and width ratio of a coding block is equal to or greater than a threshold value or equal to or less than a threshold value, a sub-partition intra encoding method may be set not to be used. Alternatively, when at least one of a height or a width of a coding block is equal to or less than a threshold value, a sub-partition intra encoding method may not be used. In an example, when a width or a height of a coding block is equal to or less than a threshold value or when both a height and a width of a coding block is equal to or less than a threshold value, a sub-partition intra encoding method may not be used. Alternatively, when the number of samples included in a coding block is equal to or less than a threshold value, a sub-partition intra encoding method may not be used. A threshold value may have a predefined value in an encoder and a decoder. Alternatively, information for determining a threshold value may be signaled in a bitstream.

Alternatively, whether a flag representing whether a sub-partition intra encoding method is applied is signaled may be determined based on at least one of a size, a shape or an intra prediction mode of a coding block or a transform block. In an example, only when both a height and a width of a coding block is equal to or less than a threshold value and/or when a size of a coding block is equal to or greater than a threshold value, a flag representing whether a sub-partition intra encoding method is applied may be encoded and signaled. When a flag representing whether a sub-partition intra encoding method is applied is not encoded, a sub-partition intra encoding method may not be applied.

When a sub-partition intra encoding method is not used, signaling of a syntax factor, intra_subpartitions_mode_flag, may be omitted. When signaling of the flag is omitted, the flag may be considered to represent that a sub-partition intra encoding method is not applied.

When a sub-partition intra encoding method is applied, a partitioning shape of a coding block or a transform block may be determined. In this case, a partitioning shape represents a partitioning direction of a coding block or a transform block. In an example, partitioning in a vertical direction may mean that a coding block or a transform block is partitioned by using at least one vertical line and partitioning in a horizontal direction may mean that a coding block or a transform block is partitioned by using at least one horizontal line.

FIG. 27 is a diagram showing an example of partitioning in a vertical direction and partitioning in a horizontal direction.

FIG. 27 (a) represents an example in which a coding block is partitioned into 2 sub-blocks and FIG. 27(b) represents an example in which a coding block is partitioned into 4 sub-blocks.

Information for determining a partitioning shape of a coding block or a transform block may be signaled in a bitstream. In an example, information representing whether partitioning in a vertical direction is applied to a coding block or a transform block or whether partitioning in a horizontal direction is applied to a coding block or a transform block may be signaled. The information may be a 1-bit flag, intra subpart type flag. When a value of the flag is 1, it represents that a coding block or a transform block is partitioned in a horizontal direction and when a value of the flag is 0, it represents that a coding block or a transform block is partitioned in a vertical direction.

Alternatively, a partitioning shape of a coding block or a transform block may be determined based on a size, a shape or an intra prediction mode of a coding block or a transform block. In an example, a partitioning shape of a coding block may be determined based on a width and height ratio of a coding block. For example, when a value of whRatio representing a height and width ratio of a coding block is equal to or greater than a first threshold value, partitioning in a vertical direction may be applied to a coding block. Otherwise, partitioning in a horizontal direction may be applied to a coding block.

FIG. 28 is a diagram showing an example in which a partitioning shape of a coding block is determined.

For convenience of description, it is assumed that a first threshold value is 2. In an example shown in FIG. 28(a), whRatio of a coding block is 1, which is smaller than a first threshold value. Accordingly, encoding of information representing a partitioning shape of a coding block may be omitted and partitioning in a horizontal direction may be applied to a coding block.

In an example shown in FIG. 28(b), whRatio of a coding block is 2, which is the same as a first threshold value. Accordingly, encoding of information representing a partitioning shape of a coding block may be omitted and partitioning in a vertical direction may be applied to a coding block.

A partitioning shape of a coding block may be determined by using a second threshold value whose sign is opposite to a first threshold value. In an example, when a value of whRatio is equal to or less than a second threshold value, partitioning in a horizontal direction may be applied to a coding block and otherwise, partitioning in a vertical direction may be applied to a coding block. An absolute value of a first threshold value and a second threshold value may be the same and their signs may be different. In an example, when a first threshold value is N (in this case, N is an integer such as 1, 2, 4, etc.), a second threshold value may be −N.

FIG. 29 is a diagram showing an example in which a partitioning shape of a coding block is determined.

For convenience of description, it is assumed that a second threshold value is −2. In an example shown in FIG. 29(a), whRatio of a coding block is −1, which is greater than a second threshold value. Accordingly, encoding of information representing a partitioning shape of a coding block may be omitted and partitioning in a vertical direction may be applied to a coding block.

In an example shown in FIG. 29(b), whRatio of a coding block is −2, which is the same as a second threshold value. Accordingly, encoding of information representing a partitioning shape of a coding block may be omitted and partitioning in a horizontal direction may be applied to a coding block.

Alternatively, a partitioning shape of a coding block may be determined based on a first threshold value and a second threshold value. In an example, when a value of whRatio is equal to or greater than a first threshold value, partitioning in a horizontal direction may be applied to a coding block and when a value of whRatio is equal to or less than a second threshold value, partitioning in a vertical direction may be applied to a coding block. When a value of whRatio exists between a first threshold value and a second threshold value, a partitioning shape of a current block may be determined by parsing information in a bitstream.

A first threshold value and a second threshold value may be predefined in an encoder and a decoder. Alternatively, a first threshold value and a second threshold value may be defined per sequence, picture or slice.

Alternatively, a partitioning shape may be determined based on a size of a coding block or a transform block. In an example, when a size of a coding block is N×n, partitioning in a vertical direction may be applied and when a size of a coding block is n×N, partitioning in a horizontal direction may be applied. In this case, n may be a natural number smaller than N. N and/or n may be a predefined value in an encoder and a decoder.

Alternatively, information for determining N and/or n may be signaled in a bitstream. In an example, N may be 32, 64, 128 or 256, etc. Accordingly, when a size of a coding block is 128×n (in this case, n is a natural number such as 16, 32 or 64, etc.), partitioning in a vertical direction may be applied and when a size of a coding block is n×128, partitioning in a horizontal direction may be applied.

Alternatively, a partitioning shape of a coding block or a transform block may be determined based on an intra prediction mode of a coding block or a transform block. In an example, when an intra prediction mode of a coding block is in a horizontal direction or in a direction similar to a horizontal direction, partitioning in a vertical direction may be applied to a coding block. In this case, an intra prediction mode in a direction similar to a horizontal direction represents an intra prediction mode (e.g., INTRA_ANGULAR18±N) that an index difference value with an intra prediction mode in a horizontal direction (e.g., INTRA_ANGULAR18 shown in FIG. 21(b)) is equal to or less than a threshold value. On the other hand, when an intra prediction mode of a coding block is in a vertical direction or in a direction similar to a vertical direction, partitioning in a horizontal direction may be applied to a coding block. In this case, an intra prediction mode in a direction similar to a vertical direction represents an intra prediction mode (e.g., INTRA_ANGULAR50±N) that an index difference value with an intra prediction mode in a vertical direction (e.g., INTRA_ANGULAR50 shown in FIG. 21(b)) is equal to or less than a threshold value. In this case, a threshold value N may be a predefined value in an encoder and a decoder. Alternatively, information for determining a threshold value N may be signaled in a level of a sequence, a picture or a slice.

When both partitioning in a vertical direction and partitioning in a horizontal direction are available, a partitioning shape of a coding block may be determined by parsing information representing a partitioning shape of a coding block.

The number of sub-blocks may be determined based on at least one of a size or a shape of a coding block or a transform block. In an example, when any one of a width or a height of a coding block is 8 and the other is 4, a coding block may be partitioned into 2 sub-blocks. On the other hand, when both a width and a height of a coding block are equal to or greater than 8 or when any one of a width or a height of a coding block is greater than 8, a coding block may be partitioned into 4 sub-blocks. In summary, when a coding block has a 4×4 size, a coding block may not be partitioned into sub-blocks. When a coding block has a 4×8 or 8×4 size, a coding block may be partitioned into 2 sub-blocks. Otherwise, a coding block may be partitioned into 4 sub-blocks.

Alternatively, information representing a size or a shape of a sub-block or the number of sub-blocks may be signaled in a bitstream. A size or a shape of sub-blocks may be determined by information representing the number of sub-blocks. Alternatively, the number of sub-blocks may be determined by information representing a size or a shape of sub-blocks.

When a sub-partition intra encoding method is applied, sub-blocks generated by partitioning a coding block or a transform block may use the same intra prediction mode. In an example, MPMs for a coding block may be derived based on an intra prediction mode of neighboring blocks neighboring a coding block and an intra prediction mode for a coding block may be determined based on derived MPMs. When an intra prediction mode of a coding block is determined, each sub-block may perform intra prediction by using a determined intra prediction mode.

When a sub-partition intra encoding method is applied, any one of MPMs may be determined as an intra prediction mode of a coding block. In other words, when a sub-partition intra encoding method is applied, a MPM flag may be considered to be true although a MPM flag is not signaled.

Alternatively, when a sub-partition intra encoding method is applied, any one of predefined candidate intra prediction modes may be determined as an intra prediction mode of a coding block. In an example, any one of an intra prediction mode in a horizontal direction, an intra prediction mode in a vertical direction, an intra prediction mode in a diagonal direction (e.g., at least one of a top-left intra prediction mode, a top-right intra prediction mode or a bottom-left intra prediction mode) or a nondirectional intra prediction mode (e.g., at least one of a planar or a DC) may be determined as an intra prediction mode of a coding block. Index information specifying any one of predefined candidate intra prediction modes may be signaled in a bitstream. Alternatively, according to a partitioning direction of a coding block, the number and/or type of candidate intra prediction modes may be different. In an example, when partitioning in a horizontal direction is applied to a coding block, at least one of a nondirectional intra prediction mode, an intra prediction mode in a vertical direction, an intra prediction mode in a top-left diagonal direction or an intra prediction mode in a top-right diagonal direction may be set as a candidate intra prediction mode. On the other hand, when partitioning in a vertical direction is applied to a coding block, at least one of a nondirectional intra prediction mode, an intra prediction mode in a horizontal direction, an intra prediction mode in a top-left diagonal direction or an intra prediction mode in a bottom-left diagonal direction may be set as a candidate intra prediction mode.

A quantization parameter of sub-blocks may be individually determined. Accordingly, a value of a quantization parameter of each sub-block may be differently set. Information representing a difference value with a quantization parameter of a previous sub-block may be encoded to determine a quantization parameter of each sub-block. In an example, for the N-th sub-block, a different value between a quantization parameter of the N-th sub-block and a quantization parameter of the N−1-th sub-block may be encoded.

Intra prediction of a sub-block may be performed by using a reference sample. In this case, a reference sample may be derived from a reconstructed sample of a neighboring block adjacent to a sub-block. When a neighboring block adjacent to a sub-block is other sub-block included in the same coding block as the sub-block, a reference sample of the sub-block may be derived based on a reconstructed sample of the other sub-block. In an example, when a first sub-block is positioned at the left or the top of a second sub-block, a reference sample of a second sub-block may be derived from a reconstructed sample of a first sub-block. For it, parallel intra prediction may not be applied between sub-blocks. In other words, encoding/decoding may proceed sequentially for sub-blocks included in a coding block. Accordingly, after encoding/decoding of a first sub-block is completed, intra prediction for a second sub-block may be performed.

When a sub-partition intra encoding method is applied, it may be set not to use a multi-line intra prediction encoding method selecting any one of a plurality of reference sample line candidates. When a multi-line intra prediction encoding method is not used, an adjacent reference sample line adjacent to each sub-block may be determined as a reference sample line of each sub-block. Alternatively, when an index of a reference sample line of a current block is greater than 0, encoding of intra_subpartitions_mode_flag, a syntax factor representing whether a sub-partition intra encoding method is applied, may be omitted. When encoding of a syntax, intra_subpartitions_mode_flag, is omitted, a sub-partition intra encoding method may not be applied.

Filtering may be performed for a sample adjacent to a boundary between sub-blocks. A filter may be performed for a prediction sample or a reconstructed sample. In an example, when it is assumed that a second sub-block is adjacent to the right of a first sub-block, a prediction sample or a reconstructed sample bordering a left boundary of a second sub-block may be filtered by using a reconstructed sample bordering a right boundary of a first sub-block.

Whether a filter will be applied to a sample adjacent to a boundary between sub-blocks may be determined based on at least one of an intra prediction mode, a size of a sub-block or the number of sub-blocks.

When a prediction block is generated by performing intra prediction, prediction samples may be updated based on a position of each prediction sample included in a prediction block. Such an update method may be referred to as a sample position-based intra weighted prediction method (or, Position Dependent Prediction Combination, PDPC).

Whether PDPC will be used may be determined by considering a size or a shape of a current block, an intra prediction mode, a reference sample line of a current block, a size of a current block or a color component. In an example, PDPC may be used when an intra prediction mode of a current block is at least one of a planar, a DC, a vertical direction, a horizontal direction, a mode whose index value is smaller than a vertical direction or a mode whose index value is greater than a horizontal direction. Alternatively, PDPC may be used only when at least one of a width or a height of a current block is greater than 4. Alternatively, PDPC may be used only when an index of a reference picture line of a current block is 0. Alternatively, PDPC may be used only when an index of a reference picture line of a current block is equal to or greater than a predefined value. Alternatively, PDPC may be used only for a luma component. Alternatively, whether PDPC is used may be determined according to whether two or more of the enumerated conditions are satisfied.

Alternatively, whether PDPC is used may be determined according to whether a sub-partition intra encoding method is used. In an example, when a sub-partition intra encoding method is applied to a coding block or a transform block, PDPC may be set not to be used. Alternatively, when a sub-partition intra encoding method is applied to a coding block or a transform block, PDPC may be applied to at least one of a plurality of sub-blocks. In this case, a sub-block targeted for PDPC may be determined based on at least one of a size, a shape, a position, an intra prediction mode or a reference sample line index of a coding block or a sub-block. In an example, PDPC may be applied to a sub-block adjacent to an upper and/or left boundary of a coding block or a sub-block adjacent to a lower and/or right boundary of a coding block. Alternatively, based on a size or a shape of a sub-block, it may be set to apply PDPC to all sub-blocks included in a coding block or it may be set not to apply PDPC to all sub-blocks included in a coding block. In an example, when at least one of a width or a height of a sub-block is smaller than a threshold value, application of PDPC may be omitted. In another example, PDPC may be applied to all sub-blocks in a coding block.

Alternatively, whether PDPC is applied may be determined per sub-block according to whether at least one of a size, a shape, an intra prediction mode or a reference picture index of sub-blocks generated by partitioning a coding block or a transform block satisfies a preset condition. In an example, PDPC may be applied to a sub-block when at least one of a width or a height of a sub-block is greater than 4.

In another example, information representing whether PDPC is applied may be signaled in a bitstream.

Alternatively, a region to which PDPC is applied may be determined based on at least one of a size, a shape or an intra prediction mode of a current block or a position of a prediction sample. In an example, when an intra prediction mode of a current block has an index greater than a vertical direction, a prediction sample that at least one of a x-axis coordinate or a y-axis coordinate is greater than a threshold value may not be modified and modification may be performed only for a prediction sample that a x-axis coordinate or a y-axis coordinate is equal to or less than a threshold value. Alternatively, when an intra prediction mode of a current block has an index smaller than a horizontal direction, a prediction sample that at least one of a x-axis coordinate or a y-axis coordinate is greater than a threshold value may not be modified and modification may be performed only for a prediction sample that a x-axis coordinate or a y-axis coordinate is equal to or less than a threshold value. In this case, a threshold value may be determined based on at least one of a size, a shape or an intra prediction mode of a current block.

When a prediction sample is obtained through an intra prediction sample, a reference sample used to modify the prediction sample may be determined based on a position of an obtained prediction sample.

A residual signal may be obtained by differentiating a prediction sample from an original sample of a current block after performing intra prediction for a current block. In this case, a derived difference may be encoded after deriving a difference between a residual signal at a specific position and a neighboring residual signal, instead of encoding a residual signal at a specific position as it is. In this case, a residual signal may represent a residual sample, a transform coefficient generated by transforming a residual sample or a coefficient generated by skipping transform.

For example, encoding for a differential residual value may be performed after differentiating a residual signal belonging to a first line and a residual signal belonging to a second line, instead of encoding a residual signal belonging to a second line as it is. In this case, for a first line and a second line, at least one of a x-axis coordinate or a y-axis coordinate may be different.

In an example, an encoder may generate a transform coefficient by transforming a residual sample and encode a difference between a generated transform coefficient and a transform coefficient derived by differentiating a neighboring transform coefficient. A decoder may set a transform coefficient belonging to a first line as a transform coefficient prediction value for a second residual signal and derive a second transform coefficient by adding a decoded difference transform coefficient to a transform coefficient prediction value.

As above, when a residual difference value is encoded/decoded after differentiating residual signals, it may be referred to as intra BDPCM (Block-based Delta Pulse Code Modulation). Intra BDPCM may be used only when a prediction encoding mode of a current block is determined as intra prediction.

When intra BDPCM is applied, a prediction sample of a current block may be set to be 0. In other words, when intra BDPCM is applied, a residual sample may be set as a reconstructed sample.

Alternatively, when intra BDPCM is applied, a prediction sample of a current block may be derived based on intra prediction. In this case, an intra prediction mode of a current block may be determined according to an intra BDPCM direction. In an example, when an intra BDPCM direction is horizontal, a prediction sample may be obtained based on an intra prediction mode in a horizontal direction. When an intra BDPCM direction is vertical, a prediction sample may be obtained based on an intra prediction mode in a vertical direction.

Alternatively, a prediction sample of a current block may be derived by using a default intra prediction mode. A default intra prediction mode may be any one of DC, planar, horizontal or vertical. A default intra prediction mode may be predefined in an encoder and a decoder. Information specifying one of a default intra prediction mode may be encoded and signaled.

Alternatively, an intra prediction mode may be derived from one of a plurality of MPM candidates.

When intra BDPCM is applied to a current block, it may be forced to use an adjacent reference sample line. In other words, a prediction sample may be obtained by omitting signaling of index information specifying one of reference sample lines and by using an adjacent reference sample line.

When an intra BDPCM method is applied, information for determining an intra BDPCM direction may be signaled in a bitstream. In an example, intra_bdpcm_dir_flag, a flag representing an intra BDPCM direction, may be signaled in a bitstream. When a syntax, intra_bdpcm_dir_flag, is 0, it represents that BDPCM in a horizontal direction is applied and when a syntax, intra_bdpcm_dir_flag, is 1, it represents that BDPCM in a vertical direction is applied.

Alternatively, an intra BDPCM direction may be determined based on a size or a shape of a current block. In an example, when a current block has a non-square shape that a width is greater than a height, it may be determined that BDPCM in a horizontal direction is applied. On the other hand, when a current block has a non-square shape that a height is greater than a width, it may be determined that BDPCM in a vertical direction is applied.

Alternatively, an intra BDPCM direction may be determined by considering intra prediction modes of neighboring blocks neighboring a current block. In an example, when at least one intra prediction mode of left and top blocks of a current block is in a horizontal direction or in a direction similar to it, BDPCM in a horizontal direction may be applied to a current block. In this case, a direction similar to a horizontal direction means an intra prediction mode that a difference with an intra prediction mode in a horizontal direction is equal to or less than a threshold value. Alternatively, when at least one intra prediction mode of left and top blocks of a current block is in a vertical direction or in a direction similar to it, BDPCM in a vertical direction may be applied to a current block. In this case, a direction similar to a vertical direction means an intra prediction mode that a difference with an intra prediction mode in a vertical direction is equal to or less than a threshold value.

When BDPCM in a horizontal direction is applied, a difference value between a residual signal and a residual signal neighboring a top of the residual signal may be encoded. A decoder may derive a residual signal by adding a top residual signal to a decoded difference value.

When BDPCM in a vertical direction is applied, a difference value between a residual signal and a residual signal neighboring a left of the residual signal may be encoded. A decoder may derive a residual signal by adding a left residual signal to a decoded difference value.

Alternatively, undirected BDPCM may be applied. In an example, DC BDPCM means that a difference between a residual signal at a predetermined position and an average value of neighboring residual signals at a predetermined position is encoded/decoded. Planar BDPCM means that an average or a weighted sum result of a difference value in a horizontal direction, a difference between a residual signal at a predetermined position and a residual signal positioned in a horizontal direction of a residual signal at the predetermined position, and a difference value in a vertical direction, a difference between a residual signal at the predetermined position and a residual signal positioned in a vertical direction of a residual signal at the predetermined position, is encoded/decoded.

Information for specifying an available BDPCM mode may be signaled in a bitstream. The information may be information representing whether undirected BDPCM is applied or information for specifying any one of a plurality of BDPCM candidates which may be applied to a current block.

Information representing whether intra BDPCM will be applied to a current block may be signaled in a bitstream. In an example, a flag, intra_bdpcm_flag, may be signaled in a bitstream. When a syntax, intra_bdpcm_flag, is 1, it represents that intra BDPCM is applied to a current block. When a syntax, intra_bdpcm_flag, is 0, it represents that intra BDPCM is not applied to a current block.

At a level of a picture or a sequence, information representing availability of intra BDPCM may be signaled. In an example, sps_intra_bdpcm_flag, a flag representing availability of intra BDPCM, may be signaled through a sequence parameter set (SPS). When a syntax, sps_intra_bdpcm_flag, is 1, it represents that pictures referring to a sequence parameter set may use intra BDPCM. When a syntax, sps_intra_bdpcm_flag, is 0, it represents that pictures referring to a sequence parameter set may not use intra BDPCM. intra_bdpcm_flag representing whether intra BDPCM is applied to a current block may be signaled only when sps_intra_bdpcm_flag is 1.

When intra BDPCM is applied to a current block, PDPC may be set not to be used.

When intra BDPCM is applied to a current block, it may be set to force application of transform skip. In other words, when intra BDPCM is applied to a current block, that value may be considered to be 1 although transform skip flag representing whether transform skip is applied is not signaled.

A combined prediction mode is a method in which a prediction image is generated by combining two or more prediction modes. In an example, when a combined prediction mode is applied, a prediction block may be generated by averaging a first prediction block generated based on a first prediction mode and a second prediction block generated based on a second prediction mode or through a weighted sum operation using them. A prediction mode may include at least one of an intra prediction mode, a merge mode, an AMVP mode, a skip mode, an intra block copy mode or a palette mode. In an example, a first prediction mode may be a merge mode and a second prediction mode may be an intra prediction mode.

When a combined prediction mode that a merge mode and an intra prediction mode are combined is used, a prediction block of a current block may be generated by weighted prediction of a first prediction block obtained based on motion information and a second prediction block obtained based on a predetermined intra prediction mode. Motion information of a current block may be derived from a merge candidate specified by merge_idx, an index signaled in a bitstream. An intra prediction mode of a current block may be set as a predefined intra prediction mode. A predefined intra prediction mode may be a planar, DC, horizontal or vertical mode. Alternatively, an intra prediction mode of a neighboring block may be set as an intra prediction mode of a current block.

A flag representing whether a combined prediction mode is applied to a current block may be signaled in a bitstream. In an example, a syntax, ciip_flag, may be signaled in a bitstream. When a value of a syntax, ciip_flag, is 1, it represents that a combined prediction mode is applied to a current block. When a value of a syntax, ciip_flag, is 0, it represents that a combined prediction mode is not applied to a current block. When a combined prediction mode is not applied to a current block, at least one of a merge offset encoding method or a triangular partitioning method may be applied.

A residual image may be derived by subtracting a prediction image from an original image. In this connection, when the residual image is converted into a frequency domain, even though high frequency components are removed from frequency components, subjective image quality of the image does not drop significantly. Accordingly, when values of high frequency components are transformed into small values, or when values of high frequency components are set to 0, compression efficiency may be increased without causing large visual distortion. Reflecting the above feature, transform may be performed on a current block so as to decompose a residual image to two-dimensional frequency components. The transform may be performed by using transform methods such as DCT (discrete cosine transform), DST (discrete sine transform), etc.

DCT is to decompose (or transform) a residual image into a two-dimensional frequency component by using cosine transform and DST is to compose (or transform) a residual image into a two-dimensional frequency component by using sine transform. As a result of transforming a residual image, frequency components may be represented as a base image. In an example, when DCT transform is performed for a N×N sized block, N2 basic pattern components may be obtained. A size of each of basic pattern components included in a N×N sized block may be obtained through transform. According to a used transform method, a size of a basic pattern component may be referred to as a DCT coefficient or a DST coefficient.

A transform method DCT is mainly used to transform an image that a lot of non-zero low frequency components are distributed. A transform method DST is mainly used for an image that a lot of high frequency components are distributed.

It is also possible to transform a residual image by using a transform method other than DCT or DST.

Hereinafter, transforming a residual image into two-dimensional frequency components is referred to as two-dimensional image transform. In addition, a size of basic pattern components obtained by transform is referred to as a transform coefficient. In an example, a transform coefficient may mean a DCT coefficient or a DST coefficient. When both the after-described first transform and second transform are applied, a transform coefficient may mean a basic pattern component generated by a result of the second transform. In addition, a residual sample to which transform skip is applied is also referred to as a transform coefficient.

A transform method may be determined in a unit of a block. A transform method may be determined based on at least one of a prediction encoding mode of a current block, a size of a current block or a shape of a current block. In an example, when a current block is encoded by an intra-prediction mode and a size of a current block is smaller than N×N, transform may be performed by using a DST transform method. On the other hand, when the condition is not satisfied, transform may be performed by using a DCT transform method.

Two-dimensional image transform may not be performed for some blocks of a residual image. Not performing two-dimensional image transform may be referred to as transform skip. The transform skip represents that the first transform and the second transform are not applied to the current block. When transform skip is applied, quantization may be applied to residual values for which transform is not performed.

Whether transform skip is allowed for a current block may be determined based on at least one of a size or a shape of a current block. In an example, only when a size of a current block is smaller than a threshold value, transform skip may be applied. The threshold value is related to at least one of a width, a height or the number of samples of a current block, and may be defined as 32×32, etc. Alternatively, transform skip may be allowed only for a square block. In an example, transform skip may be allowed for a 32×32, 16×16, 8×8 or 4×4 sized square block. Alternatively, only when a sub-partition intra encoding method is not used, transform skip may be allowed.

Alternatively, when a sub-partition intra encoding method is applied to a current block, whether transform skip is applied per sub-partition may be determined.

FIG. 30 is a diagram showing an example in which whether transform skip is performed is determined per sub-block.

Transform skip may be applied only for part of a plurality of sub-blocks. In an example, as in an example shown in FIG. 30, it may be set to apply transform skip to a sub-block at a top position of a current block and not to apply transform skip for a sub-block at a bottom position.

A transform type of a sub-block that transform skip is not allowed may be determined based on information signaled in a bitstream. In an example, a transform type may be determined based on tu_mts_idx which will be described after.

Alternatively, a transform type of a sub-block may be determined based on a size of a sub-block. In an example, a horizontal directional transform type may be determined based on whether a width of a sub-block is equal to or greater than and/or equal to or less than a threshold value, and a vertical directional transform type may be determined based on whether a height of a sub-block is equal to or greater than and/or equal to or less than a threshold value.

Alternatively, information for determining a transform type may be signaled for a coding block and a transform type specified by the information may be commonly applied to sub-blocks included in a coding block. In other words, a transform type of sub-blocks in a coding block may be equally set.

After performing transform on a current block by using DCT or DST, transform may be performed again on the transformed current block. In this connection, transform based on DCT or DST may be defined as first transform, and performing transform again on a block to which first transform is applied may be defined as second transform.

First transform may be performed by using any one of a plurality of transform core candidates. In an example, first transform may be performed by using any one of DCT2, DCT8, or DST7.

A different transform core may be used for a horizontal direction and a vertical direction. Information representing a combination of a transform core in a horizontal direction and a transform core in a vertical direction may be signaled in a bitstream. In an example, the above-described tu_mts_idx may indicate one of combinations of a transform core in a horizontal direction and a transform core in a vertical direction.

A processing unit of first transform may differ with second transform. In an example, first transform may be performed on an 8×8 block, and second transform may be performed on a 4×4 sized sub-block within the transformed 8×8 block. Alternatively, the second transform may be performed for transform coefficients which belong to 3 4×4 sized sub-blocks. The 3 sub-blocks may include a sub-block positioned at the top-left of a current block, a sub-block neighboring the right of the sub-block and a sub-block neighboring the bottom of the sub-block. Alternatively, the second transform may be performed for a 8×8 sized block.

It is also possible that transform coefficients in a remaining region on which the second transform is not performed may be set to 0.

Alternatively, first transform may be performed on a 4×4 block, and second transform may be performed on a region having an 8×8 size including the transformed 4×4 block.

Information representing a transform type of a current block may be signaled in a bitstream. The information may be index information, tu_mts_idx, representing one of combinations of a transform type for a horizontal direction and a transform type for a vertical direction.

Based on transform type candidates specified by index information, tu_mts_idx, a transform core for a vertical direction and a transform core for a horizontal direction may be determined. Table 7 represents transform type combinations according to tu_mts_idx.

TABLE 7

| tu_mts_idx | transform type | |
|---|---|---|
| | horizontal | vertical |
| 0 | DCT-II | DCT-II |
| 1 | DST-VII | DST-VII |
| 2 | DCT-VIII | DST-VII |
| 3 | DST-VII | DCT-VIII |
| 4 | DCT-VIII | DCT-VIII |

A transform type may be determined as one of DCT2, DST7 or DCT8. Alternatively, transform skip may be inserted in a transform type candidate.

When Table 7 is used, DCT2 may be applied in a horizontal direction and in a vertical direction when tu_mts_idx is 0. When tu_mts_idx is 2, DCT8 may be applied in a horizontal direction and DCT7 may be applied in a vertical direction.

When a sub-partition intra encoding method is applied, a transform core of a sub-block may be independently determined. In an example, information for specifying a transform type combination candidate may be encoded and signaled per sub-block. Accordingly, a transform core between sub-blocks may be different.

Alternatively, sub-blocks may use the same transform type. In this case, tu_mts_idx specifying a transform type combination candidate may be signaled only for the first sub-block. Alternatively, tu_mts_idx may be signaled in a coding block level and a transform type of sub-blocks may be determined by referring to tu_mts_idx signaled in a coding block level. Alternatively, a transform type may be determined based on at least one of a size, a shape or an intra-prediction mode of one among sub-blocks and a determined transform type may be set to be used for all sub-blocks.

FIG. 31 is a diagram showing an example in which sub-blocks use the same transform type.

When a coding block is partitioned in a horizontal direction, a transform type of a sub-block at a top position of a coding block (Sub-CU0) may be set the same as that of a sub-block at a bottom position (Sub-CU1). In an example, as in an example shown in FIG. 31 (a), when a horizontal transform type and a vertical transform type are determined based on tu_mts_idx signaled for a top sub-block, a determined transform type may be also applied to a bottom sub-block.

When a coding block is partitioned in a vertical direction, a transform type of a sub-block at a left position of a coding block (Sub-CU0) may be set the same as that of a sub-block at a right position (Sub-CU1). In an example, as in an example shown in FIG. 31 (b), when a horizontal transform type and a vertical transform type are determined based on tu_mts_idx signaled for a left sub-block, a determined transform type may be also applied to a right sub-block.

Whether index information is encoded or not may be determined based on at least one of a size or a shape of a current block, the number of non-zero coefficients, whether the second transform is performed or whether a sub-partition intra encoding method is applied. In an example, when a sub-partition intra encoding method is applied to a current block, or when the number of non-zero coefficients is equal to or smaller than a threshold value, signaling of index information may be omitted. When signaling of index information is omitted, a default transform type may be applied to a current block.

A default transform type may include at least one of DCT2 or DST7. When there are a plurality of default transform types, one of a plurality of default transform types may be selected by considering at least one of a size, a shape or an intra-prediction mode of a current block, whether the second transform is performed or whether a sub-partition intra encoding method is applied. In an example, one of a plurality of transform types may be determined as a horizontal directional transform type based on whether a width of a current block is in a preset range, and one of a plurality of transform types may be determined as a vertical directional transform type based on whether a height of a current block is in a preset range. Alternatively, a default mode may be determined differently according to a size, a shape or an intra-prediction mode of a current block or whether the second transform is performed.

Alternatively, when only a transform coefficient of a DC component exists in a current block, a horizontal directional transform type and a vertical directional transform type may be set as a default transform type. In an example, when only a transform coefficient of a DC component exists in a current block, a horizontal directional transform type and a vertical directional transform type may be set as DCT2.

A threshold value may be determined based on a size or a shape of a current block. In an example, when a size of a current block is equal to or smaller than 32×32, a threshold value may be set to be 2, and when a current block is greater than 32×32 (e.g., when a current block is a 32×64 or 64×32 sized coding block), a threshold value may be set to be 4.

A plurality of look-up tables may be prestored in an encoding device/a decoding device. At least one of an index value assigned to transform type combination candidates, a type of transform type combination candidates or the number of transform type combination candidates may be different for each of the plurality of look-up tables.

Based on at least one of a size, a shape or an intra-prediction mode of a current block, whether the second transform is applied or not, or whether transform skip is applied to a neighboring block, a look-up table for a current block may be selected.

In an example, when a size of a current block is equal to or less than 4×4, or when a current block is encoded by inter-prediction, a first look-up table may be used and when a size of a current block is greater than 4×4, or when a current block is encoded by intra-prediction, a second look-up table may be used.

Alternatively, information indicating one of a plurality of look-up tables may be signaled in a bitstream. A decoding device may select a look-up table for a current block based on the information.

In another example, an index assigned to a transform type combination candidate may be adaptively determined based on at least one of a size, a shape, a prediction encoding mode or an intra-prediction mode of a current block, whether the second transform is applied or not, or whether transform skip is applied to a neighboring block. In an example, an index assigned to transform skip when a size of a current block is 4×4 may be smaller than an index assigned to transform skip when a size of a current block is greater than 4×4. Concretely, when a size of a current block is 4×4, an index 0 may be assigned to transform skip and when a current block is greater than 4×4 and equal to or less than 16×16, an index greater than 0 (e.g., an index 1) may be assigned to transform skip. When a current block is greater than 16×16, the maximum value (e.g., 5) may be assigned to an index of transform skip.

Alternatively, when a current block is encoded by inter-prediction, an index 0 may be assigned to transform skip. When a current block is encoded by intra-prediction, an index greater than 0 (e.g., an index 1) may be assigned to transform skip.

Alternatively, when a current block is a 4×4 sized block encoded by inter-prediction, an index 0 may be assigned to transform skip. On the other hand, when a current block is not encoded by inter-prediction, or when a current block is greater than 4×4, an index greater than 0 (e.g., an index 1) may be assigned to transform skip.

It is also possible to use transform type combination candidates different from transform type combination candidates enumerated in Table 7. In an example, a transform type combination candidate which is consisted of transform skip applied to one of a horizontal directional transform or a vertical directional transform and a transform core such as DCT2, DCT8 or DST7, etc. applied to the other can be used. In this case, whether transform skip will be used as a transform type candidate for a horizontal direction or a vertical direction may be determined based on at least one of a size (e.g., a width and/or a height), a shape, a prediction encoding mode or an intra-prediction mode of a current block.

Information representing whether index information for determining a transform type of a current block is explicitly signaled may be signaled in a bitstream. In an example, sps_explicit_intra_mts_flag, information representing whether an explicit transform type determination is allowed for a block encoded by intra-prediction, and/or sps_explicit_inter_mts_flag, information representing whether an explicit transform type determination is allowed for a block encoded by inter-prediction, may be signaled at a sequence level.

When an explicit transform type determination is allowed, a transform type of a current block may be determined based on index information, tu_mts_idx, signaled in a bitstream. On the other hand, when an explicit transform type determination is not allowed, a transform type may be determined based on at least one of a size or a shape of a current block, whether it is allowed to perform transform in a unit of a sub-block, a position of a sub-block including a non-zero transform coefficient, whether the second transform is performed or not, or whether a sub-partition intra encoding method is applied or not. In an example, a horizontal directional transform type of a current block may be determined based on a width of a current block and a vertical directional transform type of a current block may be determined based on a height of a current block. For example, when a width of a current block is smaller than 4 or greater than 16, a horizontal directional transform type may be determined as DCT2. Otherwise, a horizontal directional transform type may be determined as DST7. When a height of a current block is smaller than 4 or greater than 16, a vertical directional transform type may be determined as DCT2. Otherwise, a vertical directional transform type may be determined as DST7. In this case, a threshold value which is to be compared with a width and a height may be determined based on at least one of a size, a shape or an intra-prediction mode of a current block to determine a horizontal directional transform type and a vertical directional transform type.

Alternatively, when a current block has a square shape whose height and width are the same, a horizontal directional transform type and a vertical directional transform type may be set the same, but when a current block has a non-square shape whose height and width are different from each other, a horizontal directional transform type and a vertical directional transform type may be set differently. In an example, when a width of a current block is greater than a height, a horizontal directional transform type may be determined as DST7 and a vertical directional transform type may be determined as DCT2. When a height of a current block is greater than a width, a vertical directional transform type may be determined as DST7 and a horizontal directional transform type may be determined as DCT2.

The number and/or type of transform type candidates or the number and/or type of transform type combination candidates may be different according to whether an explicit transform type determination is allowed or not. In an example, when an explicit transform type determination is allowed, DCT2, DST7 and DCT8 may be used as transform type candidates. Accordingly, each of a horizontal directional transform type and a vertical directional transform type may be set as DCT2, DST8 or DCT8. When an explicit transform type determination is not allowed, only DCT2 and DST7 may be used as a transform type candidate. Accordingly, each of a horizontal directional transform type and a vertical directional transform type may be determined as DCT2 or DST7.

A coding block or a transform block may be partitioned into a plurality of sub-blocks and transform may be performed only for part of a plurality of sub-blocks. Applying transform to only part of a plurality of sub-blocks may be defined as a sub-transform block encoding method.

FIGS. 32 and 33 are diagrams showing an application aspect of a sub-transform block encoding method.

FIG. 32 is a diagram showing an example in which transform is performed only for one of 4 sub-blocks and FIG. 50 is a diagram showing an example in which transform is performed only for any one of 2 sub-blocks. In FIGS. and 33, it is assumed that transform is performed only for a sub-block on which 'Target' is marked.

As in an example shown in FIG. 32, after a coding block is partitioned into 4 sub-blocks by using a vertical line and a horizontal line which are mutually orthogonal, transform and quantization may be performed only for one of them. Transform coefficients in a sub-block on which transform is not performed may be set to 0.

Alternatively, as in an example shown in FIG. 33, after a coding block is partitioned into 2 sub-blocks by using a vertical line or a horizontal line, transform and quantization may be performed only for one of them. Transform coefficients in a sub-block on which transform is not performed may be set to 0.

Information representing whether a sub-transform block encoding method is applied to a coding block may be signaled in a bitstream. The information may be a 1-bit flag, cu_sbt_flag. When the flag is 1, it represents that transform is performed only for part of a plurality of sub-blocks generated by partitioning a coding block or a transform block, and when the flag is 0, it represents that transform is performed without partitioning a coding block or a transform block into sub-blocks.

Whether a sub-transform block encoding method may be used for a coding block may be determined based on at least one of a size, a shape or a prediction encoding mode of a coding block, or whether a combined prediction mode is used for a coding block. In an example, when at least one of a case in which at least one of a width or a height of a coding block is equal to or greater than a threshold value, a case in which inter-prediction is applied to a coding block, or a case in which a combined prediction mode is not applied to a coding block is satisfied, a sub-transform block encoding method may be available for a coding block. In this case, a threshold value may be a natural number such as 4, 8, or 16, etc.

Alternatively, when a ration between a width and a height of the coding block is greater than a threshold value, it may not be allowed to apply the sub-transform block encoding method.

When intra-prediction is applied to a coding block or when an intra block copy mode is applied, a sub-transform block encoding method may be determined to be unavailable.

Alternatively, whether a sub-transform block encoding method is available for a coding block may be determined based on whether a sub-partition intra encoding method is applied to a coding block. In an example, when a sub-partition intra encoding method is applied, a sub-transform block encoding method may be determined to be available.

When a sub-transform block encoding method is determined to be available for a coding block, a syntax, cu_sbt_flag, may be signaled in a bitstream. According to a value of parsed cu_sbt_flag, whether a sub-transform block encoding method is applied may be determined.

On the other hand, when a sub-transform block encoding method is determined to be unavailable for a coding block, signaling of a syntax, cu_sbt_flag, may be omitted. When signaling of a syntax, cu_sbt_flag, is omitted, it may be determined not to apply a sub-transform block encoding method to a coding block.

When a sub-transform encoding method is applied to a coding block, information representing a partitioning shape of a coding block may be signaled in a bitstream. Information representing a partitioning shape of a coding block may include at least one of information representing whether a coding block is partitioned to include a ¼ sized sub-block, information representing a partitioning direction of a coding block or information representing the number of sub-blocks.

In an example, when a syntax, cu_sbt_flag, is 1, a flag, cu_sbt_quadtree_flag, representing whether a coding block is partitioned to include a ¼ sized sub-block, may be signaled.

When a syntax, cu_sbt_quadtree_flag, is 1, it represents that a coding block is partitioned to include a ¼ sized sub-block. In an example, a coding block may be partitioned into a sub-block whose width is ¼ of a width of a coding block and a sub-block whose width is ¾ of a width of a coding block or may be partitioned into a sub-block whose height is ¼ of a height of a coding block and a sub-block whose height is ¾ of a height of a coding block by using 1 vertical line or 1 horizontal line. Alternatively, a coding block may be partitioned to include a sub-block that each of a width and a height are ½ of a width and a height of a coding block. When a coding block is partitioned to include a ¼ sized sub-block, it may be referred to as quad type partitioning. When a syntax, cu_sbt_quad_tree_flag, is 1, a ¼ sized sub-block of a coding block may be set as a transform target.

When a syntax, cu_sbt_quadtree_flag, is 0, it represents that a coding block is partitioned to include a ½ sized sub-block. In an example, a coding block may be partitioned into 2½ sized sub-blocks by using 1 vertical line or 1 horizontal line. Partitioning a coding block into 2½ sized sub-blocks may be referred to as binary type partitioning. When a value of the syntax cu_sbt_quad_tree_flag is 0, a ½ sized sub-block of the coding block may be included in the coding block.

In addition, a flag representing a partitioning direction of a coding block may be signaled in a bitstream. In an example, a flag, cu_sbt_horizontal_flag, representing whether horizontal directional partitioning is applied to a coding block may be encoded and signaled. When a value of cu_sbt_horizontal_flag is 1, it represents that horizontal directional partitioning using at least one partitioning line parallel to a top side and a bottom side of a coding block is applied. When a value of cu_sbt_horizontal_flag is 0, it represents that vertical directional partitioning using at least one partitioning line parallel to a left side and a right side of a coding block is applied.

According to a size or a shape of a coding block, a partitioning shape of a coding block may be determined. In an example, quad type partitioning may be available when at least one of a width or a height of a coding block is equal to or greater than the first threshold value. In an example, the first threshold value may be a natural number such as 4, 8, or 16. The first threshold value may be referred to as a quad type threshold value.

When quad type partitioning is determined to be available, a syntax, cu_sbt_quadtree_flag, may be signaled in a bitstream. According to a value of parsed cu_sbt_quadtree_flag, whether quad type partitioning is applied to a coding block may be determined.

When quad type partitioning is determined to be unavailable, signaling of a syntax, cu_sbt_quadtree_flag, may be omitted. When signaling of a syntax, cu_sbt_quadtree_flag, is omitted, it may be determined to apply binary type partitioning to a coding block.

Table 8 illustrates a syntax structure for determining whether a syntax, cu_sbt_quadtree_flag, is parsed.

TABLE 8

| | Descriptor |
|---|---|
| coding_unit( x0, y0, cbWidth, cbHeight, treeType ) { | |
| ... | |
|   if( !pcm_flag[ x0 ][ y0 ] ) { | |
|     if( CuPredMode[ x0 ][ y0 ] != MODE_INTRA && merge_flag[ x0 ][ y0 ] = = 0 ) | |
|       cu_cbf | ae(v) |
|     if( cu_cbf ) { | |
|       if( CuPredMode[ x0 ][ y0 ] = = MODE_INTER && sps_sbt_enabled_flag && | |
|         !ciip_flag[ x0 ][ y0 ] ) { | |
|         if( cbWidth <= MaxSbtSize && cbHeight <= MaxSbtSize ) { | |
|           allowSbtVerH = cbWidth >= 8 | |
|           allowSbtVerQ = cbWidth >= 16 | |
|           allowSbtHorH = cbHeight >= 8 | |
|           allowSbtHorQ = cbHeight >= 16 | |
|           if( allowSbtVerH \|\| allowSbtHorH \|\| allowSbtVerQ \|\| allowSbtHorQ ) | |
|             cu_sbt_flag | ae(v) |
|         } | |
|         if( cu_sbt_flag ) { | |
|           if( ( allowSbtVerH \|\| allowSbtHorH ) && ( allowSbtVerQ && allowSbtHorQ) ) | |
|             cu_sbt_quad_flag | ae(v) |
|           if( ( cu_sbt_quad_flag && allowSbtVerQ && allowSbtHorQ ) \|\| | |
|             ( !cu_sbt_quad_flag && allowSbtVerH && allowSbtHorH ) ) | |
|             cu_sbt_horizontal_flag | ae(v) |
|           cu_sbt_pos_flag | ae(v) |
|         } | |
|       } | |
|     transform_tree( x0, y0, cbWidth, cbHeight, treeType ) | |
|     } | |
|   } | |
| } | |

In Table 8, a variable, allowSbtVerQ, represents whether quad type partitioning in a vertical direction is allowed and a variable, allowSbtHorQ, represents whether quad type partitioning in a horizontal direction is allowed. Variables, allowSbtVerQ and allowSbtHorQ, may be determined based on a quad type threshold value. In an example, when a quad type threshold value is 16, allowSbtVerQ may be determined based on whether a width of a coding block is equal to or greater than 16, and allowSbtHorQ may be determined based on whether a height of a coding block is equal to or greater than 16.

As in an example shown in Table 8, when all variables, allowSbtVerQ and allowSbtHorQ, are true, a syntax, cu_sbt_quad_flag, may be parsed from a bitstream. In an example, when a coding block is 16×8, a variable, allowSbtHorQ, is set to false, so parsing of a syntax, cu_sbt_quad_flag, may be omitted. Alternatively, when a coding block is 8×16, a variable, allowSbtVerQ, is set to false, so parsing of a syntax, cu_sbt_quad_flag, may be omitted. When parsing of a syntax, cu_sbt_quad_flag, is omitted, binary type partitioning may be applied to a coding block.

Alternatively, unlike an example shown in Table 8, when any one of a variable, allowSbtVerQ, or a variable, allowSbtHorQ, is true, a syntax, cu_sbt_quad_flag, may be parsed. In other words, when only any one of a width and a height of a coding block is equal to or greater than a quad type threshold value, quad type partitioning may be available.

Alternatively, although any one of a width or a height of a coding block is equal to or greater than the first threshold value, quad type partitioning of a coding block may be determined to be unavailable when the other of a width or a height of a coding block is equal to or less than the second threshold value. In this case, the second threshold value may have a value smaller than the first threshold value. In an example, the second threshold value may be a natural number such as 2, 4, or 8.

A variable, allowSbtHorH, represents whether binary type partitioning in a horizontal direction is available. Binary type partitioning in a horizontal direction may be set to be available when a height of a coding block is equal to or greater than a threshold value. A variable, allowSbtVerH, represents whether binary type partitioning in a vertical direction is available. Binary type partitioning in a vertical direction may be set to be available when a width of a coding block is equal to or greater than a threshold value. In this case, a threshold value may be a natural number such as 4, 8, or 16.

When both quad/binary type partitioning in a horizontal direction and quad/binary type partitioning in a vertical direction are available, a syntax, cu_sbt_horizontal_flag, may be signaled in a bitstream. According to a value of a syntax, cu_sbt_horizontal_flag, partitioning in a horizontal direction or partitioning in a vertical direction may be applied to a coding block.

On the other hand, when only one of quad/binary type partitioning in a horizontal direction and quad/binary type partitioning in a vertical direction is available, signaling of a syntax, cu_sbt_horizontal_flag, may be omitted. When signaling of a syntax, cu_sbt_horizontal_flag, is omitted, available one among quad/binary type partitioning in a horizontal direction and quad/binary type partitioning in a vertical direction can be applied.

When binary type partitioning in a horizontal direction or binary type partitioning in a vertical direction is unavailable, signaling of a syntax, cu_sbt_horizontal_flag, may be omitted.

When signaling of a syntax, cu_sbt_horizontal_flag, is omitted and a variable, allowSbtHorH, is true, binary type partitioning in a horizontal direction may be applied to a coding block.

When signaling of a syntax, cu_sbt_horizontal_flag, is omitted and a variable, allowSbtVerH, is true, binary type partitioning in a vertical direction may be applied to a coding block.

Information for specifying a sub-block which is a target of transform among a plurality of sub-blocks may be signaled in a bitstream. In an example, a syntax, cu_sbt_pos_flag, may be signaled in a bitstream. A syntax, cu_sbt_pos_flag, represents whether a transform target is the first sub-block in a coding block. In an example, when quad/binary type partitioning in a horizontal direction is applied to a coding block, a leftmost sub-block is determined as a transform target when cu_sbt_flag is 1, and a rightmost sub-block is determined as a transform target when cu_sbt_flag is 0. When quad/binary type partitioning in a vertical direction is applied to a coding block, an uppermost sub-block is determined as a transform target when cu_sbt_pos_flag is 1 and a lowest sub-block is determined as a transform target when cu_sbt_pos_flag is 0.

A transform type of a sub-block may be determined by considering a partitioning direction of a coding block and a position of a sub-block. In an example, when a coding block is partitioned in a vertical direction and transform is performed for a sub-block at a left position among sub-blocks, a horizontal directional transform type and a vertical directional transform type may be set differently.

FIGS. 34 and 35 show a horizontal directional transform type and a vertical directional transform type according to a position of a sub-block which is a target of a transform.

In an example shown in FIG. 34, when a sub-block which is a target of a transform includes a top-left sample or a bottom-right sample of a coding block, a horizontal directional transform type and a vertical directional transform type may be set the same. In an example, an example shown in FIG. 34, it was illustrated that when a sub-block which is a target of a transform includes a top-left sample of a coding block, a horizontal directional transform type and a vertical directional transform type are set as DCT8 and when a sub-block which is a target of a transform includes a bottom-right sample of a coding block, a horizontal directional transform type and a vertical directional transform type are set as DST7.

When a sub-block which is a target of a transform includes a top-right sample or a bottom-left sample of a coding block, a horizontal directional transform type and a vertical directional transform type may be set differently. In an example, an example shown in FIG. 34 illustrated that when a sub-block which is a target of transform includes a top-right sample of a coding block, a horizontal directional transform type is set as DST7 and a vertical directional transform type is set as DCT8. When a sub-block which is a target of a transform includes a bottom-left sample of a coding block, a horizontal directional transform type is set as DCT8 and a vertical directional transform type is set as DST7.

Unlike an example shown in FIG. 34, when a sub-block including a top-left sample or a sub-block including a bottom-right sample in a coding block is determined as a transform target, a horizontal directional transform type and a vertical directional transform type may be set differently and when a sub-block including a top-right sample or a sub-block including a bottom-left sample in a coding block is determined as a transform target, a horizontal directional transform type and a vertical directional transform type may be set the same.

FIG. 34 illustrated that a sub-block whose a height and a width are respectively ½ of a coding block is set as a transform target. Unlike in a shown example, a sub-block whose a width is the same as a coding block, but a height is ¼ of a coding block or a sub-block whose a height is the same as a coding block, but a width is ¼ of a coding block may be set as a transform target.

In an example shown in FIG. 35, when a sub-block which is a target of a transform includes a top-left sample of a coding block, a horizontal directional transform type and a vertical directional transform type may be set differently. In an example, in an example shown in FIG. 35, when binary type partitioning in a horizontal direction is applied and a top sub-block is determined as a transform target, a horizontal directional transform type may be set as DST7 and a vertical directional transform type may be set as DCT7. When binary type partitioning in a vertical direction is applied and a left sub-block is determined as a transform target, a horizontal directional transform type may be set as DCT8 and a vertical directional transform type may be set as DST7.

Unlike an example shown in FIG. 35, when a sub-block which is a target of a transform includes a top-left sample of a coding block, a horizontal directional transform type and a vertical directional transform type may be set the same, and when a sub-block which is a target of a transform includes a bottom-right sample of a coding block, a horizontal directional transform type and a vertical directional transform type may be set differently.

When a sub-block which is a target of a transform includes a bottom-right sample of a coding block, a horizontal directional transform type and a vertical directional transform type may be set the same. In an example, in an example shown in FIG. 35, when binary type partitioning in a horizontal direction is applied and a bottom sub-block is determined as a transform target, a horizontal directional transform type and a vertical directional transform type may be set as DST7. When binary type partitioning in a vertical direction is applied and a right sub-block is determined as a transform target, a horizontal directional transform type and a vertical directional transform type may be set as DST7.

As in the above-mentioned example, whether a horizontal directional transform type and a vertical directional transform type are set the same may be determined according to a position of a sub-block which is a target of a transform in a coding block. In addition, a horizontal directional transform type and a vertical directional transform type may be determined according to a position of a sub-block which is a target of a transform in a coding block.

For sub-blocks, encoding of information representing whether there is a non-zero coefficient, e.g., CBF, may be omitted. When encoding of CBF is omitted, whether a non-zero residual coefficient is included in each sub-block may be determined based on a position of a block that transform is performed. In an example, when a sub-block at a right or bottom position in a coding block to which binary type partitioning is applied is determined as a transform target, a CBF value for a sub-block at a left or top position may be inferred to 0 and a CBF value for sub-blocks at a right or bottom position may be inferred to 1. Alternatively, when a sub-block at a left or bottom position in a coding block to which binary type partitioning is applied is determined as a transform target, a CBF value for a sub-block at a left or top position may be inferred to 1 and a CBF value for a sub-block at a right or bottom position may be inferred to 0.

The second transform may be performed for a block that the first transform is performed. The second transform may be performed for a top-left region in a transform block to which the first transform has been applied.

If a residual coefficient on which the first transform and the second transform has been performed is encoded, a decoding device may perform the second inverse transform which is inverse process of the second transform for a transform block, and perform the first inverse transform which is inverse process of the first transform for a transform block that the second inverse transform has been performed.

Whether the second transform is applied to a current block may be determined based on at least one of a size, the number of residual coefficients, an encoding mode or an intra-prediction mode of a current block, or whether a sub-partition intra encoding method is applied. An encoder may encode and signal information to a decoder which representing whether second transform is applied. Alternatively, an encoder and a decoder may determine whether second transform is performed based on the same condition.

In an example, information representing whether second transform is performed or not may be signaled in a bitstream. Concretely, a flag representing whether second transform is performed or not or index information specifying whether second transform is performed or not and a transform kernel used for the second transform may be signaled.

Table 9 represents an example in which a flag, lfnst_flag, representing whether second transform is performed or not is signaled in a bitstream. When a value of a flag, lfnst_flag, is 0, it represents that a second transform is not performed for a current block. On the other hand, when a value of a flag, lfnst_flag, is 1, it represents that a second transform is performed for a current block.

TABLE 9

| | Descriptor |
|---|---|
| coding_unit( x0, y0, cbWidth, cbHeight, treeType ) { <br> ... <br>    numSigCoeff = 0 <br>    numZeroOutSigCoeff = 0 <br>    transform_tree( x0, y0, cbWidth, cbHeight, treeType <br>    ) <br>    lfnstWidth = ( treeType = = <br> DUAL_TREE_CHROMA ) ? cbWidth / SubWidthC <br>      : cbWidth <br>    lfnstHeight = ( treeType = = <br> DUAL_TREE_CHROMA ) ? cbHeight / SubHeightC <br>      : cbHeight <br>    if( Min( lfnstWidth, lfnstHeight ) >= 4 && <br> sps_lfnst_enabled_flag = = 1 && <br>      CuPredMode[ x0 ][ y0 ] = = MODE_INTRA && <br>      IntraSubPartitionsSplitType = = ISP_NO_SPLIT <br> && <br>      !intra_mip_flag[ x0 ][ y0 ] <br> && !intra_bdpcm_flag) { <br>      if( ( numSigCoeff > <br> ( ( treeType = = SINGLE_TREE ) ? 2 : 1 ) ) && <br>       numZeroOutSigCoeff = = 0 ) <br>        lfnst_flag[ x0 ][ y0 ] <br>      } <br>    } <br>  } <br> } | <br><br><br><br><br><br><br><br><br><br><br><br><br><br><br><br><br><br><br><br><br><br><br>u(1) |

Alternatively, a syntax, lfnst_idx, may be signaled in a bitstream. When a value of the index, lfnst_idx, is 0, it represents that a second transform is not performed for a current block. On the other hand, when the index, lfnst_idx, is greater than 0, it represents that a second transform is performed for a current block. When a value of an index, lfnst_idx, is greater than 0, lfnst_idx may be used to specify a transform kernel for performing second transform.

Alternatively, whether a second transform is performed or not may be determined by comparing at least one of a width or a height of a current block with a threshold value. In an example, when the minimum value of a width and a height of a current block is smaller than a threshold value, a second transform may not be performed. In this case, a threshold value may be a natural number such as 4, 8, or 16.

Alternatively, when a current block is encoded by inter-prediction, a second transform may not be applied.

Alternatively, although a current block is encoded by intra-prediction, a second transform may not be applied when matrix-based intra prediction is performed.

Alternatively, whether a second transform is performed or not may be determined based on whether a transform core in a horizontal direction is the same as a transform core in a vertical direction. In an example, a second transform may be performed only when a transform core in a horizontal direction is the same as a transform core in a vertical direction. Alternatively, a second transform may be performed only when a transform core in a horizontal direction is different from a transform core in a vertical direction.

Alternatively, a second transform may be allowed only when a predefined transform core is used for a horizontal directional transform and a vertical directional transform. In an example, a second transform may be allowed when a DCT2 transform core is used for transform in a horizontal direction and transform in a vertical direction.

Alternatively, when a sub-partition intra encoding method is applied to a current block, a second transform may be allowed only when a DCT2 transform core is used for transform in a horizontal direction and transform in a vertical direction.

Alternatively, whether a second transform is performed or not may be determined based on the number of non-zero transform coefficients of a current block. In an example, when the number of non-zero transform coefficients of a current block is smaller than or the same as a threshold value, it may be set not to use a second transform and when the number of non-zero transform coefficients of a current block is greater than a threshold value, it may be set to use a second transform. Only when a current block is encoded by intra prediction, it may allow to use a second transform.

Alternatively, whether a second transform is performed or not may be determined based on a position of a last non-zero transform coefficient of a current block. In an example, when at least one of an x-axis coordinate or a y-axis coordinate of a last non-zero transform coefficient of a current block is greater than a threshold value, or when at least one of an x-axis coordinate or a y-axis coordinate of a sub-block to which a last non-zero transform coefficient of a current block belongs is greater than a threshold value, a second transform may not be performed. In this case, a threshold value may be predefined in an encoder and a decoder. Alternatively, a threshold value may be determined based on a size or a shape of a current block.

Alternatively, when only a transform coefficient of a DC component exists in a current block, it may be set not to perform a second transform. In this case, a DC component represents a transform coefficient at a top-left position in a current block.

Whether a second transform is performed or not may be determined based on whether a combined prediction encoding mode is applied to a current block. In an example, when a combined prediction encoding mode is applied to a current block, it may be set not to perform a second transform.

Alternatively, when a combined prediction encoding mode is applied, whether a second transform is performed or not may be determined based on at least one of a size or a shape of a current block, an intra prediction mode or a weight.

Alternatively, when a combined prediction encoding mode is applied, it may be set to signal information representing whether a second transform is performed or not for a current block. For example, when a combined prediction encoding mode is applied to a current block, an index, lfnst_idx, may be signaled.

Alternatively, whether a second transform is performed may be determined regardless of whether a combined prediction encoding mode is applied or not.

Alternatively, whether a second transform is allowed or not may be determined based on whether a sub-partition intra encoding method is applied to a current block. In an example, when a sub-partition intra encoding method is applied to a current block, it may set not to apply a second transform to a current block.

Alternatively, when a sub-partition intra encoding method is applied to a current block, it may set to apply a second transform. For example, when vertical directional partitioning or horizontal directional partitioning is applied to a current block, index information representing whether a second transform is applied to a current block may be signaled. Whether a second transform is applied or not and/or a transform kernel for the second transform may be determined by the index information. On the other hand, when a sub-partition intra encoding method is not applied to a current block, encoding of index information may be omitted. Alternatively, when a sub-partition intra encoding method is not applied to a current block, whether index information representing whether a second transform is applied is encoded or not may be determined based on whether a preset condition is satisfied or not. In this case, the preset condition may be related to at least one of a position of a non-zero coefficient, the number of non-zero coefficients or a size of a current block. In an example, when the number of non-zero coefficients is equal to or greater than 1, when the number of non-zero coefficients is 1, but is not included in a 4×4 top-left region of a current block, or when a scanning order of a non-zero coefficient that a non-zero coefficient is not included in a 4×4 region of a current block is equal to or less than a threshold value, index information may be encoded and signaled. Otherwise, encoding of index information may be omitted.

When the index information is not signaled, a value of the index information may be inferred to indicate that a second transform is not applied.

Alternatively, whether a second transform is applied or not may be determined based on at least one of a size, a width, a height or a shape of a sub-block. In an example, when at least one of a size, a width or a height of a sub-block is smaller than a threshold value, it may set not to apply a second transform. Concretely, when at least one of a size, a width or a height of a sub-block is smaller than a threshold value, encoding of index information may be omitted. Information representing whether a second transform is performed or not may be signaled at a level of a coding block. Whether a second transform will be applied to sub-blocks belonging to a coding block may be determined based on information signaled at a level of a coding block.

A threshold value may have a predefined value in an encoder and a decoder. In an example, a threshold value may be set as 2, 4 or 8, etc. Alternatively, a threshold value may be determined based on at least one of a partitioning direction of a current block or the number of sub-blocks included in a current block.

Alternatively, whether a syntax representing whether the second transform is applied is encoded may be determined by using a parameter related to a current block for determining whether the second transform is applied, which is enumerated above.

In an example, when at least one of a size, the number of residual coefficients, an encoding mode or an intra-prediction mode of a current block, or whether a sub-partition intra encoding method is applied or not does not satisfy a preset condition, encoding of a syntax representing whether the second transform is applied or not may be omitted. In an example, encoding of lfnst_flag or lfnst_idx may be omitted and a value thereof may be inferred to 0. In other words, when encoding of a syntax is omitted, a second transform may not be applied.

When intra BDPCM is applied to a current block, a second transform may not be performed. When intra BDPCM is applied to a current block, signaling of a syntax element representing whether a second transform is performed or not may be omitted and a value thereof may be derived to 0. Table 10 represents an example in which signaling of lfnst_idx is omitted for a block to which intra BDPCM is applied.

TABLE 10

| | Descriptor |
|---|---|
| coding_unit( x0, y0, cbWidth, cbHeight, treeType ) { <br> ... <br>     numSigCoeff = 0 <br>     numZeroOutSigCoeff = 0 <br>   transform_tree( x0, y0, cbWidth, cbHeight, treeType <br> ) <br>     lfnstWidth = ( treeType = = DUAL_TREE_CHROMA ) ? cbWidth / SubWidthC <br>         : cbWidth <br>     lfnstHeight = ( treeType = = DUAL_TREE_CHROMA ) ? cbHeight / SubHeightC <br>         : cbHeight <br>     if( Min( lfnstWidth, lfnstHeight ) >= 4 && <br> sps_lfnst_enabled_flag = = 1 && <br>         CuPredMode[ x0 ][ y0 ] = = MODE_INTRA && <br>         IntraSubPartitionsSplitType = = ISP_NO_SPLIT && <br>         !intra_mip_flag[ x0 ][ y0 ] <br> && !intra_bdpcm_flag) { <br>         if( ( numSigCoeff > <br> ( ( treeType = = SINGLE_TREE ) ? 2 : 1 ) ) && <br>             numZeroOutSigCoeff = = 0 ) <br>             lfnst_idx[ x0 ][ y0 ] <br>         } <br>     } <br>   } <br> } | <br><br><br><br><br><br><br><br><br><br><br><br><br><br><br><br><br><br><br><br><br><br>ae(v) |

Alternatively, when intra BDPCM is applied to a current block, signaling of a syntax element, e.g., transform_skip_flag, representing whether a transform skip is performed or not, may be omitted. When intra BDPCM is applied to a current block, signaling of a flag, transform_skip_flag, may be omitted and a value thereof may be inferred to 1. In other words, when intra BDPCM is applied, a transform may not be applied to a current block.

When it is determined that a transform is not applied to a current block, both a first transform and a second transform may not be applied. Accordingly, when a transform of a current block is skipped, signaling of a syntax element representing whether a second transform is performed or not may be omitted and a value thereof may be inferred to 0. In the end, when intra BDPCM is applied to a current block, signaling of a syntax element, lfnst_idx, representing whether a second transform is performed or not, may be omitted.

Based on the above-mentioned description, a method of performing the second transform in an encoder and a decoder will be described in detail.

The second transform may be performed for a top-left region in a current block. A target region where second transform is applied may have a predefined size or a predefined shape. A target region where second transform is applied may have a square block shape such as 4×4 or 8×8 or a non-square block shape such as 4×8 or 8×4.

Alternatively, when a current block is uniformly partitioned into N regions, at least one of N regions may be set as a target region. In this case, N may be a natural number such as 2, 4, 8, or 16. A variable N may be predefined in an encoder and a decoder. Alternatively, a variable N may be determined based on a size and/or a shape of a current block.

Alternatively, a targeted region may be determined based on the number of transform coefficients. In an example, the predetermined number of transform coefficients may be determined as a target region according to a predetermined scanning order.

Alternatively, information for specifying a size and/or a shape of a targeted region may be encoded and transmitted in a bitstream. The information may include at least one of information representing a size of a target region or information representing the number of 4×4 blocks included by a target region.

Alternatively, a entirety of a current block may be set as a target region. In an example, when a size of a current block is the same as the minimum size (e.g., 4×4) of a target region, a entirety of a current block may be set as a target for the second transform.

The second transform may be applied in a non-separable shape. Accordingly, the second transform may be also referred to as Non-Separable Secondary Transform (NSST).

A transform coefficient in a region that the second transform is applied may be arranged in a single column. In an example, when the second transform is performed for an N×N sized target region, transform coefficients included in the target region may be converted into an $N^2 \times 1$ sized input matrix. When a 4×4 sized block is set as a target region, transform coefficients included in a target region may be converted into a 16×1 sized input matrix. When an 8×8 sized block is set as a target region, transform coefficients included in a target region may be converted into a 64×1 sized input matrix.

A non-separable transform matrix may be applied to an input matrix generated by arranging transform coefficients included in a target region in a line. A size of a non-separable transform matrix may be differently determined according to a size of an input matrix.

In an example, when a size of an input matrix is $N^2 \times 1$, the second transform may be performed based on an $N^2 \times N^2$ sized non-separable transform matrix. For example, when a size of an input matrix is 16×1, a 16×16 sized non-separable transform matrix may be used and when a size of an input matrix is 64×1, a 64×64 sized non-separable transform matrix may be used.

A plurality of non-separable transform matrixes may be stored in an encoder and a decoder. Information for specifying any one of a plurality of non-separable transform matrixes may be signaled in a bitstream.

Alternatively, a non-separable transform matrix may be specified based on at least one of a size, a shape, a quantization parameter, an intra-prediction mode or a transform type of a current block used in the first transform.

Alternatively, non-separable transform matrix candidates which may be used by a current block may be specified based on at least one of a size, a shape, a quantization parameter, an intra-prediction mode or a transform type of a current block used in the first transform. When there is a plurality of non-separable transform matrix candidates which may be used by a current block, information indicating one of the plurality of non-separable transform matrix candidates may be encoded and signaled.

A transform matrix may be obtained by multiplying a non-separable transform matrix and an input matrix. In an example, Equation 6 shows an example in which a transform matrix A' is obtained.

$$A'=T*A \qquad \text{[Equation 6]}$$

In the Equation 6, T represents a non-separable transform matrix and A represents an input matrix. When a size of a matrix T is $N^2 \times N^2$ and a size of a matrix A is $N^2 \times 1$, a $N^2 \times 1$ sized transform matrix A' may be obtained. In an example, when a 16×1 sized input matrix and a 16×16 sized non-separable transform matrix are used, a 16×1 sized transform matrix A' may be obtained. Alternatively, when a 64×1 sized input matrix and a 64×64 sized non-separable transform matrix are used, a 64×1 sized transform matrix A' may be obtained.

When a transform matrix A' is obtained, components in a transform matrix A' may be set as transform coefficients of a N×N sized block in a current block. Transform coefficients in a remaining region excluding the N×N sized block may be set as a default value. In an example, transform coefficients in a region where the second transform is not performed may be set to 0.

The second transform may be performed by using a non-separable transform matrix that the number of rows is smaller than that of columns. In an example, a $(k \times N^2)$ sized non-separable transform matrix may be applied to a $(N^2 \times 1)$ sized input matrix. In this case, k may have a value smaller than $N^2$. In an example, k may be $N^2/2$, $N^2/4$, or $3N^2/4$, etc. k may be referred to as a reduce factor.

As a result, a (k×1) sized transform matrix smaller than an input matrix may be obtained. Like this, the second transform that a transform matrix with a size smaller than an input matrix is output may be referred to as Reduced Secondary Transform.

Equation 7 represents an example in which a reduced secondary transform is applied.

$$A_R=R*A \qquad \text{[Equation 7]}$$

In Equation 7, R represents a $k \times N^2$ sized non-separable transform matrix. A non-separable transform matrix that k, the number of rows, is smaller than $N^2$, the number of columns, may be referred to as a reduced non-separable transform matrix. $A_R$ represents a k×1 sized transform matrix. A transform matrix $A_R$ with a size smaller than an input matrix A may be referred to as a reduced transform matrix.

When a reduced transform matrix $A_R$ is obtained, components in a reduced transform matrix $A_R$ may be set as transform coefficients of at least one or more M×M sized blocks in a current block. In this case, M may be a natural number smaller than N. The number of M×M sized blocks may be determined according to a reduce factor k. A transform coefficient of a remaining region excluding at least one M×M sized blocks may be set as a default value. In an example, transform coefficients in the remaining region may be set to 0.

FIG. 36 is a diagram showing an encoding aspect of a transform coefficient when a reduce factor is 16.

Transform coefficients included in an 8×8 sized target region may be transformed into a 64×1 sized input matrix and a 16×1 sized transform matrix may be obtained by using a 16×64 sized non-separable transform matrix.

A 16×1 sized transform matrix may be set as a transform coefficient of a 4×4 block and transform coefficients in other regions may be set to 0.

It is not shown, but when a reduce factor k is 32, a 32×1 sized transform matrix may be set as a transform coefficient of an 8×4 block or a 4×8 block and transform coefficients in other regions may be set to 0.

When a reduce factor k is 48, a 48×1 sized transform matrix may be set as a transform coefficient of three 4×4 blocks and transform coefficients in other regions may be set to 0. Concretely, a transform matrix may be set as a transform coefficient of a 4×4 block at a top-left position of a current block, a 4×4 block adjacent to the right of the top-left block and a 4×4 block adjacent to the bottom of the top-left block.

A transform matrix may be determined based on at least one of a size or a shape of a current block or an intra prediction mode. In an example, based on an intra prediction mode of a current block, a transform matrix set may be determined and one of a plurality of transform matrix candidates included in the transform matrix set may be selected. Index information specifying a transform matrix applied to a current block among a plurality of transform matrix candidates may be encoded and signaled.

When remaining transform coefficients excluding transform coefficients generated by the second transform are set to 0, a decoder may determine whether the second transform is performed based on a position of the last non-zero residual coefficient. In an example, when the last residual coefficient is positioned outside a block that transform coefficients generated by the second transform are stored, it may be determined not to perform the second transform. In other words, a decoder may perform an inverse transform for the second transform only when the last residual coefficient is positioned in a block that transform coefficients generated by the second transform are stored.

Whether the reduced second transform is performed or not may be determined based on at least one of a size or a shape of a current block. In an example, when at least one of a width or a height of a current block is greater than a threshold value, the reduced second transform may be applied and otherwise, the general second transform may be applied. In this case, a threshold value may be a natural number such as 4, 8 or 16.

Alternatively, whether the reduced second transform is performed or not may be determined according to a size of a target region. In an example, when the second transform is performed for a 4×4 sized target region, the general second transform may be applied. In an example, for a 4×4 sized target region, the second transform may be performed by using a 16×16 sized non-separable transform matrix.

On the other hand, when the second transform is performed for an 8×8 sized target region, the reduced second transform may be applied. In an example, for an 8×8 sized target region, the second transform may be performed by using a 48×64, 32×64 or 16×64 sized non-separable transform matrix.

When inverse transform for the reduced second transform is performed, a size of an output matrix has a value greater than that of an input matrix. In an example, when a reduce factor k is 16, a 64×1 sized output matrix may be obtained by performing inverse transform for a 16×1 sized input matrix.

When a sub-partition intra encoding method is applied to a coding block, a coding block may be partitioned into a plurality of sub-blocks. When a sub-partition intra encoding method is applied to a coding block, it may set not to apply a second transform.

Alternatively, whether a second transform is performed or not may be determined based on a shape or a size of a sub-partition. In an example, when a coding block is partitioned into sub-partitions whose width or height is 4, a second transform may be applied. In other words, only when a sub-partition has a 4×L or L×4 shape, a second transform may be applied. In this case, L represents an integer equal to or greater than 4.

Alternatively, only when the minimum value of a width and a height of a sub-partition is equal to or greater than a predefined threshold value, a second transform may be applied. In this case, a threshold value may be an integer such as 4, 8, or 16.

As in the above example, when a shape or a size of a sub-partition satisfies a predefined condition, information representing whether a second transform is applied or not may be signaled in a bitstream. In an example, when a sub-partition is 4×L or L×4, or when the minimum value of a width and a height of a sub-partition is equal to or greater than a threshold value, a syntax, lfnst_idx, indicating whether a second transform is performed or not may be signaled.

On the other hand, when a shape or a size of a sub-partition does not satisfy a predefined condition, encoding/decoding of information representing whether a second transform is applied or not may be omitted. In an example, when the minimum value of a width and a height of a sub-partition is smaller than a threshold value, encoding/decoding of a syntax, lfnst_idx, may be omitted. When encoding/decoding of a syntax, lfnst_idx, is omitted, a value thereof may be derived to 0.

When it is determined that a second transform is applied, the second transform may be applied to a sub-block at a predefined position in a coding block or a sub-block whose partition index is smaller than a threshold value. In this case, a partition index of a left sub-block may be set to have a value smaller than a partition index of a right sub-block or a partition index of a top sub-block may be set to have a value smaller than a partition index of a bottom sub-block. In an example, a second transform may be applied only for a first sub-block in a coding block.

Alternatively, a second transform may be applied to each of all sub-blocks.

Alternatively, when it is determined to perform a second transform at a level of a coding block, whether the second transform is applied to each sub-block may be adaptively determined based on an attribute of each sub-block. In this case, an attribute of a sub-block may include at least one of the number of residual coefficients included by a sub-block, whether transform skip is applied to a sub-block or a transform core applied to a sub-block.

A size of a target region for a second transform may be determined based on a size of a sub-block. In an example, a 4×4 sized block including 16 samples, two 4×4 sized blocks including 32 samples, three 4×4 sized blocks including 48 samples or four of 4×4 sized blocks including 64 samples may be set as a target region for a second transform. According to a size of a target region, a general second transform may be applied or reduced second transform may be applied.

A size of a target region for a second transform may be determined based on a size of a sub-block. In an example, when at least one of a width or a height of a sub-block is smaller than a threshold value, a region including N samples may be set as a target region for second transform. On the other hand, when a width and a height of a sub-block is equal to or greater than a threshold value, a region including M samples may be set as a target region for a second transform. In this case, M may be a natural number greater than N. In an example, N may be 16 or 32 and M may be 48 or 64. In addition, a threshold value may be a natural number such as 2, 4, 8, or 16, etc.

A target region for a second transform may be set not to be extended to out of a boundary of a sub-block. In other words, when a target region for a second transform across two or more sub-blocks, it may be set not to perform a second transform.

FIGS. 37 and 38 are diagrams illustrating a target region for a second transform.

When partitioning in a horizontal direction is applied to a 16×16 sized coding block, a coding block may be partitioned into 16×4 sized sub-blocks. As in a shown example, when a sub-block has an N×4 size (N is an integer greater than 4), a height of a target region for a second transform may be set not to exceed 4.

In other words, as in an example shown in FIG. 37 (a), a target region for a second transform may be set as a 4×4 or 8×4 sized region.

On the other hand, as in an example shown in FIG. 37 (b), it may not be allowed to set a target region for a second transform such as 4×8 or 8×8.

When partitioning in a vertical direction is applied to a 16×16 sized coding block, a coding block may be partitioned into 4×16 sized sub-blocks. As in a shown example, when a sub-block has a 4×N size (N is an integer greater than 4), a width of a target region for a second transform may be set not to exceed 4.

In other words, as in an example shown in FIG. 38 (a), a target region for a second transform may be set as a 4×4 or 4×8 sized region.

On the other hand, as in an example shown in FIG. 38 (b), it may not be allowed to set a target region for a second transform such as 8×4 or 8×8.

A decoder may decode a residual coefficient in a bitstream and derive a transform coefficient by performing dequantization on the residual coefficient. When a transform coefficient is generated through the first transform and the second transform, a residual sample may be derived by performing the second inverse transform and the first inverse transform for a transform coefficient.

When it is determined to perform the second transform on a current block, a target region which is a target of the second inverse transform may be determined. When a general second transform is applied, a size of a target region for a second inverse transform may be set the same as that of a target region for a second transform. In an example, when a second transform is performed for a 4×4 sized region by using a 16×16 sized non-separable transform matrix, a second inverse transform may be applied to a 4×4 sized region.

On the other hand, when a reduced second transform is applied, a size of a target region for a second inverse transform may have a value smaller than a size of a target region for a second transform. In an example, when a second transform is performed for an 8×8 sized region by using a 64×48 sized reduced transform matrix, a second inverse transform may be performed for a region including 48 samples (e.g., three 4×4 sized blocks).

In a decoder, a target region for a second inverse transform may be determined based on a size of a current block. In this case, a current block may represent a coding block or a transform block which is a target to perform a second inverse transform. In an example, when at least one of a width or a height of a current block is smaller than a threshold value, a target region may be configured to include 16 samples. On the other hand, when a width and a height of a current block is equal to or greater than a threshold value, a target region may be configured to include 48 samples.

An input matrix may be generated by arranging transform coefficients included in a target region in a row. In this case, when the reduced second transform is applied to a current block, an input matrix may be generated based on as many transform coefficients as a reduce factor k. In an example, when a reduce factor k is 16, an input matrix may be generated based on transform coefficients included in a 4×4 sized top-left block. When a reduce factor k is 32, an input matrix may be generated based on transform coefficients included in a top-left block and a 4×4 sized neighboring block adjacent to the right or the bottom of the top-left block. When a reduce factor k is 48, an input matrix may be generated based on transform coefficients of a top-left block, a 4×4 sized neighboring block adjacent to the right of the top-left block and a 4×4 sized neighboring block adjacent to the bottom of the top-left block.

A reduce factor k may be predefined in an encoder and a decoder. Alternatively, information for determining a reduce factor k may be signaled in a bitstream. Alternatively, a reduce factor k may be determined based on a size or a shape of a current block.

A transform matrix may be obtained by multiplying an input matrix and a non-separable inverse transform matrix. A non-separable inverse transform matrix may be a symmetric matrix of a non-separable transform matrix shown in Equation 6 to Equation 7. Equation 8 and Equation 9 show an example in which a transform matrix is obtained by using a non-separable inverse transform matrix $$A' = T^T * A \quad \text{[Equation 8]}$$

When the general second transform is applied to a current block, a transform matrix may be derived by multiplying an input matrix A by a non-separable inverse transform matrix TT. In an example, a 16×1 sized transform matrix may be derived by multiplying a 16×16 sized inverse transform matrix TT and a 16×1 sized input matrix A.

When a transform matrix A' is obtained, components in a transform matrix A' may be set as transform coefficients of an N×N sized block in a current block. In an example, a 16×1 sized transform matrix may be set as a transform coefficient of a 4×4 block.

$$A' = R^T * A \quad \text{[Equation 9]}$$

When the reduced second transform is applied to a current block, a transform matrix A' may be derived by multiplying an input matrix A by a reduced non-separable inverse transform matrix $R^T$. In an example, a 64×1 sized transform matrix may be derived by multiplying a 64×16 sized reduced non-separable inverse transform matrix $R^T$ and a 16×1 sized input matrix A.

Alternatively, a 64×1 sized transform matrix may be derived by multiplying a 64×32 sized reduced non-separable inverse transform matrix $R^T$ and a 32×1 sized input matrix A.

Alternatively, a 48×1 sized transform matrix may be derived by multiplying a 64×48 sized reduced non-separable inverse transform matrix $R^T$ and a 48×1 sized input matrix A.

When a transform matrix A' is obtained, components in a transform matrix A' may be set as transform coefficients of an N×N sized block in a current block. In an example, a 64×1 sized transform matrix may be set as a transform coefficient of an 8×8 block.

A non-separable inverse transform matrix may be determined based on at least one of index information signaled in a bitstream, or a size of a current or an intra prediction mode. In an example, a size of a non-separable inverse transform matrix may be determined based on a size of a current block, and a non-separable inverse transform matrix set may be determined based on an intra prediction mode of a current block. When a non-separable inverse transform matrix set is determined by an intra prediction mode of a current block, at least one of a plurality of non-separable inverse transform matrix candidates corresponding to a size of a current block included in a non-separable inverse transform matrix set may be specified by an index, lfnst_idx.

A non-separable inverse transform matrix set may include a plurality of non-separable inverse transform matrix candidates. In this case, at least one of a type or the number of inverse transform matrix candidates may be different between non-separable inverse transform matrix sets with a different index.

Table 11 represents an example in which a non-separable inverse transform set is determined based on an intra prediction mode. In Table 11, predModeIntra represents an index of an intra prediction mode and lfnstTrSetIdx represents an index of a non-separable inverse transform set.

TABLE 11

| predModeIntra | lfnstTrSetIdx |
|---|---|
| predModeIntra < 0 | 1 |
| 0 <= predModeIntra <= 1 | 0 |
| 2 <= predModeIntra <= 12 | 1 |
| 13 <= predModeIntra <= 23 | 2 |
| 24 <= predModeIntra <= 44 | 3 |
| 45 <= predModeIntra <= 55 | 2 |
| 56 <= predModeIntra <= 80 | 1 |
| 81 <= predModeIntra <= 83 | 0 |

In an example, when an intra prediction mode of a current block is a planar, a non-separable inverse transform matrix set whose index is 0 may be selected. Afterwards, a non-separable inverse transform matrix may be determined based on a size of a current block and a value of lfnst_idx.

A non-separable inverse transform set may be determined by further simplifying Table 11. In an example, Table 11 may be simplified as in Table 12.

TABLE 12

| predModeIntra | lfnstTrSetIdx |
|---|---|
| predModeIntra < 0 | 1 |
| 0 <= predModeIntra <= 1 | 0 |
| 2 <= predModeIntra < 50 | 1 |
| 50 <= predModeIntra <= 83 | 2 |

Alternatively, a non-separable inverse transform matrix set may be selected by considering only whether an intra prediction mode is directional or nondirectional. Table 13 represents an example in which a non-separable inverse transform matrix set is determined based on whether an intra prediction mode is directional or nondirectional.

TABLE 13

| predModeIntra | lfnstTrSetIdx |
|---|---|
| 0 <= predModeIntra <= 1 | 0 |
| Otherwise | 1 |

Alternatively, a non-separable inverse transform matrix set may be determined by using one of a plurality of look-up tables after storing a plurality of look-up tables which define a mapping relationship between an intra prediction mode and a non-separable inverse transform matrix set. In an example, one of Table 11 to Table 13 may be selectively used when a non-separable inverse transform matrix set is determined.

Information specifying one of a plurality of look-up tables may be signaled in a bitstream. The information may be signaled at a level of a sequence, a picture, a slice or a block.

Alternatively, one of a plurality of look-up tables may be selected based on at least one of a size or a shape of a current block or a transform core which is applied in a first transform.

When an inverse transform matrix in a predefined size is used, it may be set not to use a method in which a non-separable inverse transform matrix set is determined based on an intra prediction mode. In an example, when a 48×16 sized inverse transform matrix is used, a process in which a non-separable inverse transform matrix set is determined based on an intra prediction mode may be omitted.

As in the above-mentioned description, one of a plurality of non-separable transform matrix candidates may be applied to a current block. In this case, each of non-separable transform matrix candidates may have at least one different size or coefficient.

FIG. 39 is an example showing a variety of non-separable transform matrix candidates.

It is assumed that a 4×4 sub-block is a target for a second inverse transform.

As in an example shown in FIG. 39 (a), a 64×1 sized transform matrix may be derived by using a 64×16 sized non-separable inverse transform matrix. A derived transform matrix may be set as transform coefficients of an 8×8 sized block.

As in an example shown in FIG. 39 (b), a 32×1 sized transform matrix may be derived by using a 32×16 sized non-separable inverse transform matrix. A derived transform matrix may be set as transform coefficients of a 4×8 or 8×4 sized block.

As in an example shown in FIG. 39 (c), a 48×1 sized transform matrix may be derived by using a 48×16 sized non-separable inverse transform matrix. A derived transform matrix may be set as transform coefficients of three 4×4 sized blocks. There is a non-zero transform coefficient in a top-left block among these three 4×4 sized blocks and in other blocks, a value of a transform coefficient in a block may be set to be 0.

A non-separable inverse transform matrix which will be applied to a current block may be determined based on whether a sub-partition intra encoding method is applied to a current block. In an example, Alternatively, when a sub-partition intra encoding method is applied to a current block, it may be set to apply a 32×16 sized non-separable inverse transform matrix.

Alternatively, a type or the number of non-separable inverse transform matrix candidates may be differently determined based on whether a sub-partition intra encoding method is applied to a current block. In an example, a 32×16 sized non-separable inverse transform matrix may be used as a candidate only when a sub-partition intra encoding method is applied to a current block.

When a sub-partition intra encoding method is applied to a current block and a 32×16 sized non-separable inverse transform matrix is applied, a size or a shape of a block derived by performing a second inverse transform may be different according to a size or a shape of a sub-partition.

In an example, when partitioning in a vertical direction is applied to a current block (e.g., when a sub-partition has a 4×L shape), a 32×1 sized transform matrix obtained by performing a second inverse transform may be set as transform coefficients of a 4×8 sized block. On the other hand, when partitioning in a horizontal direction is applied to a current block (e.g., when a sub-partition has an L×4 shape), a 32×1 sized transform matrix obtained by performing a second inverse transform may be set as transform coefficients of a 8×4 sized block.

Although a sub-partition intra prediction encoding method is not applied, when a current block is encoded by intra prediction and a size thereof is 4×L or L×4, a 32×16 sized non-separable matrix may be applied.

When a sub-partition intra encoding method is applied to a current block, a second inverse transform and a first inverse transform may be applied to each of a plurality of sub-blocks included by a current block.

Alternatively, second inverse transform and first inverse transform may be applied to a sub-block at a predefined position or a sub-block whose partition index is smaller than a threshold value among a plurality of sub-blocks. In an example, the second transform may be applied only to a sub-partition at the uppermost position of a current block or a sub-partition at the leftmost position of a current block, and may not be applied to remaining sub-partitions.

When a sub-partition intra encoding method is applied, a target region for a second inverse transform may be determined as a 4×4 size. Alternatively, a size of a target region may be adaptively determined according to a size of a sub-block. In an example, when the minimum value of a width and a height of a sub-partition is 4, a 4×4 sized region may be set as a target region.

Alternatively, for a 4×N or N×4 shaped sub-block, an 8×4 sized region may be set as a target region. In this case, N represents an integer equal to or greater than 8.

An input matrix may be generated by arranging transform coefficients included in a target region in a sub-block in a row. In an example, when a target region is set as a 4×4 size, transform coefficients included in a target region may be transformed into a 16×1 shaped input matrix. Alternatively, when a target region is set as a 4×8 or 8×4 size, transform coefficients included in a target region may be transformed into a 32×1 shaped input matrix.

A transform matrix may be derived by multiplying an input matrix by a non-separable transform matrix. In an example, a 16×1 sized transform matrix may be obtained by multiplying a 16×16 sized non-separable transform matrix and a 16×1 sized input matrix. Alternatively, a 32×1 sized transform matrix may be obtained by multiplying a 32×32 sized non-separable transform matrix and a 32×1 sized input matrix.

When a transform matrix is obtained, components in a transform matrix may be set as transform coefficients of a sub-block. In an example, a 16×1 sized transform matrix may be set as transform coefficients of a 4×4 sized block. Alternatively, a 32×1 sized transform matrix may be set as transform coefficients of a 4×8 or 8×4 sized top-left block.

When a second inverse transform is applied to a sub-block, a predefined transform core may be applied to a transform in a horizontal direction and a transform in a vertical direction of a sub-block. In an example, a transform core in a horizontal direction and a transform core in a vertical direction of a sub-block to which second inverse transform is applied may be set as DCT2.

Whether a second transform is allowed may be determined based on whether a sub-transform block encoding method is applied to a coding block. In an example, when a sub transform block encoding method is applied to a coding block, it may set not to apply a second transform.

Alternatively, when a sub transform block encoding method is applied to a coding block, it may be set to apply a second transform only for at least one available sub-block among a plurality of sub-blocks. In this case, the available sub-block may represents a block that the first transform is performed among a plurality of sub-blocks.

A size of a target region for a second transform in a sub-block may be determined according to a size or a shape of a sub-block. In an example, when at least one of a height or a width of a sub-block is smaller than a threshold value, the second transform may be performed for a 4×4 region. On the other hand, when at least one of a height or a height of a sub-block is equal to or greater than a threshold value, the second transform may be performed for an 8×8 region.

Whether the second transform is applied to a sub-block may be determined based on at least one of a size, a shape, a position or a partition index of a sub-block. In an example, the second transform may be applied only for a sub-block including a top-left sample of a coding block. Alternatively, only when at least one of a height or a width of a sub-block is greater than a threshold value, the second transform may be applied.

Alternatively, information representing whether the second transform is applied to a sub-block may be signaled in a bitstream.

When a sub-transform block encoding method is applied, it may be set not to allow the reduced second transform. Alternatively, although a sub-transform block encoding method is applied, whether the reduced second transform is performed or not may be determined based on at least one of a size or a shape of a sub-block.

A reconstructed sample of a sub-block that transform is performed may be derived by a sum of a prediction sample and a residual sample. On the other hand, a prediction sample may be set as a reconstructed sample in a sub-block that transform is omitted. Quantization is to reduce energy of a block, and a quantization process includes a process dividing a transform coefficient by a specific constant value. The constant value may be derived by a quantization parameter and a quantization parameter may be defined as a value from 1 to 63.

When the reconstructed block of the current block is obtained, loss of information as occurring in the process of the quantization and encoding may be reduced via the in-loop filtering. The in-loop filter may include at least one of a deblocking filter, a sample adaptive offset filter (SAO), or an adaptive loop filter (ALF). Hereinafter, a reconstructed block before an in-loop filter is applied is referred to as a first reconstructed block and a reconstructed block after an in-loop filter is applied is referred to as a second reconstructed block.

The second reconstructed block may be obtained by applying at least one of a deblocking filter, SAO or ALF to the first reconstructed block. In this connection, SAO or ALF may be applied after the deblocking filter is applied.

A method in which a picture is divided into a plurality of regions and a plurality of regions are encoded/decoded in parallel for real-time or low delay encoding of a high-resolution image such as a panoramic video, a 360-degree video or a 4K/8K UHD (Ultra High Definition) image, etc. may be considered. Concretely, for a processing purpose, a picture may be partitioned into tiles or slices (or tile groups).

A tile represents a basic unit of parallel encoding/decoding. Each tile may be processed in parallel. A tile may have a rectangular shape. In another embodiment, a non-rectangular tile may be allowed.

Information representing whether a non-rectangular tile is allowed or whether a non-rectangular tile exists may be signaled in a bitstream.

Data of another tile cannot be used when a tile is encoded/decoded. Parallel processing of tiles may be supported by removing encoding/decoding dependency between tiles. Concretely, a probability table of a CABAC (Context adaptive Binary Arithmetic Coding) context may be initialized in a unit of a tile and an ln-loop filter may be set not to be applied on a boundary between tiles. In addition, data in another tile may not be used as a candidate for deriving a motion vector. For example, data in another tile may not used as a merge candidate, a motion vector prediction candidate (an AMVP candidate) or a motion information candidate. In addition, data in another tile may be not be used for context calculation of a symbol.

Image encoding/decoding information may be signaled through a slice header. Information signaled through a slice header may be commonly applied to tiles or coding tree units included in a slice. A slice may be also referred to as a tile group.

FIG. 40 is a diagram showing a picture partitioning method according to an embodiment of the present disclosure.

First, whether a current picture will be partitioned in a plurality of processing units or not may be determined (S4001). In this case, a processing unit may include at least one of a tile or a slice. In an example, no_pic_partition_flag, a syntax representing whether a current picture is partitioned into a plurality of tiles or slices, may be signaled in a bitstream. When a value of a syntax, no_pic_partition_flag, is 0, it represents that a current picture is partitioned into at least one tile or at least one slice. On the other hand, when a value of a syntax, no_pic_partition_flag, is 1, it represents that a current picture is not partitioned into a plurality of tiles or slices.

When it is determined that a current picture is not partitioned in a plurality of processing units, a partitioning process of a current picture may be terminated. In this case, it may be understood that a current picture is configured with one tile and one slice (or one tile group).

Alternatively, information representing whether a plurality of tiles is present in a picture may be signaled in a bitstream. The information may include at least one of a 1-bit flag representing whether a plurality of tiles exist in a picture or information specifying the number of tiles in a picture. Only when it is determined that a plurality of tiles exist in a picture, the after-described picture partitioning process may be performed.

When it is determined that a current picture is partitioned in a plurality of processing units, tile partitioning information may be signaled in a bitstream. Based on the signaled tile partitioning information, a picture may be partitioned into at least one tile (S4002).

When a current picture is partitioned into a plurality of tiles, a slice may be determined by merging a plurality of tiles or by partitioning a tile (S4003).

Hereinafter, according to the present disclosure, a method of partitioning a tile and a method of determining a slice are described in detail.

FIG. 41 shows an example in which a picture is partitioned into a plurality of tiles.

A tile may include at least one coding tree unit. A boundary of a tile may match with that of a coding tree unit. In other words, a partitioning type in which partitioning a single coding tree unit into multiple parts may not be allowed.

When a picture is partitioned into a plurality of tiles, a height of adjacent tiles or a width of adjacent tiles may be set to have the same value.

In an example, as in an example shown in FIG. 41, a height of tiles belonging to the same tile row and/or a width of tiles belonging to the same tile column may be set the same. Tiles belonging to the same tile row may be referred to as a tile set in a horizontal direction and tiles belonging to the same tile column may be referred to as a tile set in a vertical direction.

Alternatively, information representing whether a width and/or a height of a tile to be encoded/decoded is the same as a width and/or a height of a previous tile may be signaled.

Information representing a partitioning type of a picture may be signaled in a bitstream. The information may be encoded and signaled through a picture parameter set, a sequence parameter set or a slice header.

Information representing a partitioning type of a picture may include at least one of information representing whether tiles are partitioned in a uniform size, information representing the number of tile columns or information representing the number of tile rows. In this case, the number of tile columns represents the number of tile sets in a vertical direction and the number of tile rows represents the number of tile sets in a horizontal direction.

As a picture is partitioned by using at least one of a vertical line or a horizontal line across a picture, each tile belongs to a different column and/or row. To determine a partitioning type of a picture, information representing the number of tile columns and/or the number of tile rows may be signaled. In an example, num_tile_row_minus1, information representing the number of tile rows, and num_tile_column_minus1, information representing the number of tile columns, generated by partitioning a picture may be signaled in a bitstream. A syntax, num_tile_row_minus1, represents a value subtracting 1 from the number of tile rows and a syntax, num_tile_column_minus1, represents a value subtracting 1 from the number of tile columns.

In an example shown in FIG. 41, the number of tile columns is 4 and the number of tile rows is 3. Accordingly, num_tile_columns_minus1 may represent 3 and num_tile_rows_minus1 may represent 2.

A syntax representing a width of each tile column and a syntax representing a height of each tile row may be signaled in a bitstream. In an example, tile_cols_width_minus1[i] may represent a width of a i-th tile column and tile_rows_height_minus1[j] may represent a height of a j-th tile row.

A syntax, tile_cols_width_minus1[i], represents a value subtracting 1 from the number of coding tree unit columns configuring an i-th tile column. Signaling of a syntax, tile_cols_width_minus1[i], may be omitted for a last tile column. A width of a last tile column may be derived by subtracting a width of previous tile columns from a width of a current picture.

A syntax, tile_rows_height_minus1[j], represents a value subtracting 1 from the number of coding tree unit rows configuring a j-th tile row. Signaling of a syntax, tile_rows_height_minus1[i], may be omitted for a last tile row. A height of a last tile row may be derived by subtracting a height of previous tile rows from a height of a current picture.

In another example, information representing the number of tile columns that width information is explicitly signaled and/or information representing the number of tile rows that height information is explicitly signaled may be signaled in a bitstream. Table 14 represents a syntax table which includes the information.

TABLE 14

| | Descriptor |
|---|---|
| pic_parameter_set_rbsp( ) { | |
| ... | |
|   single_tile_in_pic_flag | u(1) |
|   if( !single_tile_in_pic_flag ) { | |
|     log2_pps_ctu_size_minus5 | u(2) |
|     num_exp_tile_columns_minus1 | ue(v) |
|     num_exp_tile_rows_minus1 | ue(v) |
|     for( i = 0; i <= num_exp_tile_columns_minus1; i++ ) | |
|       tile_column_width_minus1[ i ] | ue(v) |
|     for( i = 0; i <= num_exp_tile_rows_minus1; i++ ) | |
|       tile_row_height_minus1[ i ] | ue(v) |
|     loop_filter_across_tiles_enabled_flag | u(1) |
|     loop_filter_across_slices_enabled_flag | u(1) |
|     rect_slice_flag | u(1) |
|     if( rect_slice_flag ) { | |
|       num_slices_in_pic_minus1 | ue(v) |
|       for( i = 0; i < num_slices_in_pic_minus1; i++ ) { | |
|         slice_width_in_tiles_minus1[ i ] | ue(v) |
|         slice_height_in_tiles_minus1[ i ] | ue(v) |
|         if( slice_width_in_tiles_minus1[ i ] == 0 && | |
|           slice_height_in_tiles_minus1[ i ] == 0 ) { | |
|           num_slices_in_tile_minus1[ i ] | ue(v) |
|           numSlicesInTileMinus1 = num_slices_in_tile_minus1[ i ] | |
|           for( j = 0; j < numSlicesInTileMinus1; j++ ) | |
|             slice_height_in_ctu_minus1[i][j] | ue(v) |
|         } | |
|         if( tile_idx_delta_present_flag && i < num_slices_in_pic_minus1 ) | |
|           tile_idx_delta[ i ] | se(v) |
|       } | |
|     } | |
|     ... | |
|   } | |
| ... | |
| } | | num_exp_tile_columns_minus1, a syntax derived by subtracting 1 from the number of tile columns that width information is explicitly signaled, may be signaled in a bitstream.

When the number of tile columns that width information is explicitly signaled is determined by a syntax, num_exp_tile_columns_minus1, width information, tile_column_width_minus1[i], may be signaled as many as the determined number. In this case, i may have a value between 0 and num_exp_tile_columns_minus1.

A width of a tile column that an index k is equal to or less than num_exp_tile_columns_minus1 may be determined based on tile_column_width_minus1[k], a syntax signaled for a corresponding tile column. Concretely, a width of a tile column that an index k is equal to or less than num_exp_tile_columns_minus1 may be determined by multiplying a value derived by adding 1 to a value of a syntax, tile_column_width_minus1[k], by a width of a coding tree unit.

On the other hand, a width of a tile column that an index k is greater than num_exp_tile_columns_minus1 may be determined based on width information signaled last and the number of remaining coding tree unit columns in a picture. In an example, when a width of a tile column derived by tile_column_width_minus1[num_exp_tile_columns_minus1], a syntax related to a width signaled last, is LastColWidth (i.e., tile_column_width_minus1[num_exp_tile_columns_minus1]+1) and the number of remaining coding tree unit columns excluding regions occupied by previous tile columns in a current picture is remainingWidthInCtbY, a width of a k-th tile column may be set as a smaller value among LastColWidth and remainingWidthInCtbY.

Table 15 is an example which describes a process in which a width of a tile column is determined.

TABLE 15

```
remainingWidthInCtbsY = PicWidthInCtbsY
for( i = 0; i <= num_exp_tile_columns_minus1; i++ ) {
    colWidth[ i ] = tile_column_width_minus1[ i ] + 1
    remainingWidthInCtbsY - = colWidth[ i ]
}
uniformTileColWidth =
tile_column_width_minus1[ num_exp_tile_columns_minus1 ] + 1
while( remainingWidthInCtbsY >= uniformTileColWidth ) {
    colWidth[ i++ ] = uniformTileColWidth
    remainingWidthInCtbsY - = uniformTileColWidth
}
if( remainingWidthInCtbsY > 0 )
    colWidth[ i++ ] = remainingWidthInCtbsY
NumTileColumns = i
```

In Table 15, a variable, PicWidthInCtbsY, represents the total number of coding tree unit columns in a picture. In an example, a variable, PicWidthInCtbsY, may be derived based on the following Equation 10.

$$\text{PicWidthInCtbsY} = \text{Ceil}(\text{pic\_width\_in\_luma\_samples}/\text{CtbSizeY})$$ [Equation 10]

In the Equation 10, pic_width_in_luma_samples represents the number of luma samples in a horizontal direction in a picture. A variable, CtbSizeY, may be a value representing a size of a coding tree unit.

A variable, remaining WidthInCtbY, may be derived by subtracting accumulated width of previous tile columns from a variable, PicWidthInCtbsY.

A syntax, num_exp_tile_rows_minus1, derived by subtracting 1 from the number of tile rows that height information is explicitly signaled, may be signaled in a bitstream.

When the number of tile rows that height information is explicitly signaled is determined by a syntax, num_exp_tile_rows_minus1, height information, tile_row_height_minus1[i], may be signaled as many as the determined number. In this case, i may have a value between 0 and num_exp_tile_rows_minus1.

A height of a tile row that an index k is equal to or less than num_exp_tile_rows_minus1 may be determined based on tile_row_Height_minus1[k], a syntax signaled for a corresponding tile row. Concretely, a height of a tile row that an index k is equal to or less than num_exp_tile_rows_minus1 may be determined by multiplying a value derived by adding 1 to a value of a syntax, tile_row_Height_minus1[k], by a height of a coding tree unit.

On the other hand, a height of a tile row that an index k is greater than num_exp_tile_rows_minus1 may be determined based on height information signaled last and the number of remaining coding tree unit rows in a picture. In an example, when a height of a tile row derived by tile_row_height_minus1[num_exp_tile_rows_minus1], a syntax related to a height signaled last, is LastRowHeight (i.e., tile_row_height_minus1[num_exp_tile_rows_minus1]+1) and the number of remaining coding tree unit rows excluding regions occupied by previous tile rows in a current picture is remainingHeightInCtbY, a height of a k-th tile row may be set as a smaller value among LastColHeight and remainingHeightInCtbY.

Table 16 is an example which describes a process in which a height of a tile row is determined.

TABLE 16

```
remainingHeightInCtbsY = PicHeightInCtbsY
for( j = 0; j < num_exp_tile_rows_minus1; j++ ) {
    RowHeight[ j ] = tile_row_height_minus1[ j ] + 1
    remainingHeightInCtbsY -= RowHeight[ j ]
}
uniformTileRowHeight =
tile_row_height_minus1[ num_exp_tile_rows_minus1 ] + 1
while( remainingHeightInCtbsY >= uniformTileRowHeight ) {
    RowHeight[ j++ ] = uniformTileRowHeight
    remainingHeightInCtbsY -= uniformTileRowHeight
}
if( remainingHeightInCtbsY > 0 )
    RowHeight[ j++ ] = remainingHeightInCtbsY
NumTileRows = j
```

In Table 16, a variable, PicHeightInCtbsY, represents the total number of coding tree unit rows in a picture. In an example, a variable, PicHeightInCtbsY, may be derived based on the following Equation 11.

PicHeightInCtbsY=Ceil(pic_height_in_luma_samples/CtbSizeY)     [Equation 11]

In the Equation 11, pic_height_in_luma_samples represents the number of luma samples in a vertical direction in a picture. A variable, CtbSizeY, may be a value representing a size of a coding tree unit.

A variable, remaining heightInCtbY, may be derived by subtracting accumulated height of previous tile rows from a variable, PicHeightInCtbsY.

It is described by using FIG. 41 as an example that each of 4 tile columns is configured with 2 coding tree unit columns. Accordingly, only for a first tile column, a syntax, tile_column_width_minus1[0], may be signaled with a value as 1, and a width of remaining tile columns may be set the same as tile_column_width_minus1[0]. As the number of tile_column_width_minus1, a syntax to be signaled, is 1, a value of a syntax, num_exp_tile_columns_minus1, may be set to be 0.

In FIG. 41, a first tile row is configured with 3 coding tree unit rows and a second tile row and a third tile row are configured with 2 coding tree unit rows. As a height of a third tile row may be derived based on height information of a second tile row, height information may be signaled only for a first tile rows and a second tile row. In an example, tile_row_height_minus1[0], a syntax for a first tile row, may be signaled with a value 2, and tile_row_height_minus1[1], a syntax for a second tile row, may be signaled with a value 1. As the number of tile_row_width_minus1, a syntax to be signaled, is 2, a value of a syntax, num_exp_tile_rows_minus1, may be set to be 1.

On the other hand, information representing a size of a coding tree unit may be signaled through a sequence parameter set or a picture parameter set.

One tile may be configured with at least one coding tree unit. Remaining tiles excluding a tile adjacent to a right or bottom boundary of a picture may be set not to be configured by including a region smaller than a coding tree unit. In other words, a boundary of a tile matches that of a coding tree unit.

A syntax, loop_filter_across_tiles_enabled_flag, represents whether it is allowed to apply an in-loop filter on a boundary of tiles in a picture which refers to a picture parameter set. In this case, an in-loop filter may include at least one of a deblocking filter, ALF or SAO. When a value of a flag, loop_filter_across_tiles_enabled_flag, is 1, it represents that an in-loop filter which crosses a boundary of tiles in a picture referring to a picture parameter set may be applied. On the other hand, when a value of a flag, loop_filter_across_tiles_enabled_flag, is 0, it represents that it is not allowed to apply an in-loop filter on a boundary of tiles in a picture which refers to a picture parameter set.

A syntax, loop_filter_across_slices_enabled_flag, represents whether it is allowed to apply an in-loop filter on a boundary of slices in a picture which refers to a picture parameter set. In this case, an in-loop filter may include at least one of a deblocking filter, ALF or SAO. When a value of a flag, loop_filter_across_slices_enabled_flag, is 1, it represents that an in-loop filter which crosses a boundary of slices in a picture referring to a picture parameter set may be applied. On the other hand, when a value of a flag, loop_filter_across_slices_enabled_flag, is 0, it represents that it is not allowed to apply an in-loop filter on a boundary of slices in a picture which refers to a picture parameter set.

Table 17 illustrates a syntax table including no_pic_partiiton_flag, a flag representing whether a picture is partitioned into a plurality of regions.

TABLE 17

| | |
|---|---|
| no_pic_partition_flag | u(1) |
| if(!no_pic_partitoin_flag){ | |
|   pps_log2_ctu_size_minus5 | u(2) |
|   num_exp_tile_columns_minus1 | ue(v) |
|   num_exp_tile_rows_minus1 | ue(v) |
|   for(i=0; i<=num_exp_tile_columns_minus1; i++) | |
|     tile_column_width_minus1[i] | ue(v) |
|   for(i=0; i<=num_exp_tile_rows_minus1;i++) | |
|     tile_row_height_minus1[i] | ue(v) |

When a flag, no_pic_partiton_flag, is 1, it represents that a picture or a sub-picture is not partitioned into a plurality of tiles or a plurality of slices. When a value of a flag, no_pic_partiton_flag, is 1, encoding of a syntax related to a tile partitioning structure and/or a slice partitioning structure may be omitted.

On the other hand, when no_pic_partiton_flag is 0, it represents that a picture or a sub-picture may be partitioned into a plurality of tiles or a plurality of slices. When a value of a flag, no_pic_partiton_flag, is 0, pps_log_2_ctu_size_minus5, a syntax for determining a size of a coding tree unit, may be signaled.

A rectangular region configured with a plurality of coding tree units may be defined as a tile. In other words, a single coding tree unit may cannot be defined as a tile. As above, when a plurality of coding tree units are defined as a tile, a range of a value of a syntax, tile_row_height_minus1, may be determined according to a value of a syntax, tile_column_width_minus1, or a range of a value of a syntax, tile_column_width_minus1, may be determined according to a value of a syntax, tile_row_height_minus1.

In an example, when a value of a syntax, tile_column_width_minus1, is 0, it represents that one coding tree unit column is included in a tile. As described above, as one tile is configured with a plurality of coding tree units, tile_row_height_minus1 representing a height of a tile should have a value greater than 0. In other words, when a syntax, tile_column_width_minus1, is encoded and signaled before a syntax, tile_row_height_minus1, and if a value of a syntax, tile_column_width_minus1, is 0, a syntax, tile_row_height_minus1, may have a value equal to or greater than 1.

On the other hand, when a syntax, tile_row_height_minus1, is encoded and signaled before a syntax, tile_column_width_minus1, and if a value of a syntax, tile- _row_height_minus1, is 0, a syntax, tile_column_width_minus1, may have a value equal to or greater than 1.

As in a described example, when a tile is configured with one coding tree unit column, the tile should include a plurality of coding tree rows. In other words, when a value of tile_column_width_minus1[i], a syntax representing a width for an i-th tile, is 0, a value of tile_row_height_minus1[i], a syntax representing a height for a i-th tile, should be equal to or greater than 1.

In addition, when a tile is configured with one coding tree unit row, the tile should include a plurality of coding tree columns. In other words, when a value of tile_row_height_minus1[i], a syntax representing a height for a i-th tile, is 0, a value of tile_row_height_minus1[i], a syntax representing a width for a i-th tile, should be equal to or greater than 1.

Accordingly, when a syntax, tile_column_width_minus1[i], is encoded before a syntax, tile_row_height_minus1[i], each syntax may be defined as in the following Table 18.

TABLE 18 tile_column_width_minus1[ i ] plus 1 specifies the width of the i-th tile column in units of CTBs for i in the range of 0 to num_exp_tile_columns_minus1 − 1, inclusive.
tile_column_width_minus1[ num_exp_tile_columns_minus1 ] is used to derive the width of the tile columns with index greater than or equal to num_exp_tile_columns_minus1 as specified in clause 6.5.1. When not present, the value of tile_column_width_minus1[ 0 ] is inferred to be equal to PicWidthInCtbsY − 1.
tile_row_height_minus1[ i ] plus 1 specifies the height of the i-th tile row in units of CTBs for i in the range of 0 to num_exp_tile_rows_minus1 − 1, inclusive.
tile_row_height_minus1[ num_exp_tile_rows_minus1 ] is used to derive the height of the tile rows with index greater than or equal to num_exp_tile_rows_minus1 as specified in clause 6.5.1. When not present, the value of tile_row_height_minus1[ 0 ] is inferred to be equal to PicHeightInCtbsY − 1. When one of the values of tile_column_width_minus1[ i ] is equal to 0, all values of tile_row_height_minus1[ i ] shall be greater than or equal to 1.

Conversely, when a syntax, tile_row_height_minus1[i], is encoded before a syntax, tile_column_width_minus1[i], each syntax may be defined as in the following Table 19.

TABLE 19 tile_column_width_minus1[ i ] plus 1 specifies the width of the i-th tile column in units of CTBs for i in the range of 0 to num_exp_tile_columns_minus1 − 1, inclusive.
tile_column_width_minus1[ num_exp_tile_columns_minus1 ] is used to derive the width of the tile columns with index greater than or equal to num_exp_tile_columns_minus1 as specified in clause 6.5.1. When not present, the value of tile_column_width_minus1[ 0 ] is inferred to be equal to PicWidthInCtbsY − 1. When one of the values of tile_row_height_minus1 [ i ] is equal to 0, all values of tile_column_width_minus1 [ i ] shall be greater than or equal to 1.
tile_row_height_minus1[ i ] plus 1 specifies the height of the i-th tile row in units of CTBs for i in the range of 0 to num_exp_tile_rows_minus1 − 1, inclusive.
tile_row_height_minus1[ num_exp_tile_rows_minus1 ] is used to derive the height of the tile rows with index greater than or equal to num_exp_tile_rows_minus1 as specified in clause 6.5.1. When not present, the value of tile_row_height_minus1[ 0 ] is inferred to be equal to PicHeightInCtbsY − 1.

In another example, when a value of a syntax, tile_column_width_minus1[i], is 0, a syntax, tile_row_height_minus2[i], instead of a syntax, tile_row_height_minus1[i], may be encoded. A syntax, tile_row_height_minus2[i], may be derived by subtracting 2 from the number of coding tree unit rows included by an i-th tile.

Alternatively, when a value of a syntax, tile_row_height_minus1[i], is 0, a syntax, tile_column_width_minus2[i], instead of a syntax, tile_column_width_minus1[i], may be encoded. A syntax, tile_column_width_minus2[i], may be derived by subtracting 2 from the number of coding tree unit columns included by an i-th tile.

At least one or more tiles may be defined as one processing unit. In an example, a plurality of tiles may be defined as one slice. A slice may be referred to as a tile group.

Alternatively, one tile may be partitioned in a plurality of processing units. In an example, one tile may be partitioned into a plurality of slices. In this case, one slice may include at least one coding tree unit column. When one tile is partitioned into a plurality of slices, information representing a height of each slice may be signaled in a bitstream.

At least one of four sides configuring a slice may match a boundary of a picture and/or a boundary of a tile. In an example, a left boundary or a top boundary of a slice may be set to match a left boundary or a top boundary of a picture. Alternatively, at least one of four sides of a slice may be positioned on a boundary of a tile.

Image encoding/decoding information may be signaled through a slice header. Information signaled through a slice header may be commonly applied to tiles and/or blocks belong to a slice.

Information representing a slice type may be signaled in a bitstream. The information represents a definition method of a slice in a current picture. In an example, rect_slice_flag, a syntax representing a slice type, may be signaled in a bitstream.

A syntax, rect_slice_flag, represents whether a slice is defined based on a raster scan order of tiles or whether a slice is defined in a rectangular shape. In an example, when rect_slice_flag is 0, it represents that a slice is defined based on a raster scan order of tiles. On the other hand, when rect_slice_flag is 1, it represents that a slice is defined in a rectangular shape.

Hereinafter, the two methods for determining a slice are described in detail.

A definition method based on a raster scan is to specify at least one or more tiles according to a raster scan order and define at least one or more specified tiles as a slice. When a definition method based on a raster scan is applied, one or more consecutive tile(s) may be defined as a slice. In this case, consecutive tiles may be determined according to a raster scan order. When a raster scan slice is applied, a non-rectangular slice may be generated.

When a slice is defined based on a raster scan order, information representing the number of tiles included by each slice may be signaled. Signaling of information representing the number of tiles included by a slice may be omitted for a last slice.

When a slice includes a plurality of tiles, a width or a height of tiles included in a slice may be different.

A definition method of a slice in a rectangular shape is a partitioning method which allows only a slice in a rectangular shape. When a definition method of a slice in a rectangular shape is applied, tiles positioned at four corners of a slice belong to the same row or the same column.

Alternatively, when a definition method of a slice in a rectangular shape is applied, one tile may be partitioned into a plurality of rectangular slices.

When a definition method of a slice in a rectangular shape is applied (e.g., when rect_slice_flag is 1), information representing whether a picture is configured with a single slice may be signaled. In an example, one_slice_in_pic_flag, a syntax representing whether the number of slices in a picture is 1, may be signaled in a bitstream. When a flag, one_slice_in_pic_flag, is 1, it represents that a picture is configured with a single slice. On the other hand, when a flag, one_slice_in_pic_flag, is 0, it represents that a picture is configured with at least two or more slices.

Alternatively, information representing whether each sub-picture is configured with one slice may be signaled. In an example, single_slice_per_subpic, a flag representing whether each sub-picture is configured with a single slice, may be signaled. When a flag, single_slice_per_subpic, is 1, it represents that each sub-picture is configured with a single slice. In this case, a slice partitioning structure may be determined to be the same as a sub-picture partitioning structure determined by referring to a sequence parameter set. On the other hand, when single_slice_per_subpic is 0, it represents that a sub-picture partitioning structure is different from a slice partitioning structure. When a value of a flag, single_slice_per_subpic, is 0, information for determining a slice partitioning structure may be additionally signaled.

Based on the number of tile columns and/or the number of tile rows included by a slice, a size of a slice may be determined. It is described by referring to Table 14 that slice_height_in_tiles_minus1[i], a syntax representing a height of an i-th slice, may be signaled in a bitstream. A syntax, slice_height_in_tiles_minus1[i], represents a value subtracting 1 from the number of tile rows included by an i-th slice. In this case, a height of an i-th slice may be derived by adding up heights of each tile row included by an i-th slice.

slice_width_in_tiles_minus1[i], a syntax representing a width of an i-th slice, may be signaled in a bitstream. A syntax, slice_width_in_tiles_minus1[i], represents a value subtracting 1 from the number of tile columns included by an i-th slice. In this case, a width of an i-th slice may be derived by adding up heights of each tile column included by an i-th slice.

FIG. 42 is a diagram for describing an aspect that size information of a slice is signaled.

In an example shown in FIG. 42, a slice that an index is 4 (slice 4) is configured with 2 tile columns and 2 tile rows. Accordingly, slice_width_in_tiles_minus1[4], a syntax representing a width of a slice for slice 4, and slice_height_in_tiles_minus1[4], a syntax representing a height of a slice, may be set to be 1, respectively.

One tile may be partitioned into a plurality of slices. In an example, one tile may be partitioned into a plurality of slices by using at least one vertical line.

When one tile is partitioned into a plurality of slices, width information and height information for an i-th slice may be set to be 0, respectively. In an example, when both slice_width_in_tiles_minus1[i], a syntax representing a width of an i-th slice, and slice_slice_in_tiles_minus1[i], a syntax representing a height of an i-th slice, are 0, num_slices_in_tiles_minus1[i], a syntax representing the number of slices included by a corresponding tile, may be signaled. A syntax, num_slices_in_tiles_minus1[i], represents a value subtracting 1 from the number of slices included by a tile.

When a value of a syntax, num_slices_in_tiles_minus1[i], is 0, it represents that an i-th slice is configured with one tile. On the other hand, when a value of a syntax, num_slices_in_tiles_minus1[i], is greater than 0, it represents that a tile including an i-th slice is partitioned into a plurality of slices. When a value of a syntax, num_slices_in_tiles_minus1[i], is greater than 0, information representing a height of each tile may be additionally signaled.

In an example, a syntax, slice_height_in_ctu_minus1[i][j], may be derived by subtracting 1 from the number of coding tree unit rows included by a j-th slice in a corresponding tile. For a last slice in a corresponding tile, encoding of the syntax, slice_height_in_ctu_minus1, may be omitted. A height of a last slice may be determined based on a height of remaining coding tree unit rows in a tile.

Information for identifying tiles included by each slice may be signaled.

Concretely, difference information for specifying an index of a tile included in a slice may be encoded and signaled. In an example, tile_idx_delta[i], a syntax representing a value which subtracts an index of a tile at a predetermined position in an (i+1)-th slice and an index of a tile at a predetermined position in an i-th slice, may be encoded. In this case, a tile at a predetermined position may be a top-left tile or a bottom-right tile in a slice.

For a last slice, encoding of difference information may be omitted.

With difference information, information representing a sign of difference information may be further encoded and signaled. In an example, tile_idx_delta sign[i], a syntax representing whether a value of a syntax, tile_idx_delta[i], is a positive number or a negative number, may be signaled in a bitstream. In this case, as a difference value between a first slice (i.e., a slice that i is 0) and a second slice (i.e., a slice that i is 1) is always a positive number, encoding of a syntax, tile_idx_delta_sign[i], may be omitted for a first slice.

When an i-th slice and an (i+1)-th slice are not included in one tile, an absolute value of a tile index difference between an i-th slice and an (i+1)-th slice always has a value greater than 1. Accordingly, tile_idx_delta_minus1[i], a syntax derived by subtracting 1 from an absolute value of a tile index difference between an i-th slice and an (i+1)-th slice, may be encoded and signaled.

Table 20 illustrates a syntax table which includes difference information.

TABLE 20

| | Descriptor |
|---|---|
| pic_parameter_set_rbsp( ) { | |
| ... | |
|   single_tile_in_pic_flag | u(1) |
|   if( !single_tile_in_pic_flag ) { | |
|     log2_pps_ctu_size_minus5 | u(2) |
|     num_exp_tile_columns_minus1 | ue(v) |
|     num_exp_tile_rows_minus1 | ue(v) |
|     for( i = 0; i <= num_exp_tile_columns_minus1; i++ ) | |
|       tile_column_width_minus1[ i ] | ue(v) |
|     for( i = 0; i <= num_exp_tile_rows_minus1; i++ ) | |
|       tile_row_height_minus1[ i ] | ue(v) |
|     loop_filter_across_tiles_enabled_flag | u(1) |
|     loop_filter_across_slices_enabled_flag | u(1) |
|     rect_slice_flag | u(1) |
|     if ( rect_slice_flag ) { | |
|       num_slices_in_pic_minus1 | ue(v) |
|       for( i = 0; i < num_slices_in_pic_minus1; i++ ) { | |
|         slice_width_in_tiles_minus1[ i ] | ue(v) |
|         slice_height_in_tiles_minus1[ i ] | ue(v) |
|         if( slice_width_in_tiles_minus1[ i ] == 0 && | |
|           slice_height_in_tiles_minus1[ i ] == 0 ) { | |
|           num_slices_in_tiles_minus1[ i ] | ue(v) |
|           numSlicesInTileMinus1 = num_slices_in_tile_minus1[ i ] | |
|           for( j = 0; j < numSlicesInTileMinus1; j++ ) | |
|             slice_height_in_ctu_minus1[i][j] | ue(v) |
|         } | |
|         if( tile_idx_delta_present_flag && i < num_slices_in_pic_minus1 ){ | |
|           tile_idx_delta_minus1[ i ] | ue(v) |

TABLE 20-continued

| | Descriptor |
|---|---|
| ```
      if (i>0)
        tile_idx_delta_sign[i]
    }
  }
  ...
  }
}
...
}
``` | u(1) |

When one tile includes a plurality of slices, the plurality of slices are included in the same tile, thereby a tile index difference value between the plurality of slices becomes 0. Accordingly, encoding of a difference value between a plurality of slices included in one tile may be omitted. As encoding of difference information between slices belonging to the same tile is omitted, a syntax, tile_idx_delta_minus1[i], may be always set as a value equal to or greater than 0.

In addition, when one tile includes a plurality of slices, difference information may be encoded only for one of a plurality of slices. In an example, a syntax, tile_idx_delta_minus1[i], may be encoded only for a first slice or a last slice among a plurality of slices included in one tile. In an example, an i-th slice specified by the syntax, tile_idx_delta_minus1[i], represents a first slice or a last slice among a plurality of slices belonging to a first tile and an (i+1)-th slice represents a slice which includes a second tile different from the first tile.

A syntax, tile_idx_delta_sign[i], represents a sign of a tile index difference value. In an example, TileIdxDeltaSign, a sign of a tile index difference value, may be determined as in the following Equation 12.

$$TileIdxDeltaSign[i]=tile\_idx\_delta\_sign[i]?1:-1 \quad \text{[Equation 12]}$$

As illustrated in Equation 12, when a value of a syntax, tile_idx_delta_sign[i], is 1, it represents that a tile index difference value derived by a syntax, tile_idx_delta_minus1[i], is a positive number. When a value of a syntax, tile_idx_delta_sign[i], is 0, it represents that a tile index difference value derived by a syntax, tile_idx_delta_minus1[i], is a negative number.

A tile index difference may be derived by multiplying a tile index difference value derived by a syntax, tile_idx_delta_minus1[i] (e.g., tile_idx_delta_minus1[i]+1) by a sign value derived by a syntax, tile_idx_delta_sign[i].

Encoding of a syntax, tile_idx_delta_sign[i], may be omitted for at least one of a first slice (e.g., a slice that i is 0), a last slice (e.g., a slice that i is num_slices_in_pic_minus1) or a previous slice of a last slice (e.g., a slice that i is num_slices_in_pic_minus1-1). When encoding of a syntax, tile_idx_delta_sign[i], is omitted, that value may be inferred to be 1.

Alternatively, encoding of sign information of a tile index difference value may be omitted and a tile index difference value may be set to have a positive value all the time.

Based on a position of a slice, whether tile index difference information is encoded may be determined. Table 21 illustrates an example in which whether tile index difference information is parsed is determined based on a position of a slice.

TABLE 21

| | |
|---|---|
| rect_slice_flag | u(1) |
| if ( rect_slice_flag ) | |
|   single_slice_per_subpic_flag | u(1) |
| if( rect_slice_flag | |
| && !single_slice_per_subpic_flag ) { | |
|   num_slices_in_pic_minus1 | ue(v) |
|   tile_idx_delta_present_flag | u(1) |
|   if (num_slices_in_pic_minus1) | |
|     multiple_slice_in_tile_present_flag | u(1) |
|   for( i = 0; i < num_slices_in_pic_minus1; i++ ) { | |
|     if (multiple_slice_in_tile_present_flag) | |
|       multiple_slice_in_tile_flag[i] | u(1) |
|     if (!multiple_slice_in_tile_flag[i] | |
| \|\| !multiple_slice_in_tile_present_flag ){ | |
|       slice_width_in_tiles_minus1[ i ] | ue(v) |
|       slice_height_in_tiles_minus1[ i ] | ue(v) |
|     }else{ | |
|       num_slices_in_tile_minus2[ i ] | ue(v) |
|       numSlicesInTileMinus1 = | |
| num_slices_in_tile_minus2[ i ] +1 | |
|       for( j = 0; j < numSlicesInTileMinus1; j++ ) | |
|         slice_height_in_ctu_minus1[i][j] | ue(v) |
|     } | |
|     if( tile_idx_delta_present_flag && i < num_slices_in_pic_minus1 ){ | |
|       if ((tileIdx / NumTileColumns) != NumTileRow – 1) | |
|         tile_idx_delta_minus1[i] | ue(v) |
|       if (i>0) { | |
|         if ((tileIdx % NumTileColumns) != NumTileColumn) \|\| (tileIdx% NumTileRows) != NumTileRows) | |
|           tile_idx_delta_sign[i] | u(1) |
|       } | |
|     } | |
|   } | |
| } | |

In Table 21, a variable, tileIdx, represents an index of a top-left tile in an i-th tile.

When a top-left tile included by an i-th slice belongs to a last tile row in a picture, encoding/decoding of tile_idx_delta_minus1[i], a syntax representing a tile index difference value, may be omitted. In other words, only when a top-left tile of an i-th slice does not belong to a last tile row in a picture, a syntax, tile_idx_delta_minus1[i], may be encoded.

When encoding of a syntax, tile_idx_delta_minus1[i], is omitted, a value of a syntax, tile_idx_delta_minus1[i], may be inferred the same as a value of a syntax, slice_width_in_tiles_minus1[i].

When a top-left tile included by an i-th slice belongs to a last tile column in a picture or when a top-left tile included by an i-th slice belongs to a last tile row in a picture, encoding/decoding of tile_idx_delta_sign[i], a syntax representing a sign of a tile index difference value, may be omitted.

When encoding of a syntax, tile_idx_delta_sign[i], is omitted, a value of a syntax, tile_idx_delta_sign[i], may be inferred to be 1.

In the above-described example, it was illustrated that when a tile to which an i-th slice belongs includes a plurality of slices, information representing the number of slices belonging to the tile and height information of each of the slices are signaled.

In another example, when a tile to which an i-th slice belongs includes a plurality of slices, number information of slices that height information is explicitly signaled may be signaled and height information may be signaled as many as the number specified by the number information. Table 22 illustrates a syntax table which includes number information that height information should be explicitly signaled.

TABLE 22

| | |
|---|---|
| rect_slice_flag | u(1) |
| if ( rect_slice_flag ) | |
|   single_slice_per_subpic_flag | u(1) |
| if( rect_slice_flag | |
| && !single_slice_per_subpic_flag ) { | |
|   num_slices_in_pic_minus1 | ue(v) |
|   tile_idx_delta_present_flag | u(1) |
|   multiple_slices_in_tile_present_flag | u(1) |
|   for( i = 0; i < num_slices_in_pic_minus1; i++ ) { | |
|     if (multiple_slice_in_tile_present_flag) | |
|       multiple_slices_in_tile_flag[i] | u(1) |
|     if (!multiple_slices_in_tile_flag[i] | |
|     \|\| !multiple_slices_in_tile_present_flag ){ | |
|       slice_width_in_tiles_minus1[ i ] | ue(v) |
|       slice_height_in_tiles_minus1[ i ] | ue(v) |
|     }else{ | |
|       num_exp_slices_in_tile_minus1[ i ] | ue(v) |
|       numSlicesInTile = | |
| num_exp_slices_in_tile_minus1[ i ]+1 | |
|       for( j = 0; j < numSlicesInTile; j++ ) | |
|         slice_height_in_ctu_minus1[i][j] | ue(v) |
|       if( numExpSlicesInTile ) | |
|         i += RemNumSlicesMinus1 | |
|     } | |
|     if ( tile_idx_delta_present_flag && i < | |
| num_slices_in_pic_minus1 ){ | |
|       tile_idx_delta_minus1[i] | ue(v) |
|       if (i>0) | |
|         tile_idx_delta_sign[i] | u(1) |
|     } | |
|   } | |
| } | |

In Table 22, a syntax, exp_num_slices_in_tile_minus1[i], represents the number of slices that height information in a tile including an i-th slice is explicitly signaled. Concretely, a syntax, exp_num_slices_in_tile_minus1[i], may be derived by subtracting 1 from the number of slices that height information is explicitly signaled.

A variable, numExpSlicesInTile, represents the explicit number derived by adding 1 to a value of a syntax, exp_num_slices_in_tile_minus1[i].

When the number of slices that height information is explicitly signaled is determined, height information of a slice may be encoded and signaled by the determined number. In an example, a syntax, slice_height_in_ctu_minus1[i][j], represents a value subtracting 1 from the number of coding tree unit rows included by a j-th slice in a tile including an i-th slice. In this case, a variable i is a value calculated based on the number of slices in a picture and a variable j is a value calculated based on the number of slices in a tile.

A height of a slice that an index k is smaller than the explicit number may be determined based on slice_height_in_ctu_minus1[k], a syntax signaled in a bitstream.

A height of a slice that an index k is the same as or greater than the explicit number may be determined based on height information signaled last and the number of remaining coding tree unit rows in a tile. In an example, when a width of a slice derived by slice_height_in_ctu_minus1[exp_num_slices_in_tile_minus1], a syntax related to a height signaled last, is LastSliceHeight and the number of remaining coding tree unit rows excluding regions occupied by previous slices in a tile is remainingHeightInCtbY, a height of a k-th slice may be set as a smaller value among LastSliceHeight and remainingHeightInCtbY.

In Table 22, it was illustrated that num_exp_slices_in_tile_minus1[i], a syntax derived by subtracting 1 from the number of slices that height information is explicitly signaled, is encoded/decoded. In this case, the explicit number determined by the syntax, num_exp_slices_in_tile_minus1[i], is at least 1 or more. Accordingly, even when one tile is configured with one slice, a problem that a height of a tile should be explicitly signaled may occur.

To resolve the problem, num_exp_slices_in_tile[i], a syntax set as the number of slices that height information is explicitly signaled, may be encoded/decoded. Table 23 illustrates a syntax table which includes a syntax, num_exp_slices_in_tile[i].

TABLE 23

| | |
|---|---|
| rect_slice_flag | u(1) |
| if ( rect_slice_flag ) | |
|   single_slice_per_subpic_flag | u(1) |
| if( rect_slice_flag | |
| && !single_slice_per_subpic_flag ) { | |
|   num_slices_in_pic_minus1 | ue(v) |
|   tile_idx_delta_present_flag | u(1) |
|   for( i = 0; i < num_slices_in_pic_minus1; i++ ) { | |
|     slice_width_in_tiles_minus1[ i ] | ue(v) |
|     slice_height_in_tiles_minus1[ i ] | ue(v) |
|     if( slice_width_in_tiles_minus1[ i ] = = 0 && | |
|       slice_height_in_tiles_minus1[ i ] = = 0 ) { | |
|       num_exp_slices_in_tile[ i ] | ue(v) |
|       numExpSlicesInTile = num_exp_slices_in_tile[ i ] | |
|       for( j = 0; j < numExpSlicesInTile; j++ ) | |
|         slice_height_in_ctu_minus1[i][j] | ue(v) |
|         i += (RemNumSlicesMinus1+ numExpSlicesInTile) | |
|     } | |
|     if( tile_idx_delta_present_flag && i < | |
| num_slices_in_pic_minus1 ) | |
|       tile_idx_delta[ i ] | se(v) |
|   } | |
| } | |

Only when the explicit number (i.e., numExpSlicesInTile) is greater than 0, slice_height_in_ctu_minus1, a syntax representing a height of a slice, may be encoded/decoded.

When the explicit number is 0, it may be determined that a corresponding tile is configured with one slice.

FIGS. 43 and 44 are diagrams for describing an encoding aspect of height information of a slice.

In FIG. 43, it was shown that one tile is partitioned into four slices. In a shown example, it was illustrated that 3 slices excluding a first slice have the same height (i.e., three coding tree unit rows).

In this case, slice_height_in_ctu_minus1[0], a syntax representing a height of a first slice in a tile (slice 0), may be encoded with a value 2 and slice_height_in_ctu_minus1[1], a syntax representing a height of a second slice (slice 1), may be encoded with a value 1. As a third slice (slice 2) and a fourth slice (slice 3) have the same height as a height lastly encoded by a syntax, slice_height_in_ctu_minus1[1], encoded last, their height information may not be further encoded.

Accordingly, the number of slices that height information is explicitly signaled may be determined to be 2. For example, a value of a syntax, num_exp_slices_in_tile[i], may be set to be 2.

In FIG. 44, it was shown that one tile is partitioned into five slices. In a shown example, it was illustrated that a first slice is configured with three coding tree unit rows, a second to fourth slice are configured with three coding tree unit rows and a last slice is configured with one coding tree unit row.

In this case, slice_height_in_ctu_minus1[0], a syntax representing a height of a first slice in a tile (slice 0), may be encoded with a value 2 and slice_height_in_ctu_minus1[1], a syntax representing a height of a second slice (slice 1), may be encoded with a value 1. A third slice (slice 2) and a fourth slice (slice 3) have the same height as a height lastly encoded by a syntax, slice_height_in_ctu_minus1[1]. In addition, for a last slice (slice 4), remainingHeightInCtbY, a remaining height excluding a region occupied by previous slices in a tile, has a value smaller than a height value, LastSliceHeight, lastly encoded by a syntax, slice_height_in_ctu_minus1[1]. Accordingly, although height information of a third slice, a fourth slice and a fifth slice is not encoded individually, a height of each of them can be derived.

Accordingly, the number of slices that height information is explicitly signaled may be determined to be 2. For example, a value of a syntax, num_exp_slices_in_tile[i], may be set to be 2.

In an example of Table 22 and Table 23, a variable i is set between 0 and a value subtracting 1 from the number of slices in a picture and a variable j is set between 0 and a value subtracting 1 from the number of slices in a tile.

A variable i is related to the total number of slices in a picture, so if a partitioning structure for n slices in a predetermined tile is determined, a variable i should increase by (n−1) when it comes to determine a size of a slice regarding a next tile.

Accordingly, when it is determined that a plurality of slices in a predetermined tile are included, a variable i may be changed into an index of a last slice in a predetermined tile after determining a height of each of the plurality of slices.

In an example, in Table 23, a variable, RemNumSlicesMinus1, may be derived by subtracting 1 and the explicit number determined by a syntax, num_exp_slices_in_tile, from the total number of slices in a predetermined tile. Concretely, a variable, RemNumSlicesMinus1, may be derived as follows. First, the number of remaining coding tree unit rows (RemHeight) may be derived by subtracting a sum of heights of slices that height information is explicitly signaled from a height of a determined tile. Subsequently, a value subtracting 1 from Ceil(RemHeight/LastSliceHeight) calculated based on RemHeight, the number of remaining coding tree unit rows, and LastSliceHeight, a height signaled last, may be set as a value of a variable, RemNumSlicesMinus1.

In an example, in an example of FIG. 43, a height of a tile is 9 (9 CTUs) and a sum of heights of slices that height information is explicitly signaled is 5. Accordingly, RemHeight, the number of remaining coding tree rows, is set to be 4. In addition, LastSliceHeight, a height of a slice that height information is signaled last, is 2. Accordingly, a value of a variable, RemNumSliceMinus1, may be derived as 1 by subtracting 1 from a value dividing a variable, RemHeight, by a variable, LastSliceHeight.

When a variable, RemHeight, is not a multiple of a variable, LastSliceHeight, a quotient derived by a division may be set as a variable, RemNumSliceMinus1. In an example, in an example of FIG. 44, a variable, RemHeight, is 5 and a variable, LastSliceHeight, is 2. Accordingly, a variable, RemNumSlice, may be set as 2, a quotient when a variable, RemHeight, is divided by a variable, LastSliceHeight.

Table 24 represents an example in which a variable, RemNumSlicesMinus1, is derived.

TABLE 24

```
tileIdx = 0
    for( i = 0; i <= num_slices_in_pic_minus1; i++ )
        NumCtuInSlice[ i ] = 0
    for( i = 0; i <= num_slices_in_pic_minus1; i++ ) {
        tileX = tileIdx % NumTileColumns
```

TABLE 24-continued

```
        tileY = tileIdx / NumTileColumns
        if( i = = num_slices_in_pic_minus1 ) {
            slice_width_in_tiles_minus1[ i ] =
NumTileColumns − 1 − tileX
            slice_height_in_tiles_minus1[ i ] =
NumTileRows − 1 − tileY
            num_slices_in_tile_minus1[ i ] = 0
        }
        if ( slice_width_in_tiles_minus1[ i ] = = 0 &&
slice_height_in_tiles_minus1[ i ] = = 0 ) {)
            ctbY = tileRowBd[ tileY ]
            SumExpCtuHeight = 0 ;
            numExpSlicesInTile = num_exp_slices_in_tile[ i ]
            for( j = 0; j < numExpSlicesInTile; j++ ) {
                AddCtbsToSlice( i, tileColBd[ tileX ],
tileColBd[ tileX + 1 ],
                    ctbY,
ctbY + slice_height_in_ctu_minus1[ i ] + 1 )
                ctbY +=
slice_height_in_ctu_minus1[ i ] + 1
                SumExpCtuHeight +=
slice_height_in_ctu_minus1[ i ] + 1
                i++
            }
            RemNumSlicesMinus1 = (RowHeight[TileY] −
SumExpCtuHeight+ slice_height_in_ctu_minus1[i−1]) /
(slice_height_in_ctu_minus1[i−1] + 1)
            for( j = 0; j < RemNumSlicesMinus1; j++ ) {
                AddCtbsToSlice( i, tileColBd[ tileX ],
tileColBd[ tileX + 1 ],
                    ctbY,
ctbY + slice_height_in_ctu_minus1[ i−1 ] + 1 )
                ctbY += slice_height_in_ctu_minus1[ i−
1 ] + 1
            }
        } else
            for( j = 0; j <=
slice_height_in_tiles_minus1[ i ]; j++ )
                for( k = 0; k <=
slice_width_in_tiles_minus1[ i ]; k++ )
                    AddCtbsToSlice( i,
tileColBd[ tileX + k ], tileColBd[ tileX + k + 1 ],
                        tileRowBd[ tileY + j ],
tileRowBd[ tileY + j + 1 ] )
        if( tile_idx_delta_present_flag )
            tileIdx += tile_idx_delta[ i ]
        else {
            tileIdx += slice_width_in_tiles_minus1[ i ] + 1
            if( tileIdx % NumTileColumns = = 0 )
                tileIdx +=
slice_height_in_tiles_minus1[ i ] * NumTileColumns
        }
    }
```

Alternatively, as in an example of Table 25, a variable, RemNumSlicesMinus1, may be derived.

TABLE 25

```
tileIdx = 0
    for( i = 0; i <= num_slices_in_pic_minus1; i++ )
        NumCtuInSlice[ i ] = 0
    for( i = 0; i <= num_slices_in_pic_minus1; i++ ) {
        tileX = tileIdx % NumTileColumns
        tileY = tileIdx / NumTileColumns
        if( i = = num_slices_in_pic_minus1 ) {
            slice_width_in_tiles_minus1[ i ] =
NumTileColumns − 1 − tileX
            slice_height_in_tiles_minus1[ i ] =
NumTileRows − 1 − tileY }
            if( (multiple_slice_in_tile_flag[i] &&
multiple_slice_in_tile_present_flag) { (29)
            ctbY = tileRowBd[ tileY ]
            SumExpCtuHeight = 0 ;
            numExpSlicesInTile =
num_exp_slices_in_tile_minus1[ i ]+1
            for( j = 0; j < numExpSlicesInTile; j++ ) {
                AddCtbsToSlice( i, tileColBd[ tileX ],
```

TABLE 25-continued

```
            tileColBd[ tileX + 1 ],
                ctbY,
            ctbY + slice_height_in_ctu_minus1[ i ] + 1 )
                ctbY +=
            slice_height_in_ctu_minus1[ i ] + 1
                SumExpCtuHeight +=
            slice_height_in_ctu_minus1[ i ] + 1
                i++
            }
            RemNumSlicesMinus1 = (RowHeight[TileY] −
        SumExpCtuHeight+ slice_height_in_ctu_minus1[i−1]) /
        (slice_height_in_ctu_minus1[i−1] + 1)
            for( j = 0; j < RemNumSlicesMinus1; j++ ) {
                AddCtbsToSlice( i, tileColBd[ tileX ],
        tileColBd[ tileX + 1 ],
                ctbY,
            ctbY + slice_height_in_ctu_minus1[ i−1 ] + 1 )
                ctbY += slice_height_in_ctu_minus1[ i−
        1 ] + 1
            }
        }
```

One picture may be partitioned into at least one or more sub-pictures. A sub-picture may be a rectangular region which includes at least one slice.

Encoding or decoding may be performed in a unit of a sub-picture. Alternatively, a partial bitstream may be generated per sub-picture. In a decoder, only part of a multiplexed bitstream may be parsed. In an example, a partial bitstream corresponding to a watching region of a user may be parsed and based on it, an image may be rendered.

Alternatively, a picture parameter set may be encoded/decoded per sub-picture. Accordingly, a picture parameter set which is referred to per sub-picture may be different. Alternatively, tile partitioning may be independently performed per sub-picture.

Sub-pictures may be configured with consecutive regions. It represents that a sub-picture cannot be configured with two slices which are not spatially adjacent each other. For example, slices which are neighboring each other may be defined as one sub-picture, but slices which are not neighboring each other may not be defined as one sub-picture.

A sub-picture may be defined as a rectangular shape which includes one or more slices. In other words, a partitioning shape that a sub-picture has a non-rectangular shape is not allowed.

FIG. 45 is a diagram for describing a partitioning shape which may be applied to a picture.

In FIG. 45 (*a*) to (*c*), each quadrangle represents a slice. In addition, a number assigned to each slice represents an index of a sub-picture to which the corresponding slice belongs.

Through a slice header, an index of a sub-picture to which each slice belongs may be signaled. In an example of FIG. 45, it may be understood that slices to which the same index is assigned are included in the same sub-picture.

In reference to FIG. 45 (*a*), it is depicted that each sub-picture is defined as a rectangular shape. Accordingly, the same partitioning shape as in an example shown in FIG. 45 (*a*) may be applied to a picture.

On the other hand, in FIG. 45 (*b*), it is depicted that a sub-picture marked as No. 3 is defined as a non-rectangular shape. As it is not allowed to define a sub-picture as a non-rectangular shape, the same partitioning shape as in an example shown in FIG. 45 (*b*) cannot be applied to a picture.

In FIG. 45 (*c*), it is depicted that a sub-picture marked as No. 0 is defined as two regions which are spatially separated. One sub-picture is not allowed to include a plurality of regions which are not consecutive spatially. Accordingly, the same partitioning shape as in an example shown in FIG. 45 (*c*) cannot be applied to a picture.

Based on the description, a method in which a picture is partitioned into at least one sub-picture will be described in detail according to an embodiment of the present disclosure.

FIG. 46 is a flow diagram of a method in which a picture is partitioned into at least one sub-picture according to an embodiment of the present disclosure.

Information related to a sub-picture may be signaled at a level of a sequence. In an example, at least one of a syntax representing whether a sub-picture which will be described after is partitioned, a syntax related to picture partitioning information or a syntax related to sub-picture independence may be included in a sequence parameter set.

Information related to a sub-picture may be commonly applied to pictures which refer to the sequence parameter set. Accordingly, a partitioning shape of pictures referring to a sequence parameter set may be the same.

Alternatively, some of information related to a sub-picture may be signaled at a sequence level and some may be signaled at a picture level. In an example, a syntax representing whether a sub-picture partitioning is performed or not may be included in a sequence parameter set, but a syntax related to picture partitioning information and a syntax related to sub-picture independence may be included in a picture parameter set. Alternatively, a syntax representing whether a sub-picture partitioning is performed or not and a syntax related to picture partitioning information may be included in a sequence parameter set, but a syntax related to sub-picture independence may be included in a picture parameter set. In this case, at least one of a partitioning shape or independence of sub-pictures may be different per picture.

In the after-described embodiments, it is assumed that information related to a sub-picture is signaled through a sequence parameter set.

In reference to FIG. 46, whether a picture will be partitioned into at least one sub-picture or not may be determined (S4601). Information representing whether a picture will be partitioned into at least one sub-picture or not may be signaled in a bitstream. In an example, a syntax, sub-pics_present_flag, may be signaled in a bitstream. When a syntax, subpics_present_flag, is 1, it represents that a picture may be partitioned into at least one sub-picture. When the syntax, subpics_present_flag, is 1, a sub-picture parameter may be included in a bitstream, e.g., sequence parameter set. On the other hand, when a syntax, subpics_present_flag, is 0, it represents that a picture is not partitioned into sub-pictures. When the syntax, subpics_present_flag, is 0, a sub-picture parameter may not be included in a bitstream, e.g., sequence parameter set. In this case, a sub-picture parameter may include at least one of information representing the number of sub-pictures (e.g., max_subpics_minus1), information representing a size of a sub-picture (e.g., subpic_grid_col_width_minus1, subpic_grid_row_height_minus1), information representing an index of a sub-picture (e.g., subpic_grid_idx), information representing whether a sub-picture is treated as a picture (e.g., subpic_treated_as_pic_flag) or information representing whether it is allowed to apply an in-loop filter on a boundary of a sub-picture (e.g., loop_filter_across_subpic_enabled_flag). Hereinafter, a sub-picture parameter is described in detail.

When a picture may be partitioned into at least one sub-picture, sub-picture partitioning information may be obtained (S4602). Picture partitioning information may include at least one of information representing the number of sub-pictures included in a picture, information representing a position of each sub-picture or information representing a size of each sub-picture.

In an example, a syntax, sps_num_subpics_minus1, representing the number of sub-pictures, may be signaled in a bitstream. A syntax, sps_num_subpics_minus1, may represent a value subtracting 1 from the number of sub-pictures included in a picture.

Alternatively, a syntax, max_subpics_minus1, representing the number of sub-pictures, may be signaled in a bitstream. When sub-picture partitioning is independently performed for each picture in a sequence, a syntax, max_subpics_minus1, represents the maximum value of the number of sub-pictures of each picture which refers to a sequence parameter set. In an example, when the number of sub-pictures included by a first picture in a sequence is 3 and remaining pictures excluding the first picture include 2 or less sub-pictures, a value of a syntax, max_subpics_minus1, may be set as 2 (a value subtracting 1 from the maximum value, 3).

A size of a sub-picture may be determined based on a square block. The square block may be a block in a predefined size which is derived by applying a lattice structure to a picture. A square block which becomes a base unit for determining a size of a sub-picture may be referred to as a Grid.

A size of a grid may be predefined in an encoder and a decoder. In an example, a grid may have an 8×8, 16×16, 32×32 or 64×64 size. Alternatively, information representing a size of a grid may be signaled in a bitstream.

Alternatively, a single coding tree unit or a plurality of coding tree units may be set as a grid. A size of a coding tree unit may be signaled at a sequence level. In other words, coding tree unit size information included in a sequence parameter set may be parsed and a position and a size of a sub-picture may be determined by using parsed coding tree unit size information.

A sub-picture may be defined by allocating an index of a sub-picture, to which each grid belongs, to each grid.

Table 26 represents an example in which an index of a sub-picture is allocated to each grid.

TABLE 26

| | Descriptor |
|---|---|
| seq_parameter_set_rbsp( ){ | |
| ... | |
|   subpics_present_flag | u(1) |
|   if(subpics_present_flag){ | |
|     max_subpics_minus1 | u(8) |
|     subpic_grid_col_width_minus1 | u(v) |
|     subpic_grid_row_height_minus1 | u(v) |
|     for(i=0; i<NumSubPicGridRows; i++) | |
|       for(j=0; j<NumSubPicGridCols; j++) | |
|         subpic_grid_idx[i][j] | u(v) |
|     for(i=0; i<=NumSubPics; i++) | |
|       subpic_treated_as_pic_flag[i] | u(1) |
|       loop_filter_across_subpic_enabled_flag[i] | u(1) |
|     } | |
|   } | |
| ... | |
| } | |

A syntax, subpic_grid_col_width_minus1, represents a width of a grid. In an example, a syntax, subpic_grid_col_width_miuns1, may be derived by subtracting 1 from a value dividing a width of a grid by a predetermined constant value N. N may be an integer such as 2, 4, 8, or 16, etc. Alternatively, N may be determined according to a size of a coding tree unit.

A syntax, subpic_grid_row_height_minus1, represents a height of a grid. In an example, a syntax, subpic_grid_row_height_minus1, may be derived by subtracting 1 from a value dividing a height of a grid by a predetermined constant value N.

A sub-picture index may be allocated to each grid. In an example, a syntax, subpic_grid_idx[i][j], represents a sub-picture index of a grid belonging to an i-th column and a j-th row.

Grids to which the same sub-picture index is allocated may be understood to belong to the same sub-picture.

Based on the maximum number of sub-pictures, whether grid size information is signaled may be determined. In an example, Table 27 represents an example in which whether grid size information is parsed is determined based on a value of a syntax, max_subpics_minus1.

TABLE 27

| | Descriptor |
|---|---|
| seq_parameter_set_rbsp( ) { | |
| ... | |
|   subpics_present_flag | u(1) |
|   if( subpics_present_flag ) { | |
|     max_subpics_minus1 | u(8) |
|     if (max_subpics_minus1>0){ | |
|       subpic_grid_col_width_minus1 | u(v) |
|       subpic_grid_row_height_minus1 | u(v) |
|     } | |
|     for( i = 0; i < NumSubPicGridRows; i++ ) | |
|       for( j = 0; j < NumSubPicGridCols; j++ ) | |
|         subpic_grid_idx[ i ][ j ] | u(v) |
|     for( i = 0; i < NumSubPics; i++ ) { | |
|       subpic_treated_as_pic_flag[ i ] | u(1) |
|       loop_filter_across_subpic_enabled_flag[ i ] | u(1) |
|     } | |
|   } | |
| ... | ue(v) |
| } | |

As illustrated in Table 27, only when a value of a syntax, max_subpics_minus1, is greater than 0 (i.e., only when the number of the maximum sub-pictures is equal to or greater than 2), information representing a grid size, i.e., a syntax, subpic_grid_col_width_minus1, and a syntax, subpic_grid_col_height_minus1, may be signaled.

In another example, a size of a sub-picture may be determined based on at least one of position information of a sub-picture or size information of a sub-picture.

Position information of a sub-picture may include horizontal directional position information of a sub-picture (i.e., an x-axis coordinate) and vertical directional position information of a sub-picture (i.e., a y-axis coordinate). When a plurality of sub-pictures are included in a picture, position information may be signaled for each of sub-pictures.

In an example, a syntax, subpic_ctu_top_left_x[i], for determining a horizontal directional position of a sub-picture may be signaled in a bitstream. A syntax, subpic_ctu_top_left_x[i], represents a horizontal directional position of the i-th sub-picture in a picture. Concretely, subpic_ctu_top_left_x[i] represents a horizontal directional position of a grid at a top-left position of the i-th sub-picture (e.g., a coding tree unit). In this case, a horizontal directional position may be a value determined based on a size of a coding tree unit. In an example, a horizontal directional position may be derived by dividing an x-coordinate of a coding tree unit at a top-left position of the i-th sub-picture by a size of a coding tree unit (e.g., a width). Accordingly, an x-coordinate at a top-left position of the i-th coding tree unit may be derived by multiplying a value of a syntax, subpic_ctu_top_left_x[i], by a size of a coding tree unit.

A syntax, subpic_ctu_top_left_y[i], for determining a vertical directional position of a sub-picture may be signaled in a bitstream. A syntax, subpic_ctu_top_left_y[i], represents a vertical directional position of the i-th sub-picture in a picture. Concretely, subpic_ctu_top_left_y[i] represents a vertical directional position of a grid at a top-left position of the i-th sub-picture (e.g., a coding tree unit). In this case, a vertical directional position may be a value determined based on a size of a coding tree unit. In an example, a vertical directional position may be derived by dividing a y-coordinate of a coding tree unit at a top-left position of the i-th sub-picture by a size of a coding tree unit (e.g., a height). Accordingly, a y-coordinate at a top-left position of the i-th coding tree unit may be derived by multiplying a value of a syntax, subpic_ctu_top_left_y[i], by a size of a coding tree unit.

When a top-left boundary of a first sub-picture adjoins a top-left boundary of a picture, signaling of information representing a position of a sub-picture may be omitted for a first sub-picture.

Size information of a sub-picture may include width information of a sub-picture and height information of a sub-picture. When a plurality of sub-pictures are included in a picture, size information may be signaled for each of sub-pictures.

In an example, a syntax, subpic_width_minus1[i], for determining a width of a sub-picture may be signaled in a bitstream. A syntax, subpic_width_minus1[i], may represent a value subtracting 1 from a value dividing a width of the i-th sub-picture in a picture by a size of a grid (e.g., a width of a coding tree unit). In an example, when a size of a grid is 4×4, a syntax, subpic_width_minus1[i], may be set as a value derived by subtracting 1 from a result value dividing a width of the i-th sub-picture by 4. Alternatively, when a size of a grid is the same as a size of a coding tree unit, a syntax, subpic_width_minus1[i], may be set as a value derived by subtracting 1 from a result value dividing a width of the i-th sub-picture by a size of a coding tree unit. In other words, a syntax, subpic_width_minus1, represents a value subtracting 1 from the number of grid columns included by the i-th sub-picture (e.g., a coding tree unit column).

When a size of a grid is the same as a size of a coding tree unit, a decoder may derive a width of a sub-picture as in the following Equation 13.

$$\text{subpicWidth} = (\text{subpic\_width\_minus1}[i]+1) * \text{CtbSize} \quad [\text{Equation 13}]$$

In the Equation 13, subpicWidth represents a width of the i-th sub-picture and CtbSize represents a size of a coding tree unit. In an example, a variable, CtbSize, may be a value derived by taking Log_2 to a multiplication of a width and a height of a coding tree unit.

A syntax, subpic_height_minus1[i], for determining a height of a sub-picture, may be signaled in a bitstream. A syntax, subpic_height_minus1[i], may represent a value subtracting 1 from a value dividing a height of the i-th sub-picture in a picture by a size of a grid (e.g., a height of a coding tree unit). In an example, when a size of a grid is 4×4, a syntax, subpic_height_minus1[i], may be set as a value derived by subtracting 1 from a result value dividing a height of the i-th sub-picture by 4. Alternatively, when a size of a grid is the same as a size of a coding tree unit, a syntax, subpic_height_minus1[i], may be set as a value derived by subtracting 1 from a result value dividing a height of the i-th sub-picture by a size of a coding tree unit. In other words, a syntax, subpic_height_minus1, represents a value subtracting 1 from the number of grid columns included by the i-th sub-picture (e.g., a coding tree unit column).

When a size of a grid is the same as a size of a coding tree unit, a decoder may derive a height of a sub-picture as in the following Equation 14.

$$\text{subpicHeight} = (\text{subpic\_height\_minus1}[i]+(1) * \text{CtbSize} \quad [\text{Equation 14}]$$

In the Equation 14, subpicHeight represents a height of the i-th sub-picture.

When a picture may be partitioned into at least one sub-picture, sub-picture independence information may be obtained. Sub-picture independence information represents whether sub-pictures may be independently encoded/decoded. In an example, sub-picture independence information may include at least one of information representing whether a sub-picture is processed like a picture or information representing whether it is allowed to apply a loop filter on a sub-picture boundary.

In an example, in an example of Table 26 and Table 27, a syntax, subpic_treated_as_pic_flag[i], represents whether the i-th sub-picture is treated as a picture. When a value of a syntax, subpic_treated_as_pic_flag[i], is 1, it represents that a sub-picture may be independently encoded/decoded when encoding/decoding a sub-picture excluding a loop filter processing process.

When a sub-picture is treated as a picture, it may not be allowed to refer to information of other sub-picture in encoding/decoding excluding an in-loop filtering process. In other words, a boundary of a sub-picture may be treated as a picture boundary. In an example, in a process in which a temporal motion prediction vector is derived or in an encoding/decoding process such as interpolation, etc., encoding/decoding may be processed on the assumption that a boundary of a sub-picture is a picture boundary.

In an example, in general, a temporal motion prediction vector candidate or a temporal merge candidate may be derived based on a motion vector of a collocated block in a collocated picture. In this case, a block including a coordinate of a bottom-right corner of a block having the same position and size as a current block in a collocated picture may be set as a collocated block. If a block including a coordinate of a bottom-right corner is unavailable, a block including a central coordinate of a block having the same position and size as a current block in a collocated picture may be set as a collocated block. In deriving a temporal motion prediction vector candidate or a temporal merge candidate, it may be derived from a motion vector of a block including a central coordinate of a block having the same position and size of a current block in a collocated picture when a bottom-right corner of a block having the same position and size as a current block in a collocated picture is on a picture boundary or out of a picture boundary.

When a sub-picture is not treated as a picture, whether a bottom-right corner is on a picture boundary or whether a bottom-right corner is out of a picture boundary may be determined based on a picture boundary, not a sub-picture boundary.

On the other hand, when a sub-picture is treated as a picture, whether a bottom-right corner is on a picture boundary or whether a bottom-right corner is out of a picture boundary may be determined based on a sub-picture boundary. In an example, when a bottom-right corner of a block having the same position and size as a current block in a collocated picture is on a sub-picture boundary or out of a sub-picture boundary, a block including a central coordinate of a block having the same position and size of a current block in a collocated picture may be set as a collocated block.

In addition, generally, in inter prediction, there is a limit that a luma component pixel at an integer position of a current picture and a reference picture is not out of a left boundary, a right boundary, a top boundary and a bottom boundary of a picture in interpolating a decimal pixel. When a sub-picture is treated as a picture, there may be a limit that a luma component pixel at an integer position is not out of a left boundary, a right boundary, a top boundary and a bottom boundary of a sub-picture by considering a boundary of a sub-picture as a picture boundary.

In an example of Table 26 and Table 27, a syntax, loop_filter_across_subpic_enabled_flag[i], represents whether it is allowed to apply an in-loop filter in the i-th sub-picture. In an example, when a value of a syntax, loop_filter_across_subpic_enabled_flag[i], is 1, it represents that it is allowed to apply an in-loop filter on a boundary of the i-th sub-picture. An in-loop filter may include at least one of a deblocking filter, SAO or ALF. On the other hand, when a value of a syntax, loop_filter_across_subpic_enabled_flag[i], is 0, it represents that it is not allowed to apply an in-loop filter on a boundary of the i-th sub-picture.

In an example of Table 26 and Table 27, a variable, NumSubPics, represents the number of sub-pictures. A variable, NumSubPics, may have a value which is the same as or smaller than a value adding 1 to a syntax, max_sub-pics_minus1.

Sub-picture independence information, e.g., subpic_treated_as_pic_flag[i] and loop_filter_across_subpic_enabled_flag[i], may be signaled for sub-pictures that a value of i is between 0 to NumSubPics.

One slice or a plurality of slices may be set as a grid. In an example, when a slice is set as a grid, a sub-picture index to which a corresponding slice belongs may be signaled per slice. Table 28 and Table 29 represents an example in which when a definition method of a slice in a rectangular shape is used, sub-picture information allocated to each slice is signaled.

TABLE 28

| | Descriptor |
| --- | --- |
| slice_header( ) { | |
|    slice_pic_parameter_set_id | ue(v) |
|    if( rect_slice_flag \|\| NumBricksInPic > 1 ) { | |
|       slice_address | u(v) |
|       subpic_grid_idx[slice_address] | u(v) |
|    } | |
|    if( !rect_slice_flag | |
|    && !single_brick_per_slice_flag ) | |
|       num_bricks_in_slice_minus1 | ue(v) |
|    ... | u(1) |
|    byte_alignment( ) | |
| } | |

TABLE 29

| | Descriptor |
| --- | --- |
| pic_parameter_set_rbsp( ) { | |
|    ... | |
|    if( rect_slice_flag ) { | |
|       signalled_slice_id_flag | u(1) |
|       if( signalled_slice_id_flag ) { | |
|          signalled_slice_id_length_minus1 | ue(v) |
|          for( i = 0; i <= num_slices_in_pic_minus1; i++ ){ | |

TABLE 29-continued

| | Descriptor |
| --- | --- |
|             slice_id[ i ] | u(v) |
|             subpic_grid_idx[slice_id[i]] | u(v) |
|          } | |
|       } | |
|    } | |
|    ... | u(1) |
|    rbsp_trailing_bits( ) | |
| } | |

In Table 28, a syntax, slice address, represents an address allocated to an i-th slice in a picture. A syntax, subpic_grid_idx[slice_address], represents a sub-picture index value allocated to a slice whose address value is slice_address. Slices to which the same sub-picture index is allocated may be understood to belong to the same sub-picture.

In Table 29, a syntax, slice id[i], represents an identifier allocated to an i-th slice in a picture. A syntax, subpic_grid_idx[slice id[i]], represents a sub-picture index value allocated to an i-th slice (i.e., a slice that an identifier is slice id[i]). Slices to which the same sub-picture index is allocated may be understood to belong to the same sub-picture.

Only when a slice partitioning method based on a rectangular shape is applied (e.g., only when a syntax, rect_slice_flag, is 1), a grid may be set based on a slice. On the other hand, when a slice partitioning method based on a raster scan order is applied (e.g., when a syntax, rect_slice_flag, is 0), it may not be allowed to set a grid based on a slice.

One tile or a plurality of tiles may be set as a grid. In an example, when a tile is set as a grid, a sub-picture index to which a corresponding tile belongs may be signaled per tile.

Applying the embodiments as described about the decoding process or the encoding process to the encoding process or the decoding process respectively may be included in the scope of the present disclosure. Within the scope of the present disclosure, the embodiments in which operations occur in a predetermined order may be modified to embodiments in which the operations occur in a different order from the predetermined order.

Although the above-described embodiment is described based on a series of the operations or the flowchart, the embodiment does not limit a time-series order of the operations of the method thereto. In another example, the operations may be performed simultaneously or in a different order therefrom as necessary. Further, in the above-described embodiment, each of the components (for example, a unit, a module, etc.) constituting the block diagram may be implemented in a form of a hardware device or software. A plurality of components may be combined with each other into a single component which may be implemented using a single hardware device or software. The above-described embodiment may be implemented using program instructions that may be executed via various computer components. The instructions may be recorded in a computer-readable storage medium. The computer-readable storage medium may contain therein program instructions, data files, data structures, or the like alone or in combination with each other. Examples of the computer-readable storage media include magnetic media such as hard disks, floppy disks, and magnetic tapes, optical storage media such as CD-ROMs, DVDs, and magneto-optical media such as floptical disks, and hardware devices such as ROM, RAM, flash memory, and the like specifically configured to store therein and execute the program instructions. The hardware device may

INDUSTRIAL AVAILABILITY

The present disclosure may be applied to an electronic device that encodes/decodes video.

What is claimed is:

1. A method of decoding a video, the method comprising:
decoding slice number information from a bitstream, the slice number information indicating a value subtracting 1 from a number of slices included in a current picture;
decoding width information of a first slice from the bitstream, the width information indicating a value subtracting 1 from a number of tile columns included in the first slice;
decoding first height information of the first slice from the bitstream, the first height information indicating a value subtracting 1 from a number of tile rows included in the first slice; and
determining whether to additionally decode explicit number information from the bitstream or not,
wherein the explicit number information represents a number of slices for which second height information is explicitly signaled,
wherein the second height information indicates a value subtracting 1 from a number of Coding Tree Unit (CTU) rows included in a slice,
wherein determination of whether to additionally decode the explicit number information or not is based on whether both the width information and the first height information are 0,
wherein when the explicit number information is 0, a height of the first slice is set to be same as a height of a first tile and the second height information is not decoded for the first slice, and
wherein when the explicit number information is greater than 0, the height of the first slice is determined to be equal to or less than the height of the first tile based on the second height information decoded for the first slice.

2. The method of claim 1, wherein whether to decode the second height information for a second slice among a plurality of slices included in the first tile is determined by comparing an index of the second slice with the explicit number information.

3. The method of claim 2, wherein when it is determined to decode the second height information for the second slice, a height of the second slice is derived based on the second height information decoded for the second slice, and
wherein when it is determined not to decode the second height information for the second slice, the height of the second slice is derived based on the second height information which is decoded lastly for another slice.

4. The method of claim 2, wherein when the index of the second slice is less than the explicit number information, the second height information is decoded for the second slice, and wherein when the index of the second slice is equal to or greater than the explicit number information, the second height information is not decoded for the second slice.

5. The method of claim 1, wherein after parsing the width information and the first height information for the first slice who has a first index, the width information and the first height information are further decoded for a second slice who has a second index,
wherein when the first tile is partitioned into the plurality of slices, the second index is greater than the first index by a number of the plurality of slices, and
wherein when the first tile is not partitioned into the plurality of slices, the second index is greater than the first index by 1.

6. A method of encoding a video, the method comprising:
encoding slice number information into a bitstream, the slice number information indicating a value subtracting 1 from a number of slices included in a current picture;
encoding width information of a first slice into the bitstream, the width information indicating a value subtracting 1 from a number of tile columns included in the first slice;
encoding first height information of the first slice into the bitstream, the first height information indicating a value subtracting 1 from a number of tile rows included in the first slice, wherein in response that a height of the first slice is equal to or less than a first tile, the first height information is encoded with a value of 0; and
determining whether to additionally encode explicit number information into the bitstream or not,
wherein the explicit number information represents a number of slices for which second height information is explicitly signaled,
wherein the second height information indicates a value subtracting 1 from a number of Coding Tree Unit (CTU) rows included in a slice,
wherein when both the width information and the first height information are 0, the explicit number information is additionally encoded into the bitstream,
wherein when at least one of the width information and the first height information is not 0, encoding the explicit number information is omitted,
wherein in response that the explicit number information is encoded with a value of 0, the first slice is set to be same as the first tile, and
wherein in response that the first slice is one of a plurality of slices generated by partitioning the first tile, the explicit number information is encoded with a value greater than 0.

7. The method of claim 6, wherein when an index of a second slice is smaller than the explicit number information, the second height information is encoded for the second slice, and
wherein when the index of the second slice is equal to or greater than the explicit number information, the second height information is not encoded for the second slice.

8. The method of claim 7, wherein in response that the second height information is not encoded for the second slice, a height of the second slice has a height of a minimum among a height of another slice which the second height information is lastly encoded and a remaining height excluding a region occupied by previous slices in the first tile.

9. A non-transitory computer-readable medium for storing data associated with a video, comprising:
a data stream stored in the non-transitory computer-readable medium, the data stream comprising:
slice number information indicating a value subtracting 1 from a number of slices included in a current picture;
width information of a first slice, the width information indicating a value subtracting 1 from a number of tile columns included in the first slice; and
first height information of the first slice, the first height information indicating a value subtracting 1 from a number of tile rows included in the first slice, wherein, based on whether both the width information and the first height information are 0, it is determined whether the data stream additionally comprises explicit number information or not, wherein the explicit number information represents a number of slices for which second height information is explicitly signaled, wherein the second height information indicates a value subtracting 1 from a number of Coding Tree Unit (CTU) rows included in a slice, wherein when the explicit number information is 0, a height of the first slice is set to be same as a height of a first tile without referring to the second height information for the first slice, and wherein when the explicit number information is greater than 0, the height of the first slice is determined to be equal to or less than the height of the first tile based on the second height information for the first slice.

* * * * *